(12) United States Patent
Tressel

(10) Patent No.: US 11,198,401 B2
(45) Date of Patent: Dec. 14, 2021

(54) TOOL HOLDERS

(71) Applicant: Timothy J. Tressel, Woodville, OH (US)

(72) Inventor: Timothy J. Tressel, Woodville, OH (US)

(*) Notice: Subject to any disclaimer, the term of this patent is extended or adjusted under 35 U.S.C. 154(b) by 0 days.

(21) Appl. No.: 16/929,148

(22) Filed: Jul. 15, 2020

(65) Prior Publication Data

US 2021/0016722 A1 Jan. 21, 2021

Related U.S. Application Data

(60) Provisional application No. 62/874,622, filed on Jul. 16, 2019.

(51) Int. Cl.
| *B60R 11/06* | (2006.01) |
| *B60R 9/06* | (2006.01) |
| *B62D 49/06* | (2006.01) |
| *A01B 76/00* | (2006.01) |
| *B60R 11/00* | (2006.01) |

(52) U.S. Cl.
CPC ............... *B60R 11/06* (2013.01); *A01B 76/00* (2013.01); *B60R 9/06* (2013.01); *B60R 2011/004* (2013.01); *B62D 49/065* (2013.01)

(58) Field of Classification Search
CPC .......... A01B 76/00; B60R 11/06; B60R 9/06; B25H 3/04; B62D 49/065
USPC ....... 211/70.6; 224/922, 519, 531, 532, 533; D6/552
See application file for complete search history.

(56) References Cited

U.S. PATENT DOCUMENTS

| 2,815,863 A * | 12/1957 | Larson ................. A47B 81/007 211/70.1 |
| 2,854,147 A * | 9/1958 | Derr ....................... A01K 97/08 211/70.8 |
| 3,116,936 A * | 1/1964 | Magarian ............... A01D 67/00 280/47.19 |
| 3,298,531 A * | 1/1967 | Wilcke .................. A47L 13/512 211/70.6 |
| D222,366 S * | 10/1971 | Berger .......................... D6/552 |
| 3,893,568 A * | 7/1975 | Lile ........................ B60R 11/06 211/49.1 |
| 3,980,217 A * | 9/1976 | Yochum .................. B60R 11/06 224/489 |
| 5,411,191 A * | 5/1995 | Bunn, Jr. ............... A47F 7/0021 211/70.6 |
| 5,487,475 A * | 1/1996 | Knee ..................... A47B 81/005 211/70.8 |
| 5,704,496 A * | 1/1998 | Latta ........................ B25H 3/04 211/70.6 |
| 5,815,976 A * | 10/1998 | Jernigan ................ A01K 97/10 43/21.2 |
| 5,842,615 A * | 12/1998 | Goodness ................. B60R 9/10 224/509 |
| 5,887,926 A * | 3/1999 | Kearney, Jr. ............ B60R 11/06 294/143 |

(Continued)

*Primary Examiner* — Justin M Larson
(74) *Attorney, Agent, or Firm* — MacMillan, Sobanski & Todd, LLC

(57) ABSTRACT

Tool holders for transporting implements such as lawn and garden tools, and configured to be attached to a three-point hitch such as a tractor hitch, or a regular hitch, or to receive such as those on an ATV or lawn mower, or the lip of an object such as a wheelbarrow or yard cart, are described. Also described are washers having triangular ears.

19 Claims, 50 Drawing Sheets

(56) References Cited

U.S. PATENT DOCUMENTS

| | | | | |
|---|---|---|---|---|
| D440,803 S * | 4/2001 | McCormick | ............ | D6/552 |
| 6,360,902 B1 * | 3/2002 | Searles | ............ | A01K 97/10 |
| | | | | 211/70.8 |
| D458,878 S * | 6/2002 | Greco | ............ | D12/162 |
| 6,409,029 B1 * | 6/2002 | Bermes | ............ | A01D 75/004 |
| | | | | 211/207 |
| D473,991 S * | 4/2003 | Moon | ............ | D34/14 |
| D515,897 S * | 2/2006 | Greene | ............ | D8/71 |
| 7,063,218 B2 * | 6/2006 | Pleiman | ............ | B25H 3/04 |
| | | | | 211/70.6 |
| 7,937,883 B2 * | 5/2011 | Roemer | ............ | A01K 97/08 |
| | | | | 43/21.2 |
| D646,304 S * | 10/2011 | Pickett | ............ | D15/28 |
| 8,800,788 B1 * | 8/2014 | Guidry | ............ | B60R 7/08 |
| | | | | 211/70.8 |
| 9,180,820 B2 * | 11/2015 | Klein | ............ | A01B 76/00 |
| 9,327,652 B2 * | 5/2016 | King | ............ | B60R 11/06 |
| D806,760 S * | 1/2018 | Bentley | ............ | D15/30 |
| 10,933,928 B2 * | 3/2021 | Thoonsen | ............ | B60R 11/06 |
| 2003/0150893 A1 * | 8/2003 | Deutchman | ............ | B60R 11/06 |
| | | | | 224/410 |
| 2010/0127028 A1 * | 5/2010 | Lusk | ............ | B62B 1/20 |
| | | | | 224/401 |
| 2014/0097222 A1 * | 4/2014 | Robinson | ............ | B60R 7/14 |
| | | | | 224/401 |
| 2014/0332655 A1 * | 11/2014 | Colbert | ............ | A01K 97/08 |
| | | | | 248/512 |
| 2021/0016722 A1 * | 1/2021 | Tressel | ............ | B60R 11/06 |

* cited by examiner

TOOL HOLDERS

RELATED APPLICATIONS

This application claims priority to U.S. Provisional Application No. 62/874,622 filed under 35 U.S.C. § 111(b) on Jul. 16, 2019, the disclosure of which is incorporated herein by reference in its entirety for all purposes.

BACKGROUND

There is a need in the art for new and improve devices and methods for transporting implements such as lawn and garden tools between locations.

SUMMARY

Provided is a device comprising a first bar having at least one opening therethrough; a second bar having at least one receiving recess therein, wherein the second bar extends from a first side to a second side, the first side comprising a first protrusion and the second side comprising a second protrusion, wherein the first protrusion is configured to attach to or receive a first arm of a three-point hitch and the second protrusion is configured to attach to or receive a second arm of the three-point hitch; and at least one support member connecting the first bar to the second bar; wherein the at least one opening is axially aligned with the at least one receiving recess.

In certain embodiments, the device further comprises a pair of parallel plates on a front side of the first bar, wherein the pair of parallel plates comprises axially aligned holes therethrough. In particular embodiments, the device further comprises a top extension having a first end and a second end, wherein the first end is connected to the pair of parallel plates and the second end comprises a connection member configured to attach to or receive a third arm of the three-point hitch, the top extension being capable of pivoting with respect to the first end.

In certain embodiments, the first bar has a plurality of openings therethrough, and the second bar has a plurality of receiving receses therein, wherein each of the plurality of openings is axially aligned with a different one of the plurality of recesses.

In certain embodiments, the at least one opening is a circular opening. In certain embodiments, the first bar is substantially parallel to the second bar. In certain embodiments, the device further comprises a second support member connecting the first bar to the second bar, wherein the first support member and the second support member are substantially parallel. In certain embodiments, the at least one receiving recess comprises a floor having one or more center holes therethrough for drainage.

Further provided is a device comprising a first bar having at least one opening therethrough; a second bar having at least one receiving recess therein, wherein the second bar extends from a first side to a second side, the first side comprising a first prong and the second side comprising a second prong, wherein the first prong is configured to attach to a first arm of a three-point hitch and the second prong is configured to attach to a second arm of the three-point hitch; at least one support member connecting the first bar to the second bar; and a top extension having a first end and a second end, wherein the first end is connected to the first bar and the second end comprises a connection member configured to attach to a third arm of a three-point hitch, the top extension being capable of pivoting with respect to the first end; wherein the at least one opening is axially aligned with the at least one receiving recess.

In certain embodiments, the first bar has a plurality of openings therethrough, and the second bar has a plurality of receiving receses therein, wherein each of the plurality of openings is axially aligned with one of the plurality of recesses.

In certain embodiments, the at least one opening is a circular opening. In certain embodiments, the at least one opening is configured to receive an implement. In particular embodiments, the implement is a lawn and garden tool. In certain embodiments, the at least one opening is a slot configured to accept a D-handle or T-handle tool.

In certain embodiments, the first bar is substantially parallel to the second bar.

In certain embodiments, the device further comprises parallel plates extending from the first bar.

In certain embodiments, the first end is connected to the first bar through a pin and a pin lock. In particular embodiments, the pin is inserted through parallel plates extending from the first bar, and through a slot in the top extension.

In certain embodiments, the device further comprises a second support member connecting the first bar to the second bar, wherein the first support member and the second support member are substantially parallel.

Further provided is a device comprising a first bar having at least one opening therethrough; a second bar having at least one recess therein; and a central member connecting the first bar and the second bar, wherein the central member extends from a first end to a second end, wherein the second end comprises a male connector end having a plurality of holes therethrough; wherein the at least one opening is axially aligned with the at least one recess.

In certain embodiments, the plurality of holes comprises a first vertical hole, a second vertical hole, and a horizontal hole disposed between the first vertical hole and the second vertical hole, where the second vertical hole is configured to receive a fastener to attach a wagon or cart to the device. In certain embodiments, the central member includes a curved section such that the second end is axially displaced relative to the at least one opening and the at least one recess. In certain embodiments, the first bar has a plurality of openings therethrough, the second bar has a plurality of recesses therethrough, and each of the plurality of openings is axially aligned with a different one of the plurality of recesses. In certain embodiments, the at least one recess comprises a floor having one or more center holes therethrough for drainage.

In certain embodiments, the device further comprises a first support member extending between the first bar and the second bar, and a second support member extending between the first bar and the second bar, wherein the central member is disposed between the first support member and the second support member.

In certain embodiments, the male connector end is removable from the central member.

In certain embodiments, the device further comprises a washer having triangular ears disposed on a fastener securing the male connector end to a hitch, wherein the triangular ears extend at least as long as a diameter of the male connector end so as to be configured to prevent or limit the male connector end from rotating relative to the hitch. In particular embodiments, the washer comprises the triangular ears on opposing halves of the washer. In particular embodiments, the washer comprises the triangular ears on a first half of the washer.

Further provided is a device comprising a first bar having at least one opening therethrough; a second bar having at least one recess therein; and a central member connecting the first bar and the second bar, wherein the central member extends from a first end to a second end, wherein the second end comprises a female connector end defining opposing openings configured to receive a hitch pin, and a slot configured to receive to a male member of a hitch; wherein the at least one opening is axially aligned with the at least one recess.

In certain embodiments, the second end is axially displaced relative to the at least one opening and the at least one recess.

In certain embodiments, the first bar has a plurality of openings therethrough, the second bar has a plurality of recesses therethrough, and each of the plurality of openings is axially aligned with one of the plurality of recesses.

In certain embodiments, one or more of the first bar, the second bar, and the central member is a tubular member. In certain embodiments, one or more of the first bar, the second bar, and the central member comprises a square or rectangular cross section.

In certain embodiments, the first end is at the first bar.

Further provided is a device comprising a first bar having at least one opening therethrough, a second bar having at least one recess therein, and a central member connecting the first bar and the second bar, wherein the central member extends from a first end to a second end, wherein the second end comprises a male connector end defining opposing openings configured to receive a fastener, wherein the at least one opening is axially aligned with the at least one recess. In certain embodiments, the male connector end is a curved piece that slides into the central member at the second end. In certain embodiments, the male connector end is configured to slide into a standard ATV receiver. In certain embodiments, the male connector end has a square cross section.

In certain embodiments, the male connector end is attached to a hitch. In certain embodiments, the device further comprises a washer having triangular ears disposed on a fastener securing the male connector end to the hitch, wherein the triangular ears extend at least as long as a diameter of the male connector end so as to prevent or limit the hitch from rotating with respect to the male connector end.

Further provided is a device comprising a leg extending between a first end and a second end, and defining a lumen therein, wherein the first end comprises an opening and the second end is closed; a connector on the leg configured to attach to a lip of an object, wherein the connector comprises a clamp and collar assembly; and a foot member on the leg configured to rest against the object; wherein the lumen is configured to hold one or more implements. In certain embodiments, the foot member further comprises a securing ring.

In certain embodiments, the clamp and collar assembly comprises a clamp having opposing arms with tracks therein, and a clamp comprises a box-like housing with receiving recesses, wherein the opposing arms extend at least partially into the receiving recesses. In particular embodiments, the box-like housing comprises holes configured to receive fasteners therethrough for securing the opposing arms in place in the receiving recesses. In particular embodiments, the clamp comprises a gripping member that extends in a substantially perpendicular manner to the opposing arms, the collar comprises an extended bottom, and a gap is disposed between the gripping member and the extended bottom, wherein the gap is configured to receive a lip of an object.

Further provided is a device comprising a leg extending between a first end and a second end, and defining a lumen therein, wherein the first end comprises an opening and the second end is closed; a connector on the leg configured to attach to a lip of an object; and a foot member on the leg configured to rest against the object; wherein the lumen is configured to hold one or more implements.

In certain embodiments, the connector is a ratchet member. In particular embodiments, the ratchet member comprises a clamping plate movable along a track in directions toward and away from the leg.

In certain embodiments, the foot member is positioned along the leg between the connector and the second end.

In certain embodiments, the lumen has a circular or substantially circular cross section. In certain embodiments, the lumen has a square or substantially square cross section.

In certain embodiments, the one or more implements rest on the second end and extend through the opening at the first end.

In certain embodiments, the connection member comprises a ratchet configured to move the device closer to or farther from the object.

In certain embodiments, the foot member comprises a rigid member extending substantially orthogonal from the elongated tube.

Further provided is a kit comprising a first bar having at least one opening therethrough; a second bar having at least one receiving recess therein, wherein the second bar extends from a first side to a second side, the first side comprising a first prong and the second side comprising a second prong, wherein the first prong is configured to attach to a first arm of a three-point hitch and the second prong is configured to attach to a second arm of the three-point hitch; a first support member capable of connecting the first bar to the second bar; a second support member capable of connecting the first bar to the second bar; a top extension having a first end and a second end, wherein the first end is capable of connecting to the first bar and the second end comprises a connection member configured to attach to a third arm of a three-point hitch; wherein the first bar, the second bar, the first support member, the second support member, and the top extension are packaged in a disconnected state.

Further provided is a kit comprising a first bar having at least one opening therethrough; a second bar having at least one recess therein; and a central member capable of connecting the first bar and the second bar, wherein the central member extends from a first end to a second end, wherein the second end comprises a female connector end defining opposing openings configured to receive a hitch pin, and a slot configured to receive to a male member of a hitch; wherein the first bar, the second bar, and the central member are packaged in a disconnected state.

Further provided is a kit comprising a first bar having at least one opening therethrough; a second bar having at least one recess therein; a central member capable of connecting the first bar and the second bar; and a male connector end defining opposing opening configured to receive a bolt or other fastener, wherein the male connector end is configured to be inserted into the central member; wherein the first bar, the second bar, the central member, and the male connector end are packaged in a disconnected state.

Further provided is a kit comprising a leg extending between a first end and a second end, and defining a lumen therein, wherein the first end comprises an opening and the second end is closed; a ratchet member capable of attaching to the leg and being configured to attach to a lip of an object; and a foot member capable of attaching to the leg and being configured to rest against the object; wherein the lumen is configured to hold one or more implements; and wherein the leg, the ratchet member, and the foot member are packaged in a disconnected state.

Further provided is a washer comprising a center plate having a hole therethrough configured to receive a fastener; a first triangular ear extending in a direction from the center plate; and a second triangular ear extending in the direction from the center plate; wherein the first triangular ear and the second triangular ear are configured to prevent rotation of an object with respect to the fastener. In certain embodiments, the first triangular ear and the second triangular ear extend from the same half of the center plate. In certain embodiments, the first triangular ear and the second triangular ear extend from different halves of the center plate.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the U.S. Patent and Trademark Office upon request and payment of the necessary fees.

FIG. 19B is a close-up side view of the attachment of the wagon to the ATV from FIG. 19A, showing where the tool holder connects to the ATV and the wagon.

DETAILED DESCRIPTION

Throughout this disclosure, various publications, patents, and published patent specifications may be referenced by an identifying citation. The disclosures of these publications, patents, and published patent specifications are hereby incorporated by reference into the present disclosure in their entirety to more fully describe the state of the art to which this disclosure pertains.

Provided herein are tool holders configured to attach to hitches or objects such as wheelbarrows or yard carts, providing convenience for a user desiring to transport one or more implements from one location to another. The tool holders are described herein with reference to lawn and garden tools specifically, but are by no means limited to use with lawn and garden tools. Rather, the skilled person will recognize that the tool holders described herein may be utilized with any implement that the tool holders may carry. Moreover, the tool holders may be customized to carry a desired type or shape of implement, and such customization is entirely encompassed within the scope of the present disclosure.

Figure 1:
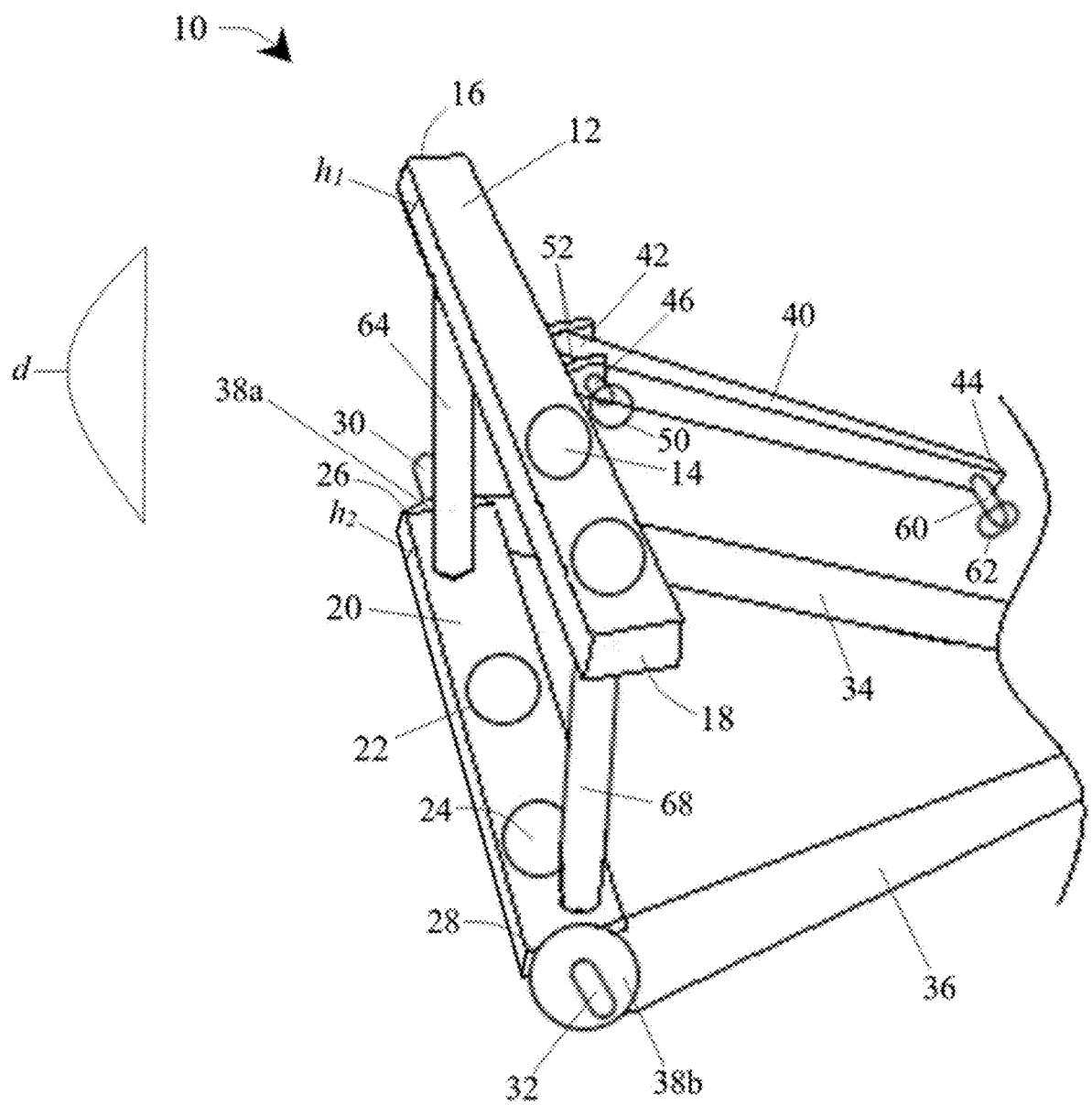
FIG. 1: Schematic illustration of an embodiment of a tool holder in accordance with the present disclosure.
Figure 2:
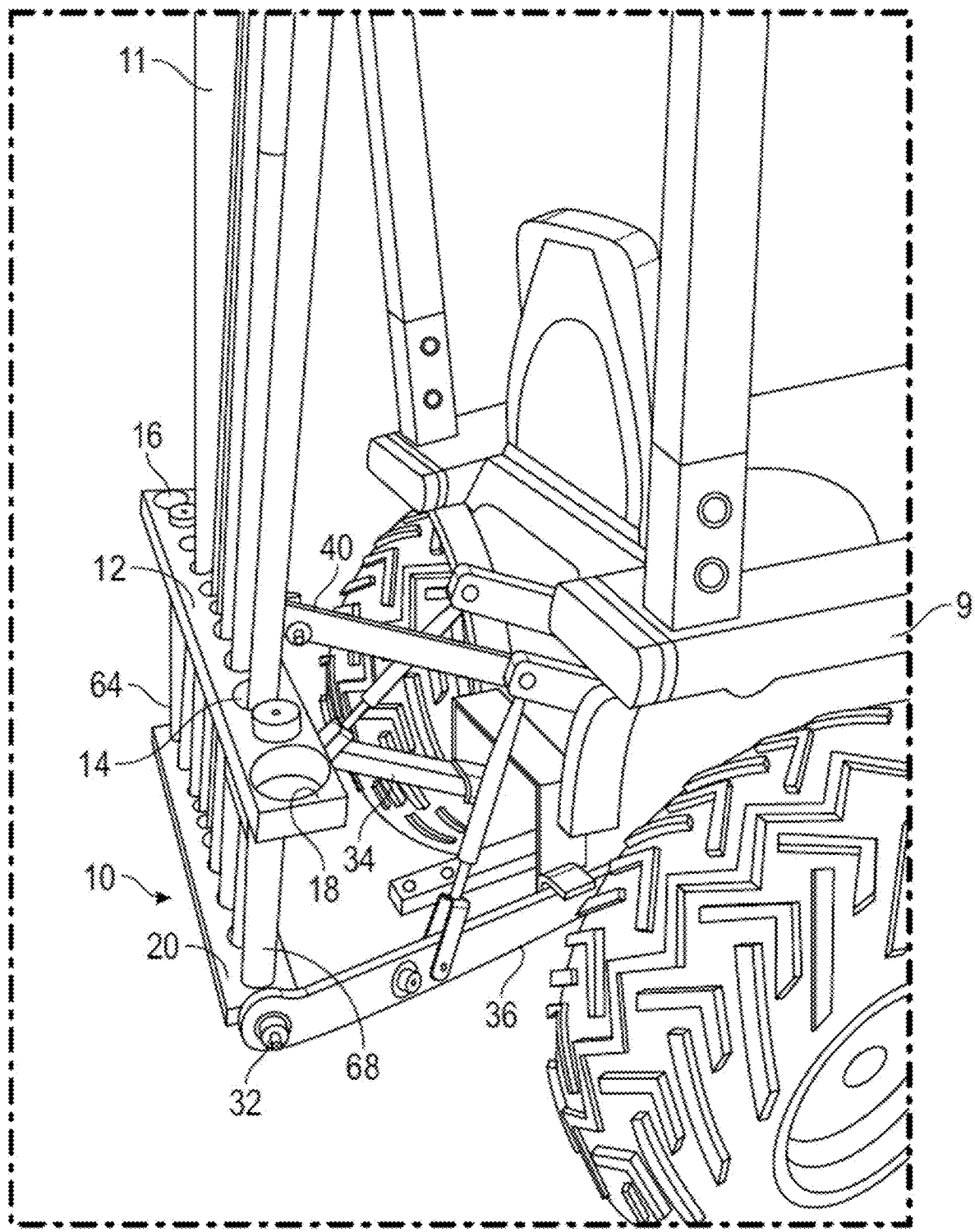
FIG. 2: View of a non-limiting example tool holder attached to a tractor by a three-point hitch.
Figure 3:
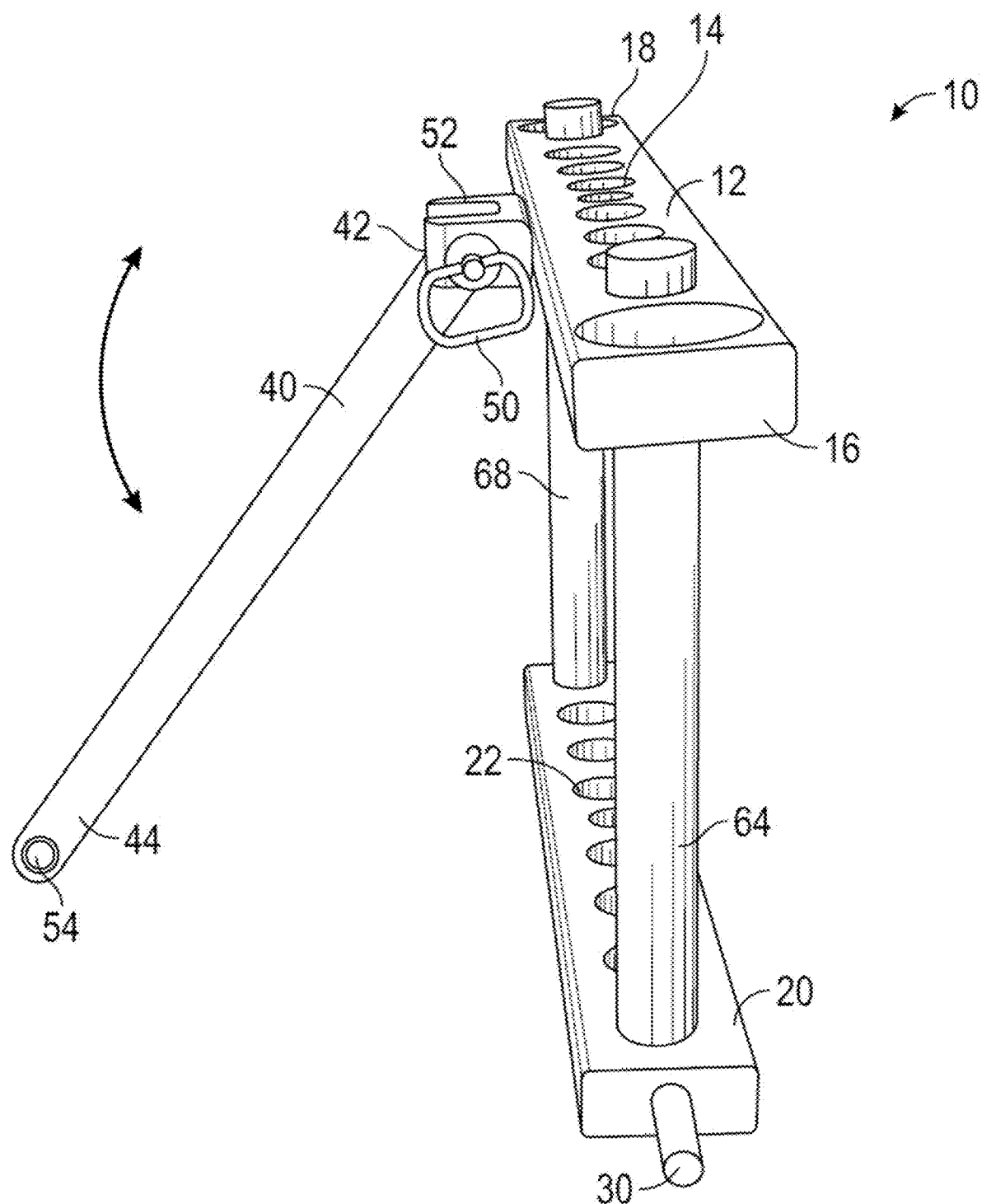
FIG. 3: Perspective view of a non-limiting example tool holder in accordance with the present disclosure.

Referring now to FIGS. 1-3, an embodiment of a tool holder 10 is depicted. The tool holder 10 is configured to be attached to a three-point hitch, and is particularly useful for carrying implements such as lawn and gardening tools 11. A three-point hitch is a type of hitch commonly used for attaching things to a tractor. The three points of a three-point hitch may be in the form of a triangle or letter 'A'. A three-point hitch serves to transfer the weight and resistance of an implement to the drive wheels of the tractor, which gives the tractor more usable traction that it would otherwise have. A three-point hitch generally includes three movable arms: two lower arms (the hitch lifting arms) that may be lifted by the tractor's hydraulic system, and an upper center arm (also known as a top link) that is movable. Accordingly, the tool holder 10 may include three attachment points that are each configured to attach to one of the three arms of a three-point hitch, as described in more detail below.

Referring still to FIGS. 1-3, the tool holder 10 may include a first bar 12 having at least one opening 14 therethrough. The first bar 12 extends from a first side 16 to a second side 18. The opening 14 may extend all the way through the height $h_1$ of the first bar 12. The first bar 12 may include a plurality of openings 14 therethrough, and the plurality of openings 14 may include openings 14 of different sizes or shapes. In some embodiments, the first bar 12 may also include one or more openings 14 that do not extend all the way through the first bar 12. The openings 14 may be circular, or may have any other shape suitable for receiving an implement. In some embodiments, the plurality of openings 14 may include a slot configured to receive the handle of a D-handle or T-handle tool.

The tool holder 10 may include a second bar 20 having at least one receiving recess 22 therein. The receiving recess 22 does not extend all the way through the height $h_2$ of the second bar 20, such that the receiving recess 22 includes a floor 24 configured to receive and support an implement such as a lawn and garden tool 11. The second bar 20 may extend in a manner that is substantially parallel to the first bar 12. The at least one receiving recess 22 may be axially aligned with the at least one opening 14 in the first bar 12. The floor 24 may include one or more center holes therethrough for drainage. The center holes may allow for water to weep out, for example to allow the tool holder 10 to dry out after being exposed to rain.

Referring still to FIGS. 1-3, the second bar 20 may extend from a first side 26 to a second side 28. The second bar 20 may include a plurality of receiving recesses 22 therein. In some embodiments, the tool holder 10 includes a plurality of openings 14 in the first bar 12, and a plurality of receiving recesses 22 in the second bar 20, and each of the receiving recesses 22 in the second bar 20 may be axially aligned with one of the openings 14 in the first bar 12. The alignment of the openings 14 and the recesses 22 allows for an implement, such as a lawn and garden tool 11, to rest in a receiving recess 22 and be prevented from falling out of the tool holder 10 by the receiving recess 22 and the walls of the opening 14, said walls being defined by the height $h_1$ of the first bar 12.

The second bar 20 may include a first prong 30 at the first side 26 and a second prong 32 at the second side 28. The first prong 30 may be configured to attach to the first arm 34 of a three-point hitch, and the second prong 32 may be configured to attach to the second arm 36 of a three-point hitch. The first and second arms 34, 36 of a three-point hitch may terminate in connection members 38a, 38b having circular openings through which the first prong 30 and the second prong 32, respectively, may be inserted so as to hold the first arm 34 and the second arm 36 in place with respect to the tool holder 10.

Referring still to FIGS. 1-3, the tool holder 10 may include a top extension 40 that extends from a first end 42 to a second end 44. The first end 42 may connect to the first bar 12 with a pin 46 inserted through a slot in the first end 42 and secured in place with a pin lock 50. The first bar 12 may include a set of parallel plates 52 configured to receive the pin 46 and thereby hold the first end 42 of the top extension 40 in place. However, other means of connecting the first end 42 to the first bar 12 are possible and entirely encompassed within the scope of the present disclosure. The top extension 40 may swing or pivot about the pin 46 such that the second end 44 may move along an arc centered at the pin 46, as indicated by the double-sided arrow in FIG. 3. The mobility of the top extension 40 is helpful in attaching the tool holder 10 to three-point hitches of different sizes.

The second end 44 of the top extension 40 may include a connection member 54 configured to attach to the third arm of a three-point hitch. The connection member 54 may include a slot in the top extension 40 at the second end 44 and a hitch pin 60 configured to be inserted into the slot. The female end of the third arm of a three-point hitch may thus be connected to the second end 44 of the top extension 40 by inserting the hitch pin 60 through a first side of the female end of the third arm, through the slot, and through the second side of the female end of the third arm, where a pin lock 62 may be secured to the hitch pin 60 to lock the top extension 40 in place with respect to the third arm of the three-point hitch. However, other means of securing the third arm of a three-point hitch to the second end 44 of the top extension 40 are possible and entirely encompassed within the scope of the present disclosure. Thus, together, the first prong 30 of the second bar 20, the second prong 32 of the second bar 20, and the second end 44 of the top extension 40 allow the tool holder 10 to be secured to the three arms of a three-point hitch.

Referring still to FIGS. 1-3, the first bar 12 and the second bar 20 are separated by a distance d sufficient to keep elongated implements from falling out of the tool holder 10 when in motion. As seen in FIGS. 1-3, a first support member 64 may extend between the first bar 12 and the second bar 20, and a second support member 68 may extend between the first bar 12 and the second bar 20, rigidly connecting the first bar 12 and the second bar 20. The first support member 64 may be parallel to the second support member 68. The distance d is equal to the length of the support members 64, 68. Because the sufficiency of the distance d between the first bar 12 and the second bar 20 depends on the size of the implements desired to be carried with the tool holder 10, the length of the first support member 64 and the length of the second support member 68 are customizable and not particularly limited. Alternatively, the tool holder 10 may include only one support member 64 extending between the first bar 12 and the second bar 20. In other embodiments, the tool holder 10 may include more than two support members 64, 68 extending between the first bar 12 and the second bar 20. The number of support members is not particularly limited.

Though FIGS. 1-3 depict the first bar 12 and the second bar 20 as being rectangular members for example purposes, either or both of the first bar 12 and the second bar 20 may instead be tubular or some other shape. Similarly, though FIGS. 1-3 depict the first support member 64 and the second support member 68 as being tubular for example purposes, either or both of the first support member 64 and the second support member 68 may instead be rectangular or some other shape.

The first bar 12 and the second bar 20 may each include openings configured for receiving the support members. In some embodiments, the first support member 64 and the second support member 68 protrude through the first bar 12. However, in other embodiments, the first support member 64 and the second support member 68 do not protrude through the first bar 12. The openings in the second bar 20 configured for receiving the support members 64, 68 may simply be any of the receiving recesses 22, and the openings in the first bar 12 for receiving the support members 64, 68 may simply be any of the openings 14. In some embodiments, caps can be placed on the openings 14 over the support members 64, 68 to prevent the support members 64, 68 from sliding too far through the first bar 12 and producing an undesirably short distance d. Alternatively, an interior shoulder may be included so as to prevent the support members 64, 68 from sliding too far through the first bar 12.

The tool holder 10 may be composed of any suitable material including, but not limited to, wood, plastic, metal, or a combination thereof. In one non-limiting example, the tool holder 10 is constructed from PVC. In another non-limiting example, the tool holder 10 is constructed from a polypropylene with 20% glass filler. As another example, the tool holder 10 may be composed of recycled materials such as cardboard. In some embodiments, because the tool holder 10 may be adapted for prolonged outdoor use, the tool holder 10 is composed of a durable waterproof material such as a plastic. However, the materials that the tool holder 10 is made out of are not particularly limited.

The tool holder 10 may be composed of five pieces which are easily assembled and disassembled. Thus, each of the first bar 12, the second bar 20, the first support member 64, the second support member 68, and the top extension 40 may be packaged in a kit or kits, housed as separate, disconnected pieces (i.e., in a disconnected state) in one or more containers. Advantageously, in this manner, the tool holder 10 may be easily packaged or stored in a small container or space.

Referring now to FIGS. 4-10, another embodiment of a tool holder 70 configured for attachment to a three-point hitch is depicted. The tool holder 70 is similar to the tool holder 10 depicted in FIGS. 1-3, except that the tool holder 70 includes end cutouts 72a, 72b and double pin bolt assemblies 74 as described in more detail below, and does not include a top extension 40.

Figure 6A:
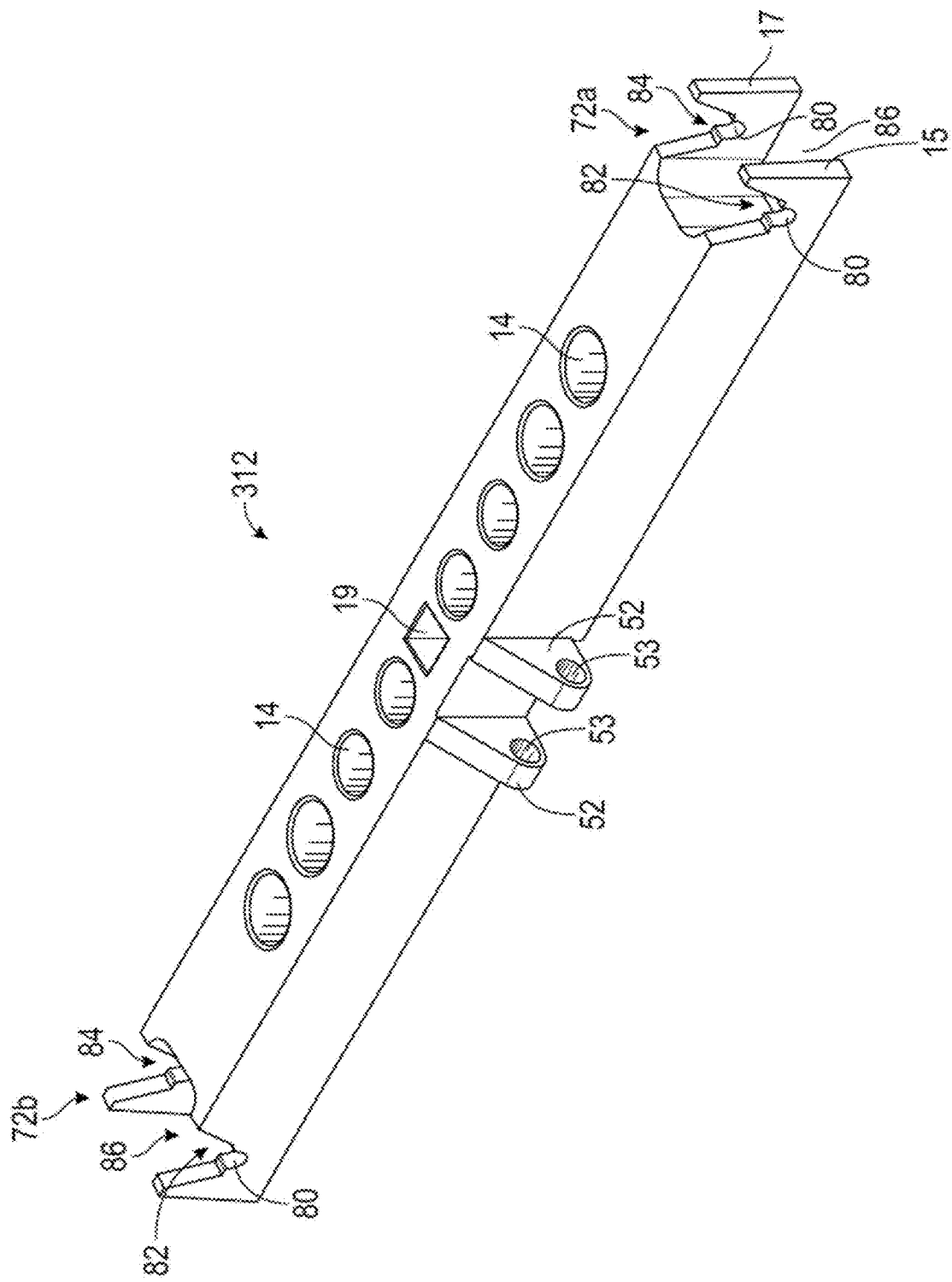
FIGS. 6A-6C: Perspective (FIG. 6A), top-down (FIG. 6B), and side (FIG. 6C) views of the first bar of an embodiment of a tool holder in accordance with the present disclosure.
Figure 6B:
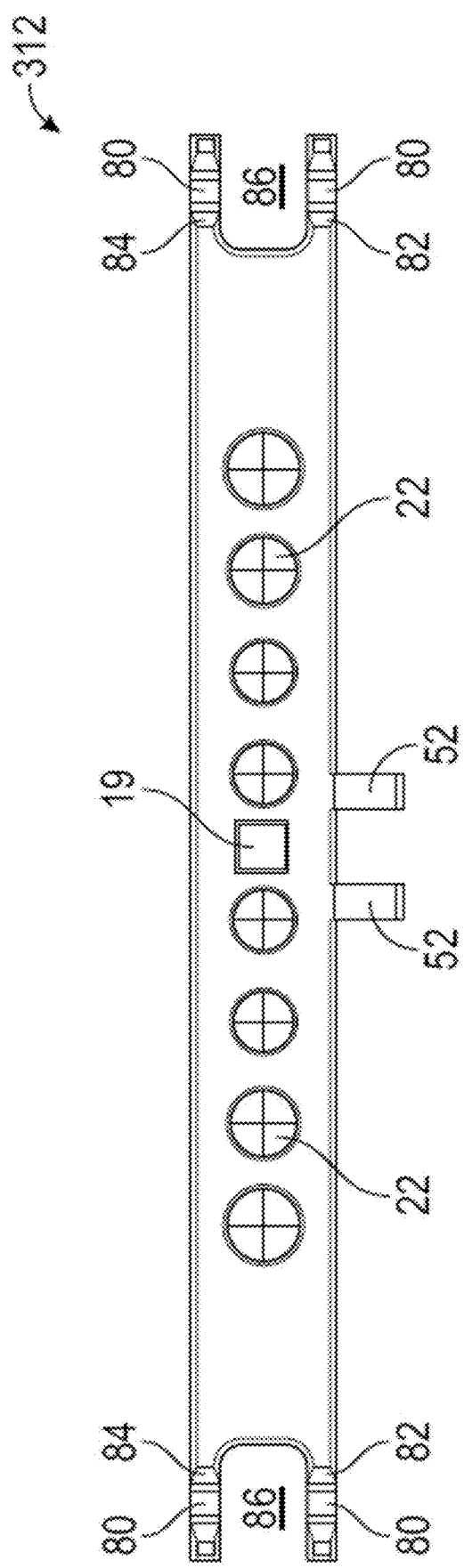
Figure 6C:
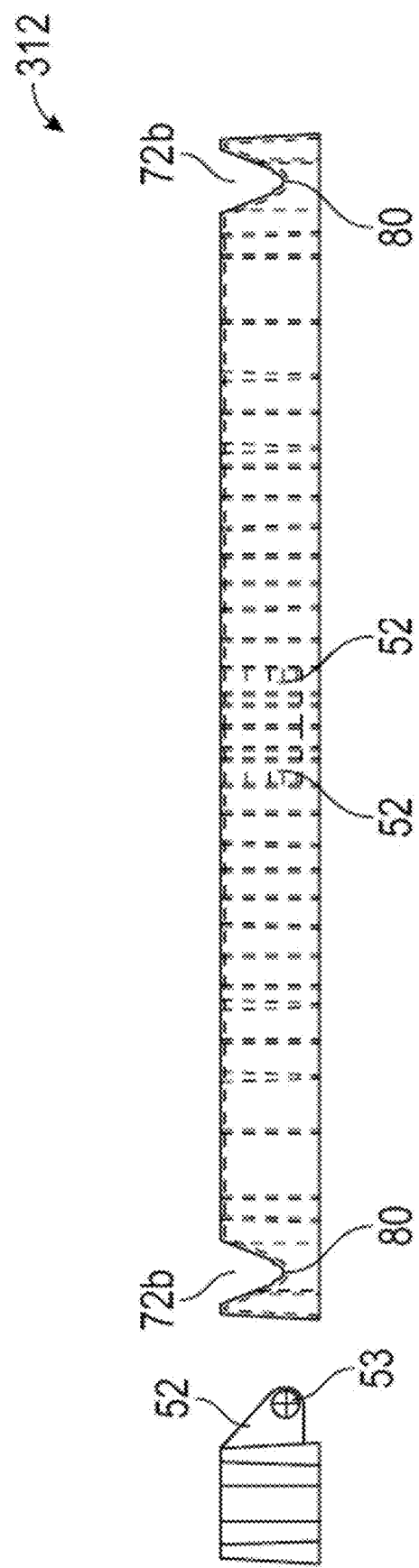
Figure 7A:
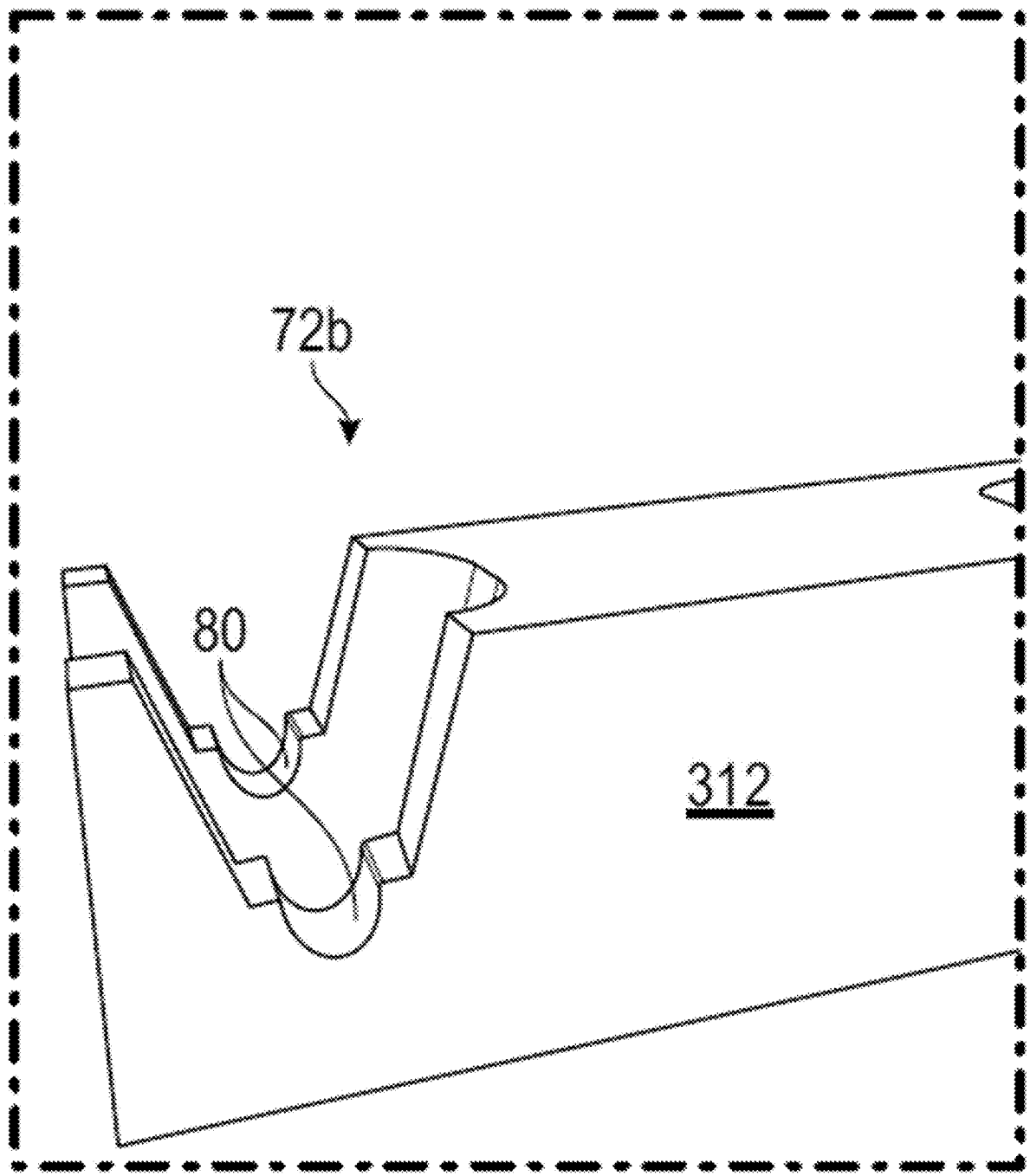
FIGS. 7A-7C: Views of an end cutout empty (FIG. 7A), being used to hold a bucket handle (FIG. 7B), and being used to hold a strap and pruning shears (FIG. 7C).
Figure 7B:
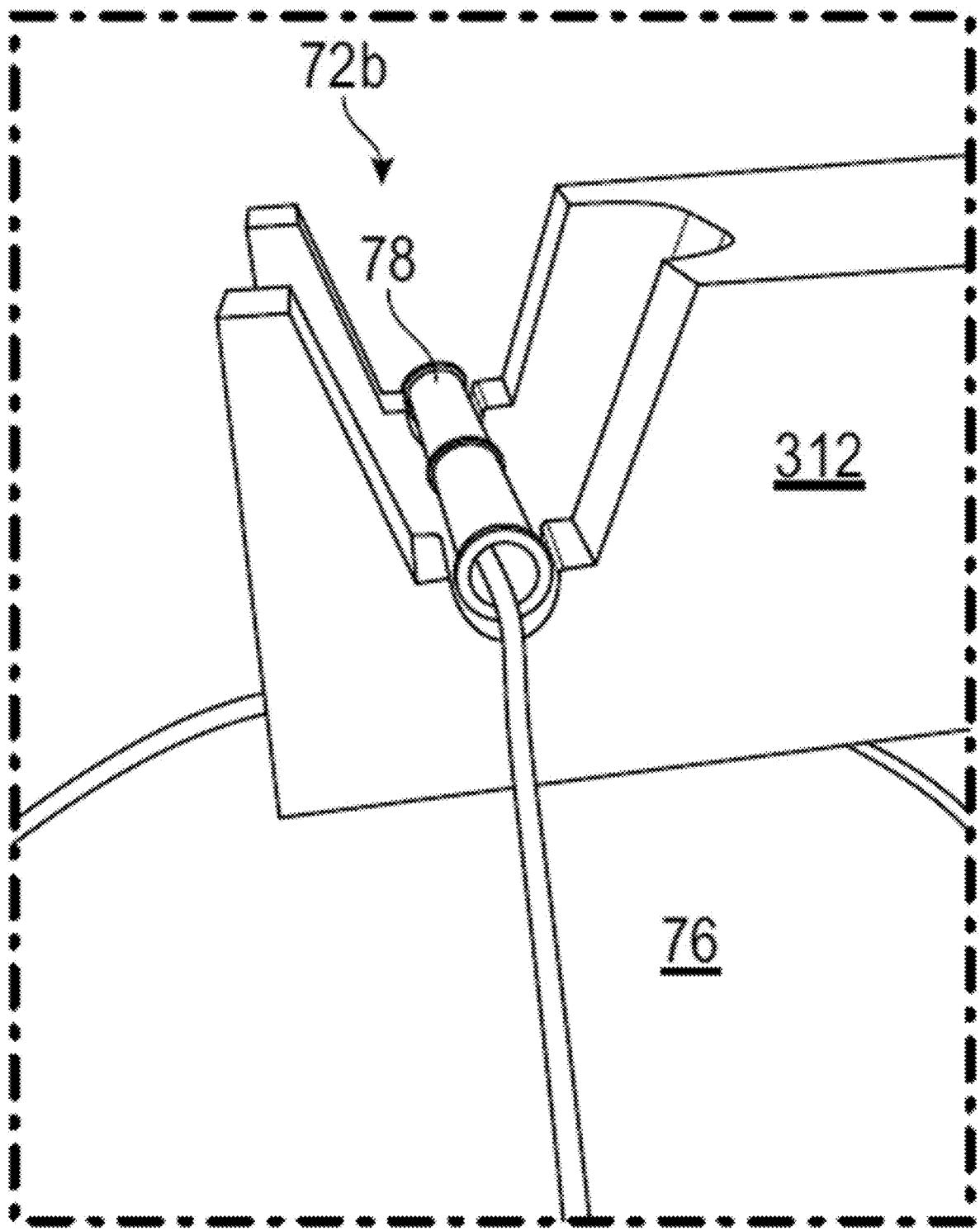
Figure 7C:
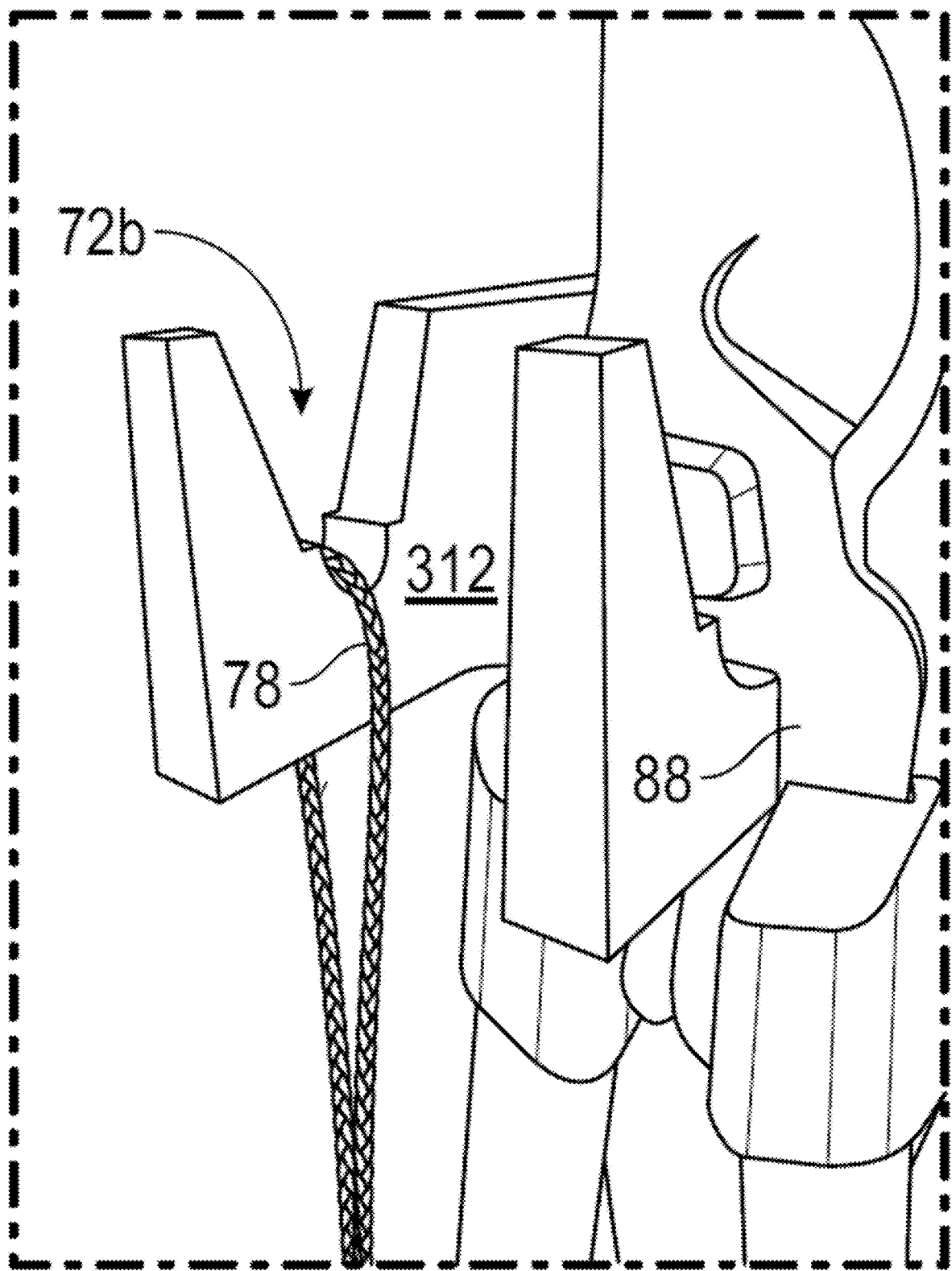

As seen in FIGS. 6-7, the tool holder 70 may include a first bar 312 with a first end cutout 72a and a second end cutout 72b. Each end cutout 72a, 72b may be an area of the first bar 312 where a generally U-shaped or V-shaped opening has been formed. As best seen in FIG. 7B, each end cutout 72a, 72b may be configured to hold a bucket 76 or other item with a handle or strap 78. The end cutouts 72a, 72b may include indented resting surfaces 80 configured for a handle or strap 78, though the end cutouts 72a, 72b do not need to include such indented resting surfaces 80. The indented resting surfaces 80 may be curved indentations at the bottom of the U-shaped or V-shaped opening, such that the handle or strap 78 of a bucket 76 or other item may rest snugly within the end cutouts 72a, 72b with a low likelihood of falling out during transport. As best seen in FIGS. 6A-6B, the end cutouts 72a, 72b may be created such that the side ends of the first bar 312 are open between the front side wall 15 and the rear side wall 17. As seen in FIGS. 6A-6B, this creates a front wall opening 82 and a rear wall opening 84, each configured to receive handles or straps 78, or items, with a gap 86 therebetween. In this manner, as seen in FIG. 7C, each end cutout 72a, 72b may be used to hold multiple handles or straps 78 or other items. As shown in FIG. 7C, an end cutout 72a, 72b may hold a strap 78 using the indented resting surface 80 of the front wall opening 82, and pruning shears 88 using the indented resting surface 80 of the rear wall opening 84. However, it is not necessary that both ends of the first bar 312 include an end cutout 72a, 72b. For example, in some embodiments, the first bar 312 only includes one end cutout 72a.

Figure 5A:
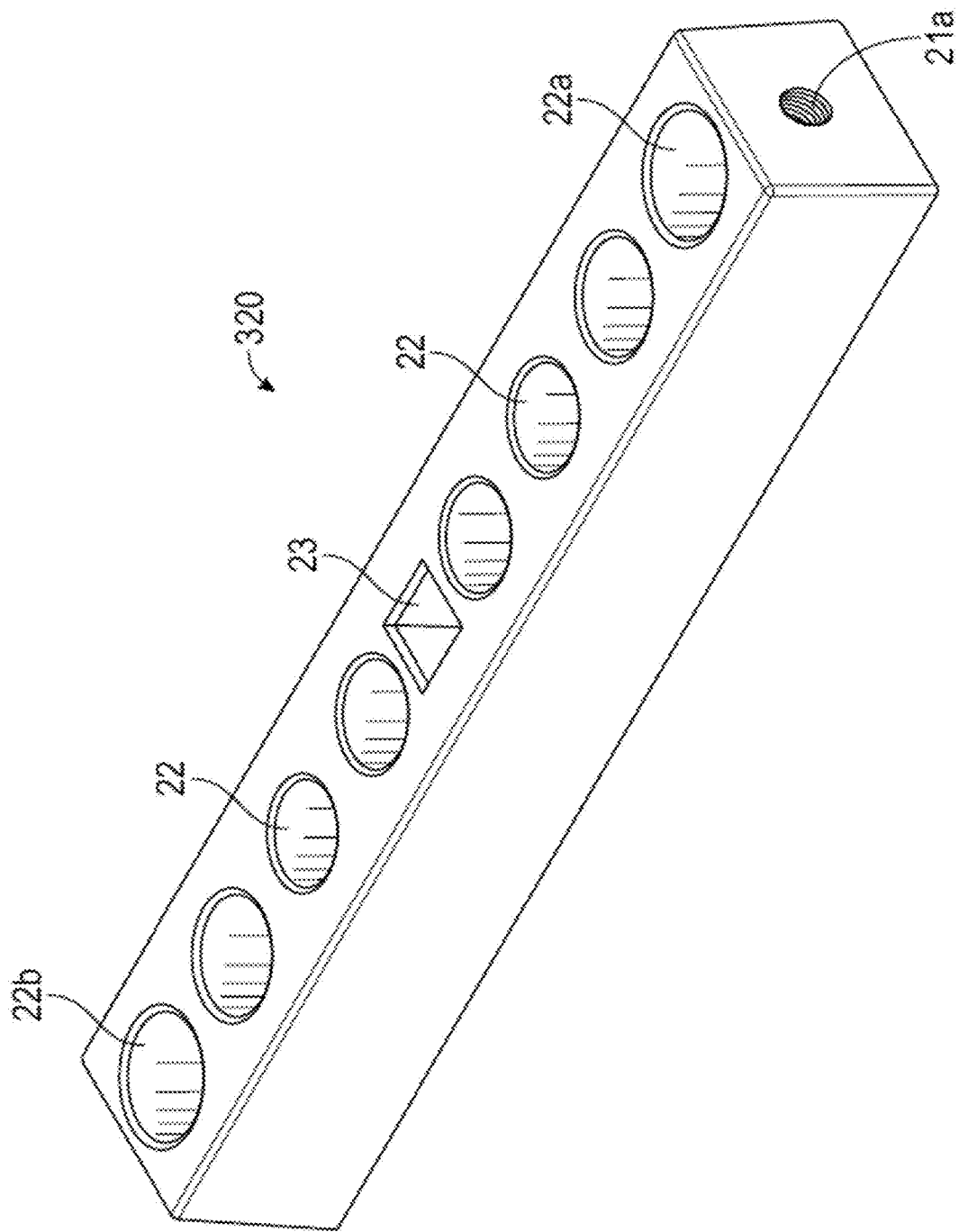
FIGS. 5A-5C: Perspective (FIG. 5A), top-down (FIG. 5B), and side (FIG. 5C) views of the second bar of an embodiment of a tool holder in accordance with the present disclosure.
Figure 5B:
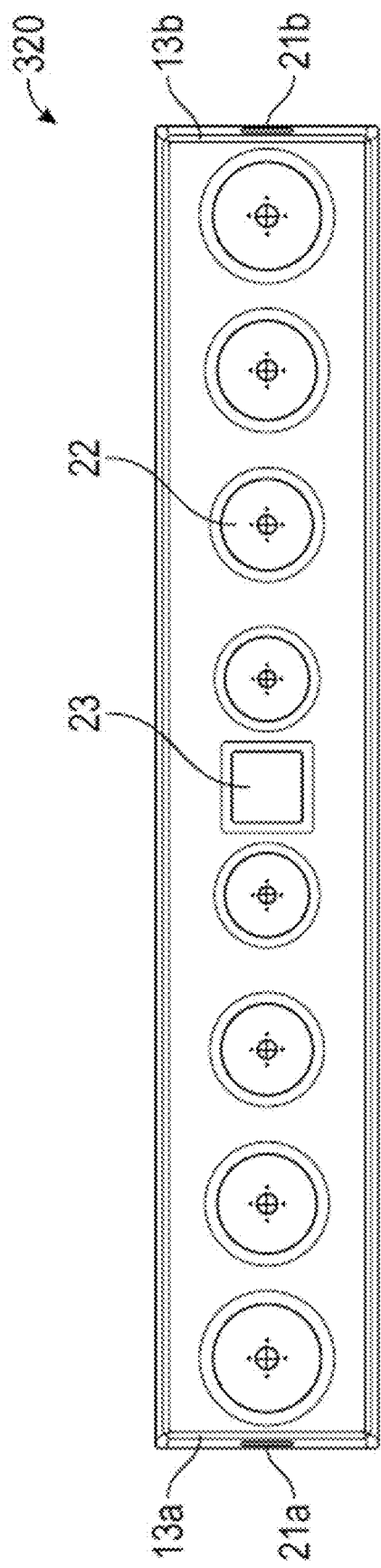
Figure 5C:
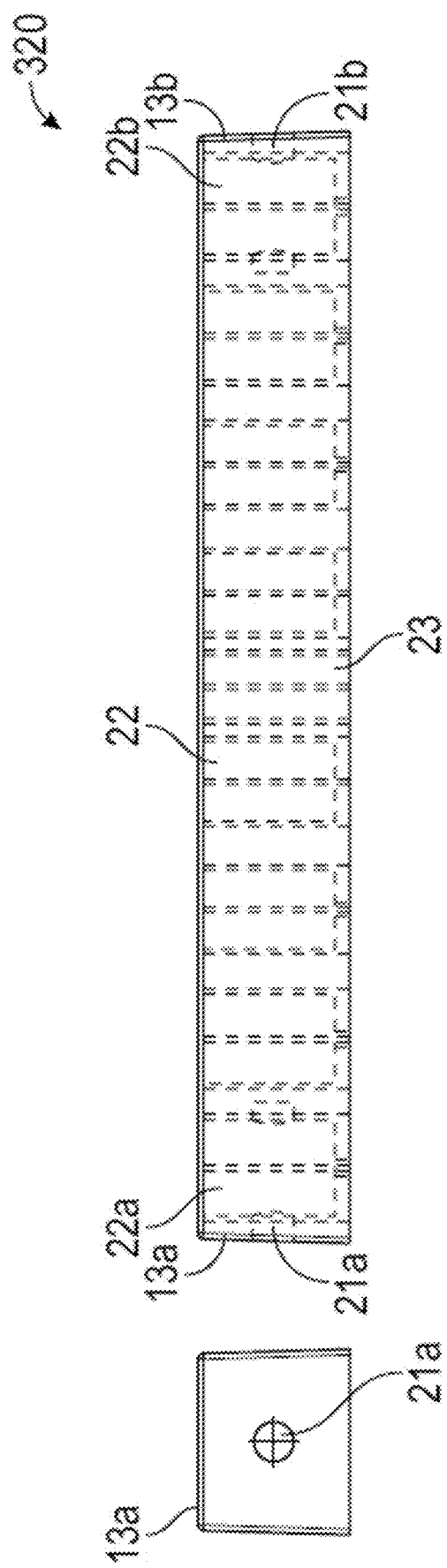

Referring now to FIGS. 5A-5C, the second bar 320 may include first and second openings 21a, 21b through the first and second ends 13a, 13b, where the openings 21a, 21b are configured to receive a protrusion such as a bolt 90 or prong 30, 32. As seen in FIG. 5C, the openings 21a, 21b extend through each side of each terminal recess 22a, 22b. The first terminal recess 22a may be configured to receive the first support member 64, and the second terminal recess 22b may be configured to receive the second support member 68.

Figure 8A:
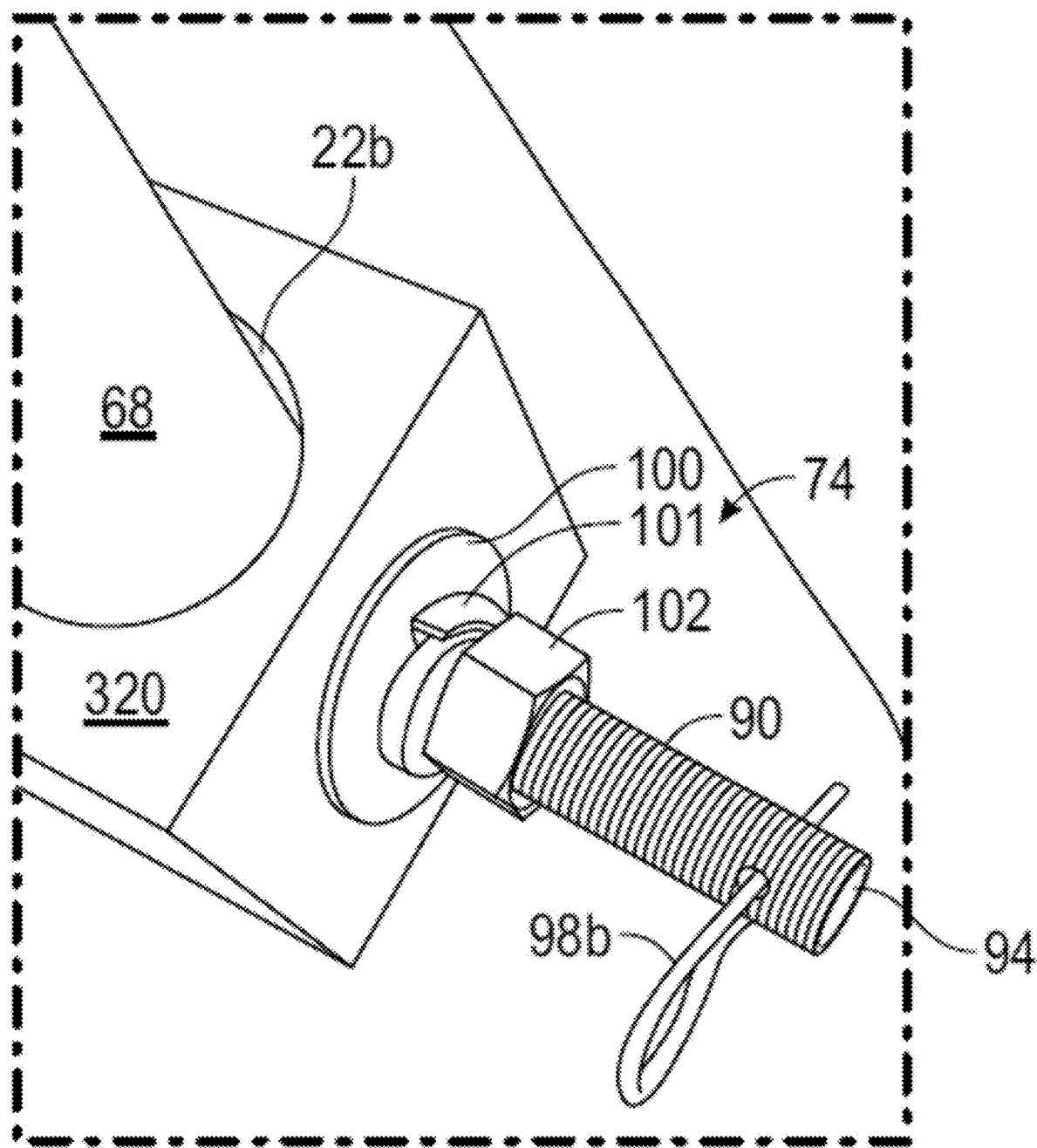
FIGS. 8A-8C: Top (FIG. 8A) and bottom (FIG. 8B) views of a double pin bolt assembly, and a perspective view (FIG. 8C) of the arm of a three-point hitch connected to a bolt of a double pin bolt assembly.
Figure 8B:
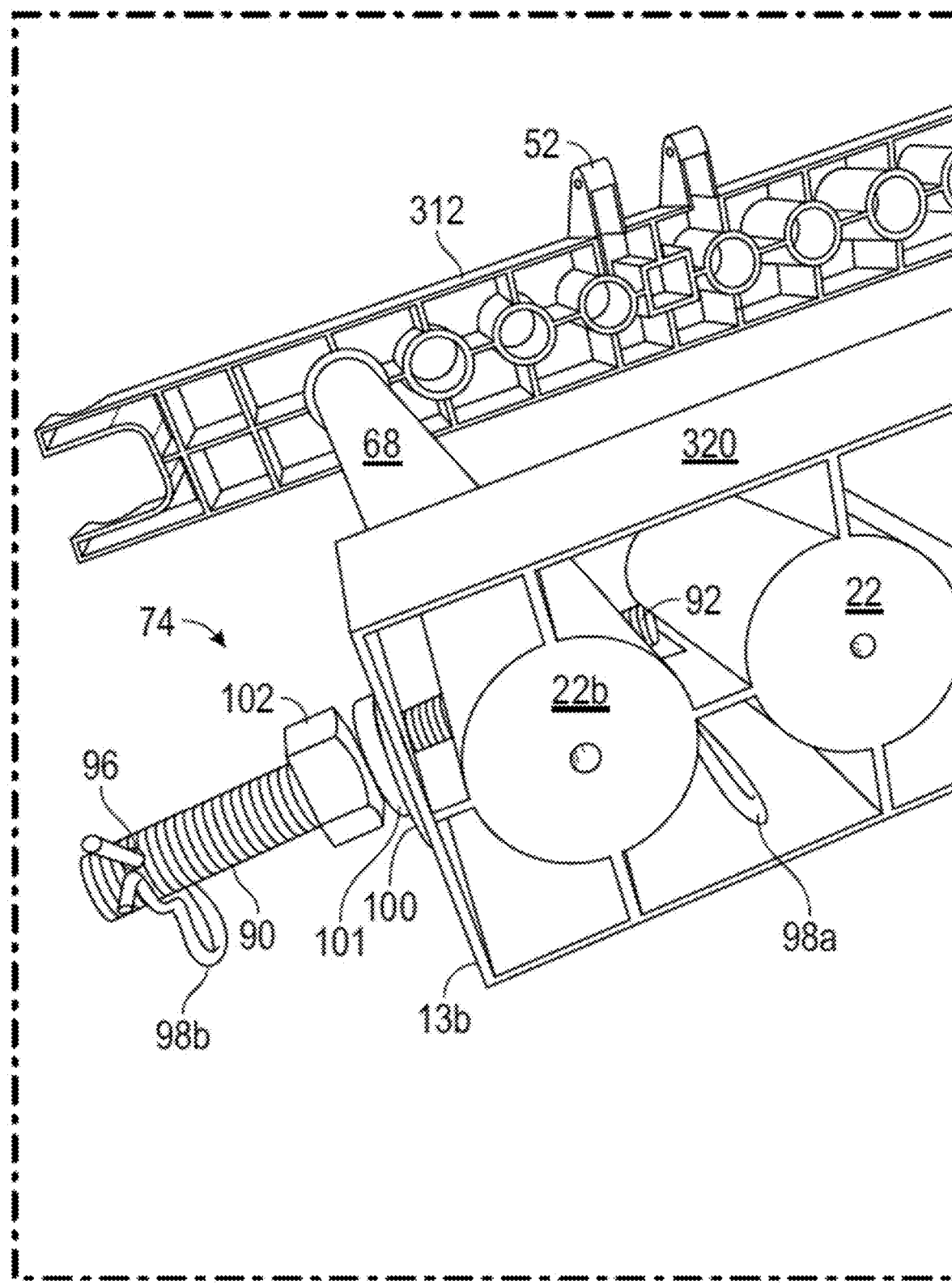
Figure 8C:
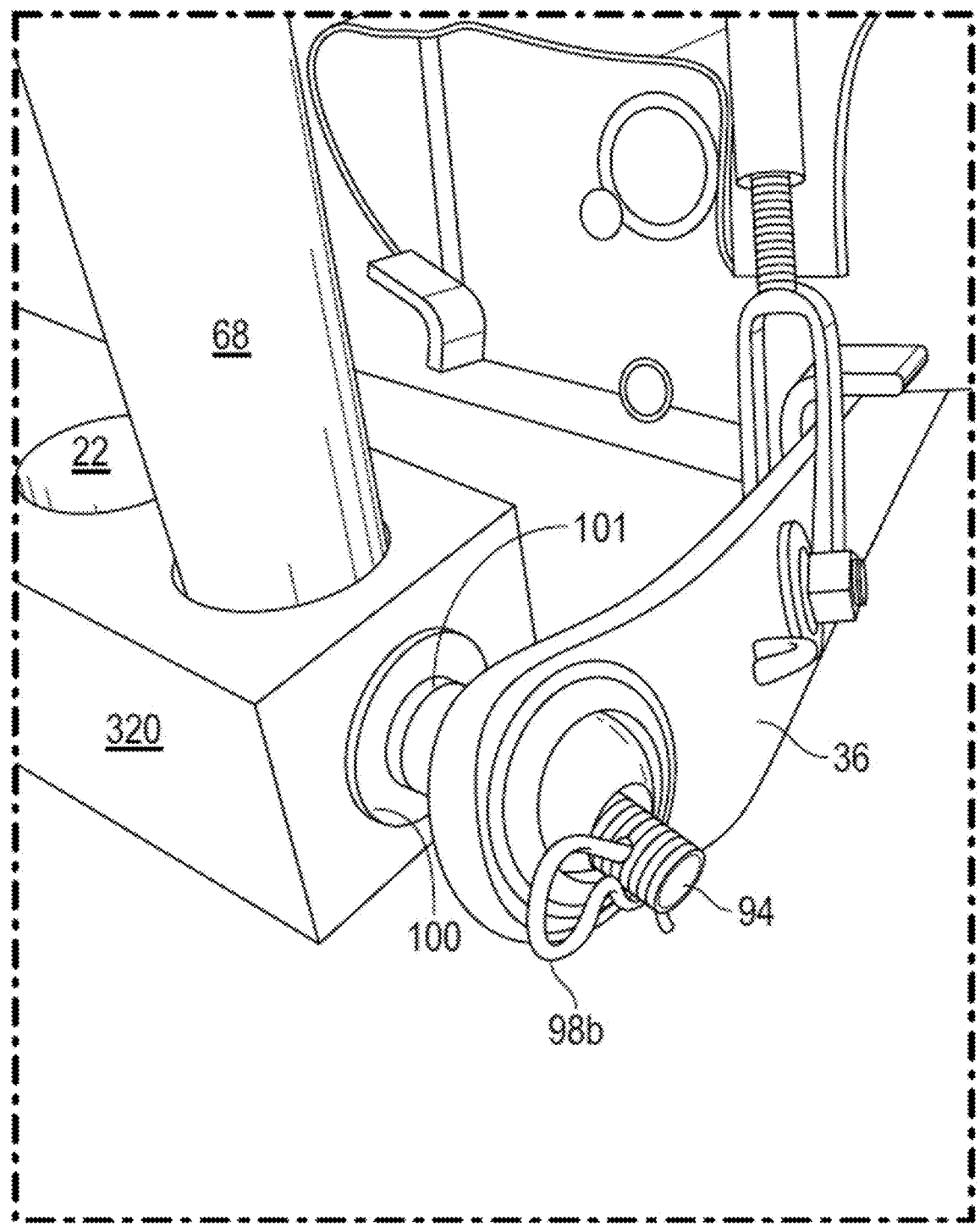

Referring now to FIGS. 8A-8C, the tool holder 70 may include a double pin bolt assembly 74 on each of the first side 16 and second side 18. The double pin bolt assemblies 74 act as a protrusion for connection to the arms of a three-point hitch, similar to the first and second prongs 30, 32 of the tool holder 10 depicted in FIGS. 1-3. The double pin bolt assemblies 74 are configured within the first and second openings 21a, 21b in the the first and second ends 13a, 13b.

Each double pin bolt assembly 74 may include a bolt 90 spanning from a first end 92 to a second end 94. The bolt 90 may be entirely threaded, or may only include a threaded portion in a center region of the bolt 90. The first end 92 may include a bore configured to receive a first locking pin 98a, and the second end 94 may include a bore 96 configured to receive a second locking pin 98b. The double pin bolt assembly 74 may further include a flat washer 100, a locking washer 101, and a lock nut 102.

The bolt 90 may have a length from the first end 92 to the second end 94 such that the bolt 90 extends through the respective end 13a, 13b of the second bar 320 and through the first support member 64. On of the side of the first support member 64 opposite the end 13a, 13b, the second locking pin 98b may be inserted into the bore 96 to further secure the bolt 90 in place. The bolt 90 of each double pin bolt assembly 74 protrudes from the ends 13a, 13b of the second bar 320. As seen in FIG. 8C, the first and second arms 34, 36 of a three-point hitch may attach to the protruding bolts 90, and may be secured in place with the first locking pins 98a. The second locking pin 98b of each double pin bolt assembly 74 may be inserted into the bore 96 so as to lock the respective arm 34, 36 of the three-point hitch in place on the bolt 90.

Referring now to FIGS. 5A-5C and FIGS. 6A-6C, the second bar 320 may include a square bore 23 in the center of the second bar 320, and the first bar 12 may include a square opening 19 in the center of the first bar 312. The square bore 23 in the second bar 320 may be axially aligned with the square opening 19 in the first bar 312. The square bore 23 may extend all the way through the first bar 320.

Figure 4:
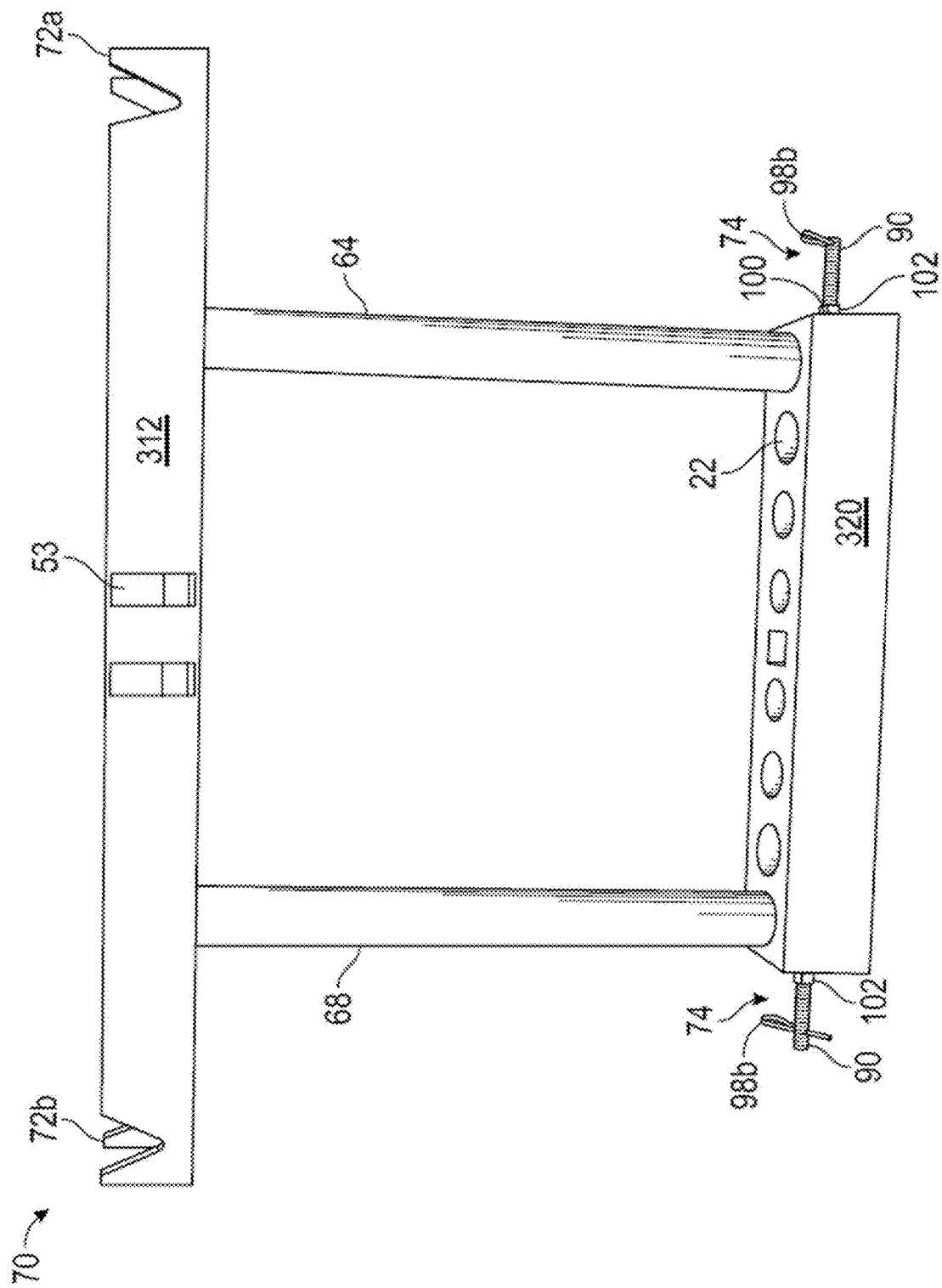
FIG. 4: Front view of an embodiment of a tool holder in accordance with the present disclosure.
Figure 9A:
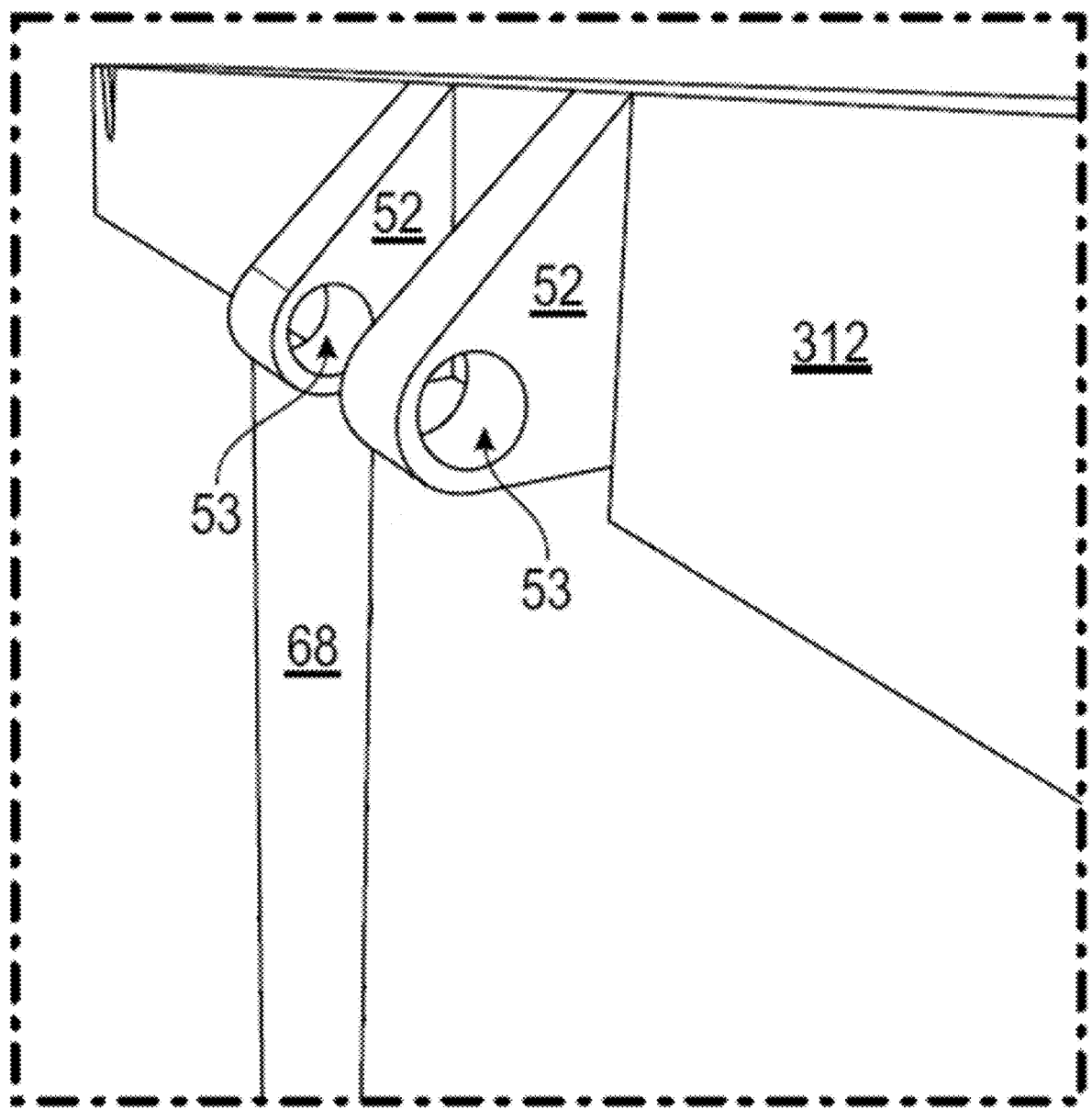
FIGS. 9A-9B: Perspective view of the parallel plates of a first bar (FIG. 9A), and perspective view of the parallel plates connected to a top link of a tractor's three-point hitch (FIG. 9B).
Figure 9B:
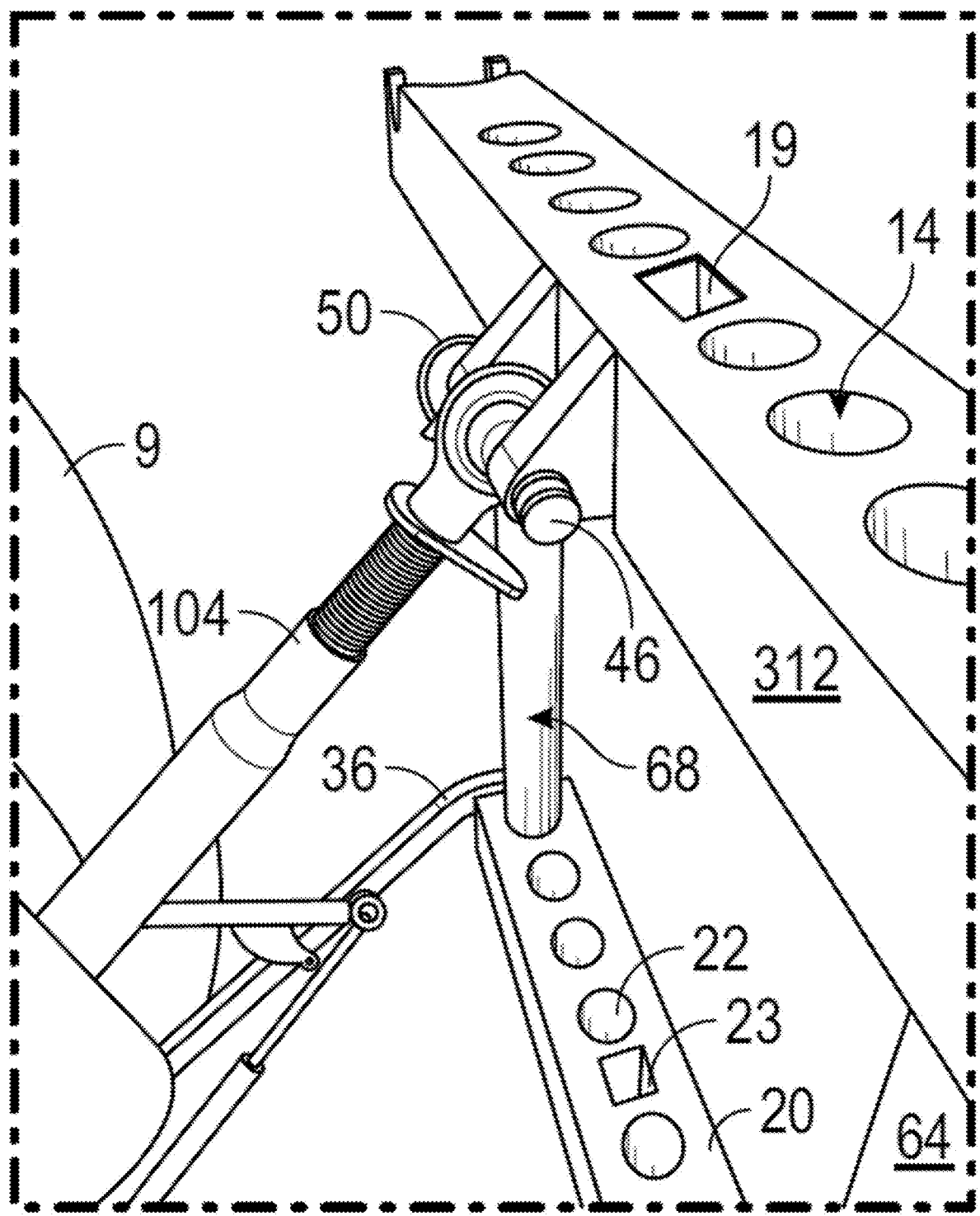
Figure 10A:
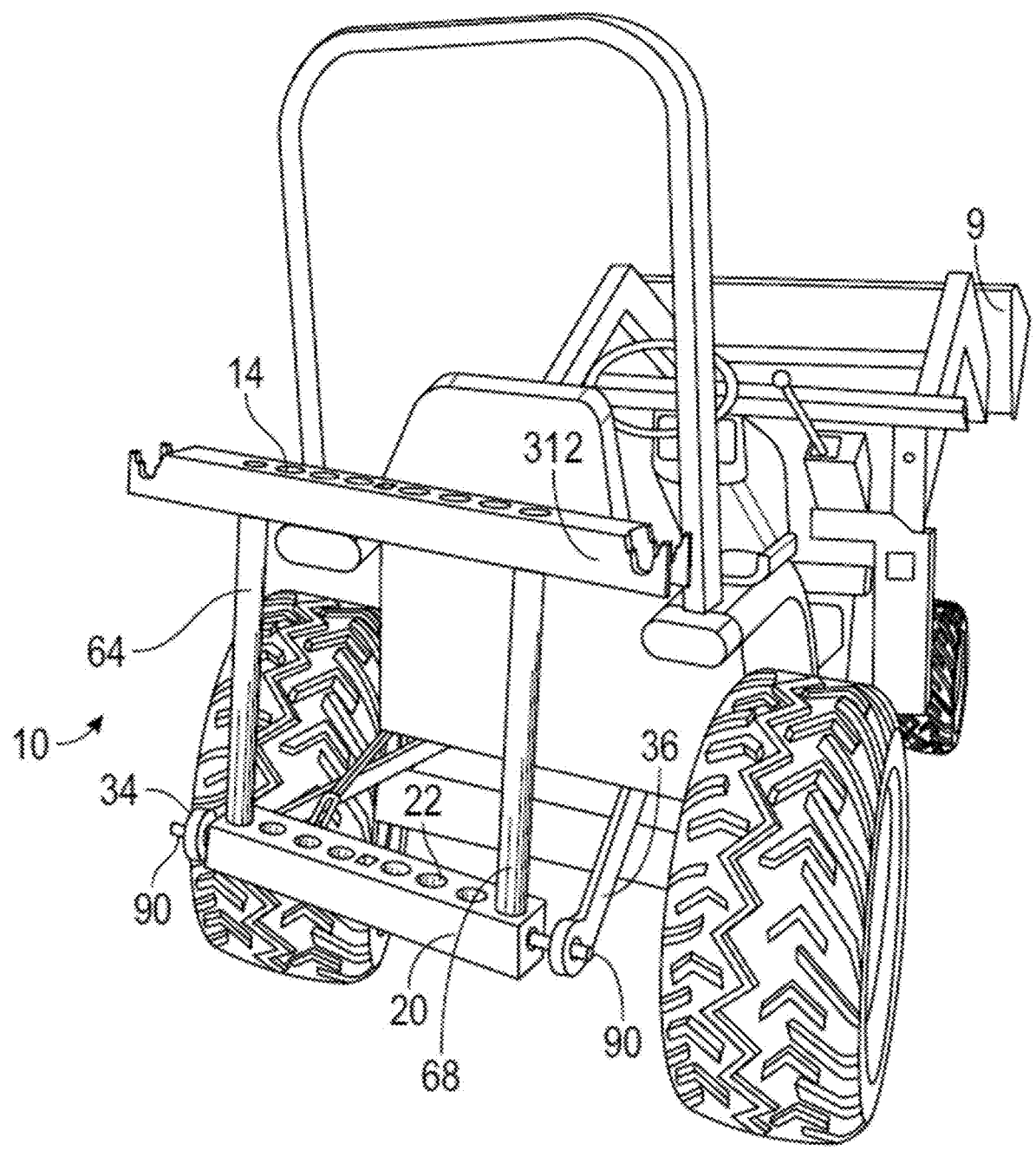
FIGS. 10A-10B: Views of an embodiment of a tool holder attached to the three-point trailer hitch of a tractor, empty (FIG. 10A) and holding lawn and gardening tools and other items (FIG. 10B).
Figure 10B:
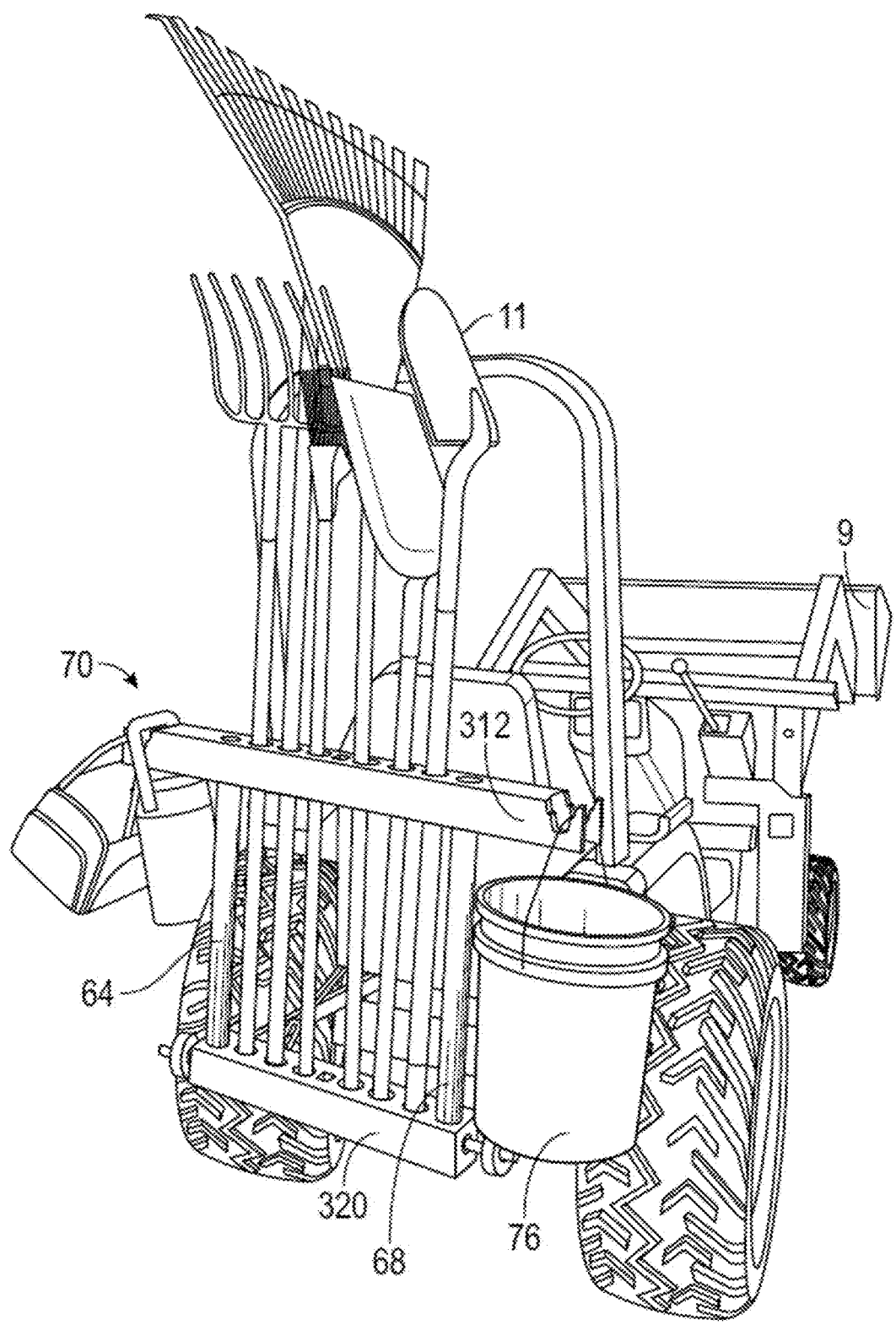

Referring now to FIGS. 4, 9A-9B, the tool holder 70 may not include a top extension 40 as the tool holder 10 depicted in FIGS. 1-3 has. Rather, the tool holder 70 may be attached to the top link 104 of a utility tractor 9 using a locking pin as depicted in FIG. 9B, where the top link 104 is secured to parallel plates 52 through a pin 46 and a pin lock 50. The parallel plates 52 include axially alixed holes 53 configured to receive the pin 46. This is similar to how the top extension 40 of the tool holder 10 depicted in FIGS. 1-3 attaches to the first bar 12 of the tool holder 10.

As with the tool holder 10, the tool holder 70 may be composed of any suitable material including, but not limited to, wood, plastic, metal, or a combination thereof. In one non-limiting example, the tool holder 70 is constructed from PVC. In another non-limiting example, the tool holder 70 is constructed from a polypropylene with 20% glass filler. As another example, the tool holder 70 may be composed of recycled materials such as cardboard. In some embodiments, because the tool holder 70 may be adapted for prolonged outdoor use, the tool holder 70 is composed of a durable waterproof material such as a plastic. However, the materials that the tool holder 70 is made out of are not particularly limited.

The tool holder 70 may also be composed of four pieces with two pin assemblies which are easily assembled and disassembled. Thus, each of the first bar 312, the second bar 320, the first support member 64, the second support member 68, and the double pin bolt assemblies 74 may be packaged in a kit or kits, housed as separate, disconnected pieces (i.e., in a disconnected state) in one or more containers. Advantageously, in this manner, the tool holder 70 may be easily packaged or stored in a small container or space.

Figure 11:
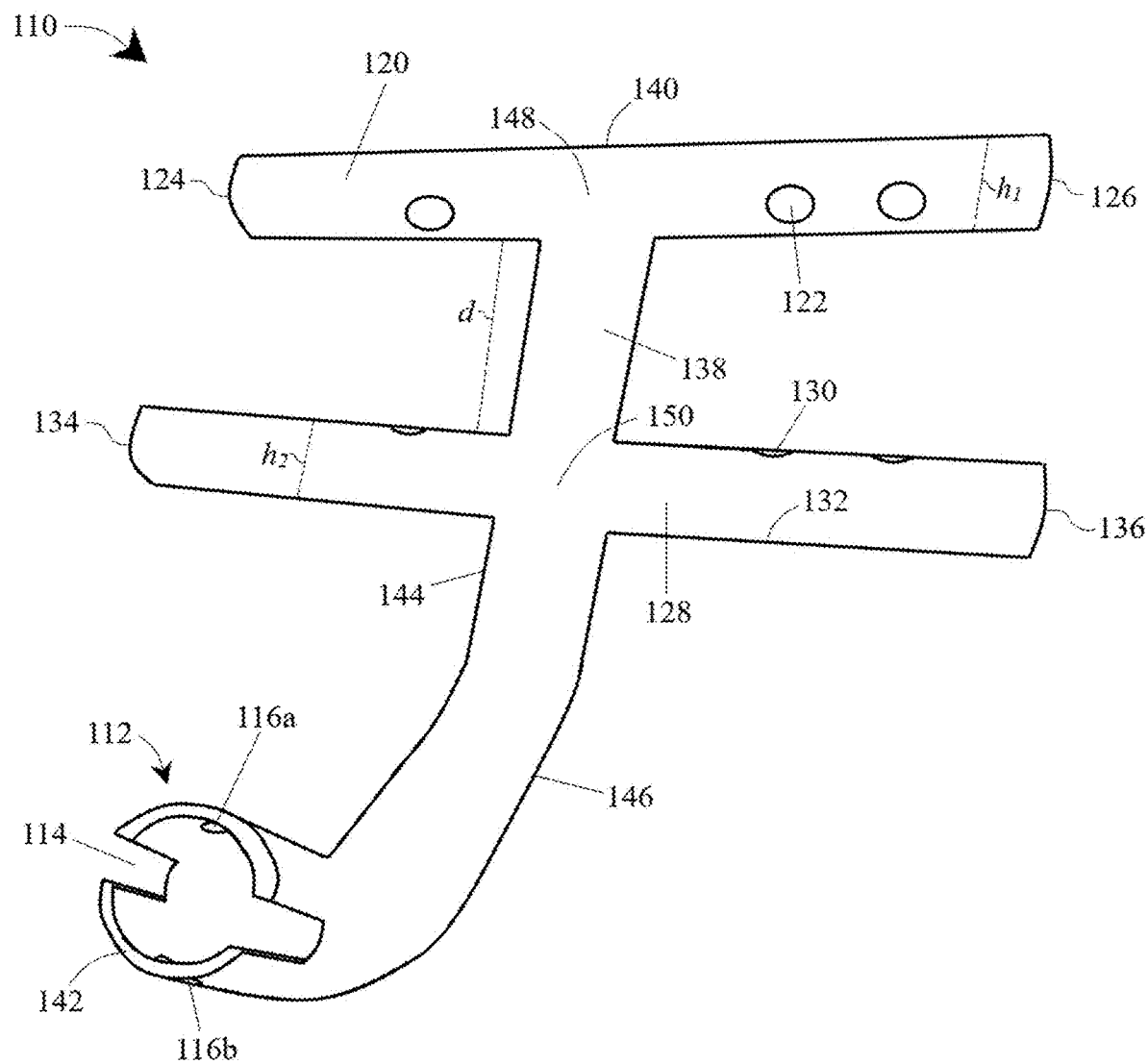
FIG. 11: Schematic illustration of an embodiment of a tool holder in accordance with the present disclosure.
Figure 12:
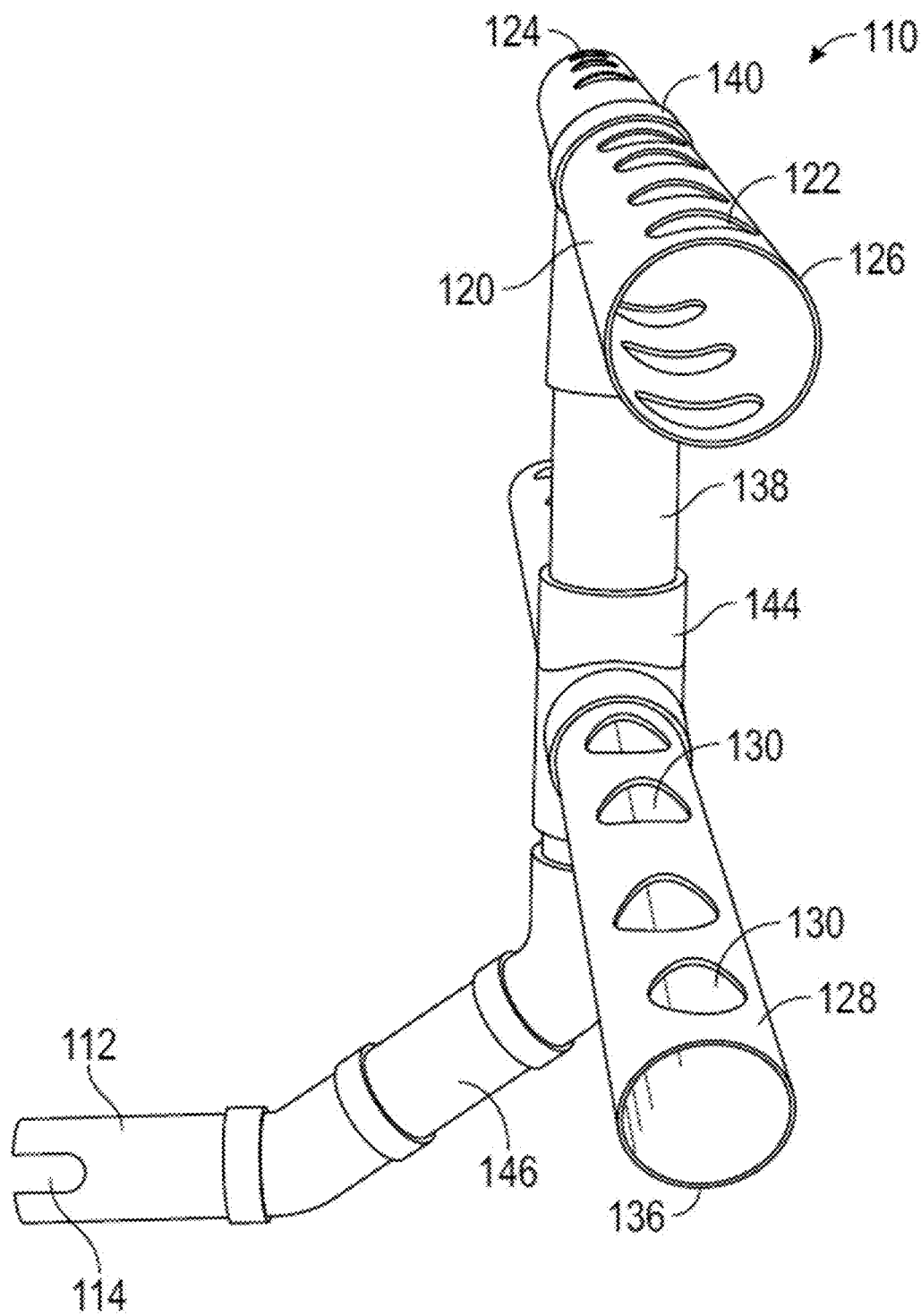
FIG. 12: Side view of an embodiment of a tool holder in accordance with the present disclosure.

Referring now to FIGS. 11-12, an alternative embodiment of a tool holder 110 is depicted. The tool holder 110 may be particularly useful for connecting to an ATV or lawn mower, both of which generally do not have a three-point hitch. The tool holder 110 may be configured to be attached to a regular hitch, as an alternative to the three-point hitch. A regular hitch may include an elongated male member that is configured to be inserted into a female connector and secured with a pin. Accordingly, the tool holder 110 may include a female connector end 112 having a slot 114 and opposing openings 116a, 116b, as shown in FIG. 11. The male member of a regular hitch may be inserted into the slot 114, and a hitch pin may be inserted through the female connector end 112, through the opposing openings 116a, 116b, and through the male member of the regular hitch. A pin lock may be used to secure the hitch pin in place, thereby securing the regular hitch to the female connector end 112. Alternatively, a regular hitch may include a female member that is configured to be connected to a male member and secured through a hitch pin or other fastener. In such embodiments, the tool holder 110 may include a male connector end 113 that does not include a slot, as described in more detail below.

Referring still to FIGS. 11-12, the tool holder 110 may include a first bar 120 having at least one opening 122 therethrough. The opening 122 extends all the way through the height $h_1$ of the first bar. The first bar 120 may extend from a first side 124 to a second side 126. The first bar 120 may be tubular, having a circular or substantially circular cross-section, as seen in FIGS. 11-12. Alternatively, the first bar 120 may have a square or substantially square cross-section, or a rectangular cross-section, as seen in FIGS. 15-19 and discussed in more detail below. The cross-sectional shape of the first bar 120 is not particularly limited, though square or rectangular cross-sections may make the tool holder 110 more compact compared to tubular components.

Referring still to FIGS. 11-12, the tool holder 110 may include a second bar 128 having at least one receiving recess 130 therein. The receiving recess 130 does not extend all the way through the height $h_2$ of the second bar 128, such that the receiving recess 130 includes a floor configured to receive and support the bottom of an implement. The floor may be the bottom surface 132 of the second bar 128. The floor may include one or more center holes therethrough for drainage. The center holes may allow for water to weep out, for example to allow the tool holder 110 to dry out after being exposed to rain. The second bar 128 may extend in a manner that is substantially parallel to, and co-planar with, the first bar 120. However, it is not necessary that the second bar 128 extend in a manner that is substantially parallel to, and co-planar with, the first bar 120. In any event, the at least one receiving recess 130 may be axially aligned with the at least one opening 122 in the first bar 120.

The second bar 128 may extend from a first side 134 to a second side 136. The second bar 128 may include a plurality of receiving recesses 130 therein. In some embodiments, the tool holder 110 includes a plurality of openings 122 in the first bar 120, and a plurality of receiving recesses 130 in the second bar 128, and each of the receiving recesses 130 in the second bar 128 is axially aligned with one of the openings 122 in the first bar 120. The alignment of the openings 122 and the recesses 130 allows for an implement to rest in a receiving recess 130 and be prevented from falling out of the tool holder 110 by the receiving recess 130 and the walls of the opening 122. The openings 122 may be circular, or may have any other shape suitable for receiving an implement. The openings 122 and receiving recesses 130 may hold implements, such as lawn and garden tools. In some embodiments, the plurality of openings 122 may include a slot configured to receive the handle of a D-handle or T-handle tool.

The second bar 128 may be tubular, having a circular or substantially circular cross-section, as seen in FIGS. 11-12. Alternatively, the second bar 128 may have a square or substantially square cross-section, or a rectangular cross-section, as seen in FIGS. 15-20 and discussed in more detail below. The cross-sectional shape of the second bar 128 is not particularly limited, though square or rectangular cross-sections may make the tool holder 110 more compact compared to tubular components.

Referring still to FIGS. 11-12, the tool holder 110 may include a central member 138 that connects the first bar 120 to the second bar 128 with a distance d therebetween. The central member 138 may be an elongated tubular member that extends from a first end 140 to a second end 142. The central member 138 may be tubular, having a circular or substantially circular cross-section, as seen in FIGS. 11-12. Alternatively, the central member 138 may have a square or substantially square cross-section, or a rectangular cross-section, as seen in FIGS. 15-20 and discussed in more detail below. The cross-sectional shape of the central member 138 is not particularly limited, though square or rectangular cross-sections may make the tool holder 110 more compact compared to tubular components.

Referring again to FIG. 11, the second end 142 of the central member 138 may terminate in the female connector end 112, which may include the slot 114. The slot 114 may be configured to receive a male member of a hitch. The female connector end 112 may further include the opposing openings 116a, 116b, which may be configured to receive a hitch pin. In one non-limiting example, the female connector end 112 may be a square aluminum female connector end that is configured to receive any type of male member. The female connector end 112 may slide over the male member and be secured with a fastener through the opposing openings 116a, 116b.

The central member 138 may define an L-shape, or otherwise have a curvature such that the second end 142 is axially displaced from the openings 122 and recesses 130. The central member 138 may have a straight section 144 in which the first bar 120 and the second bar 128 are attached, and a curved section 146 between the second bar 128 and the second end 142, which terminates at the second end 142. In this manner, the first bar 120 and the second bar 128 may be substantially parallel but also co-planar whereas the second end 142 is not co-planar with the first bar 120 and the second bar 128. Within the straight section 144, the central member 138 may define a top section 148 where the first bar 120 intersects or is connected to the central member 138, and a middle section 150 where the second bar 128 intersects or is connected to the central member 138.

Figure 13:
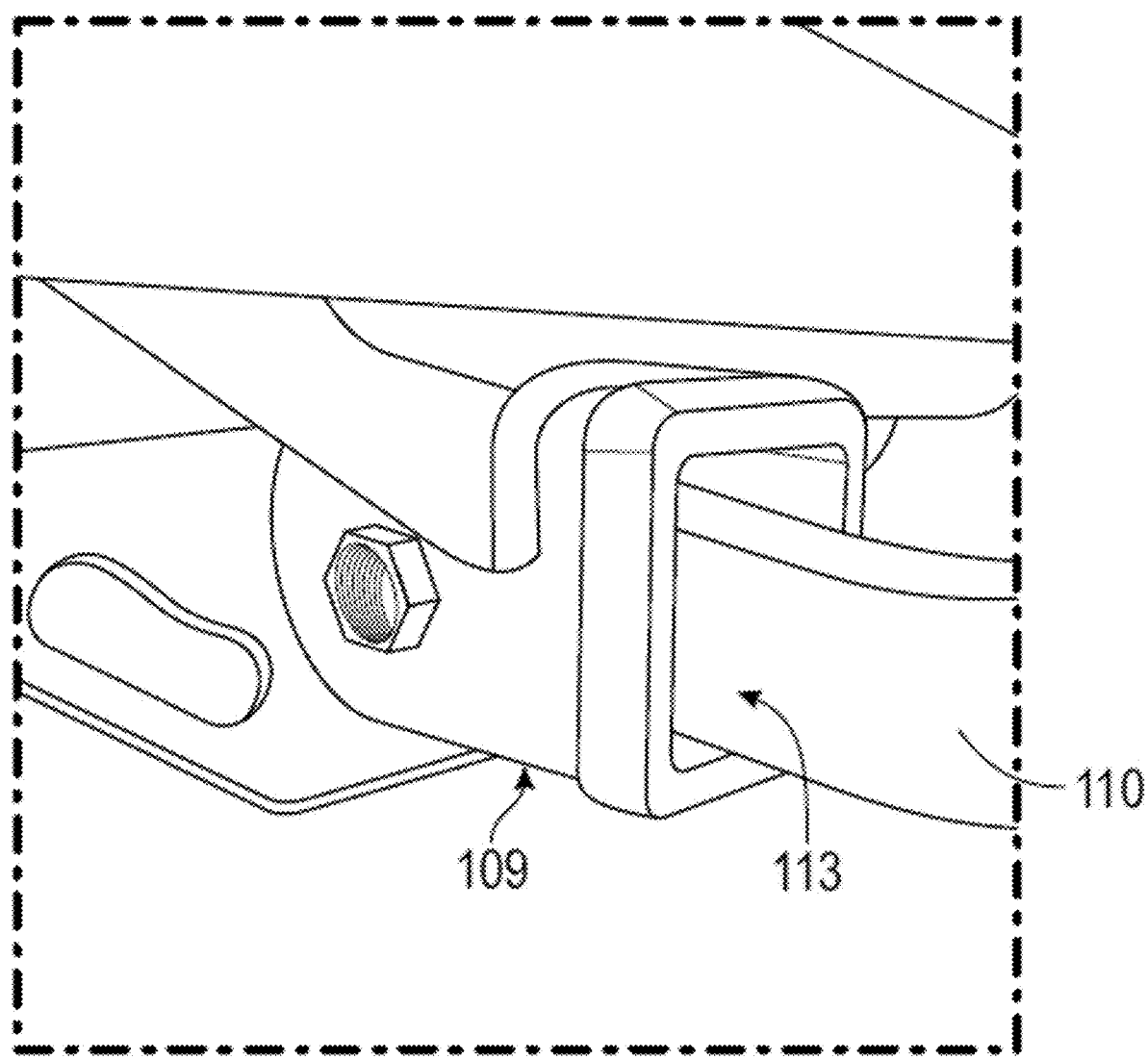
FIG. 13: View of a tool holder fitting into a standard ATV hitch.

In an alternative embodiment, the tool holder 110 may be hitched by fitting into a standard ATV or lawn mower receiver 109. A standard ATV receiver 109 is depicted in FIG. 13, in which the tool holder 110 is shown fitting therein. In this embodiment, the tool holder 110 may include a male connector end 113 having a square cross section, instead of the female connector end 112. The male connector end 113 can slide into a standard ATV or lawn mower receiver 109. Then, the male connector end 113 may simply be bolted from the side, through one side of the ATV receiver 109, then through the male connector end 113, and then through the other side of the ATV receiver 109, so as to be held in place. It is understood that the standard ATV or lawn mower receiver 109 may come in different sizes, such as a 1¼" size or a 2" size. However, the tool holder 110 may be customized for any size of ATV or lawn mower receiver 109. For example, the male connector end 113 may be sized to fit into a 1¼" ATV or lawn mower receiver 109, or to fit into a 2" ATV or lawn mower receiver 109. Moreover, the tool holder 110 may further include a hitch extension piece that may serve as an adapter between the tool holder 110 and the ATV or lawn mower receiver 109 in the event that the ATV or lawn mower receiver 109 is a different size than the male connector end 113 is configured to fit into. For example, the hitch extension piece may simply have a first end that fits over the male connector end 113, and can be secured thereto, and a second end that fits into the ATV receiver 109, and can be secured thereto.

Figure 14:
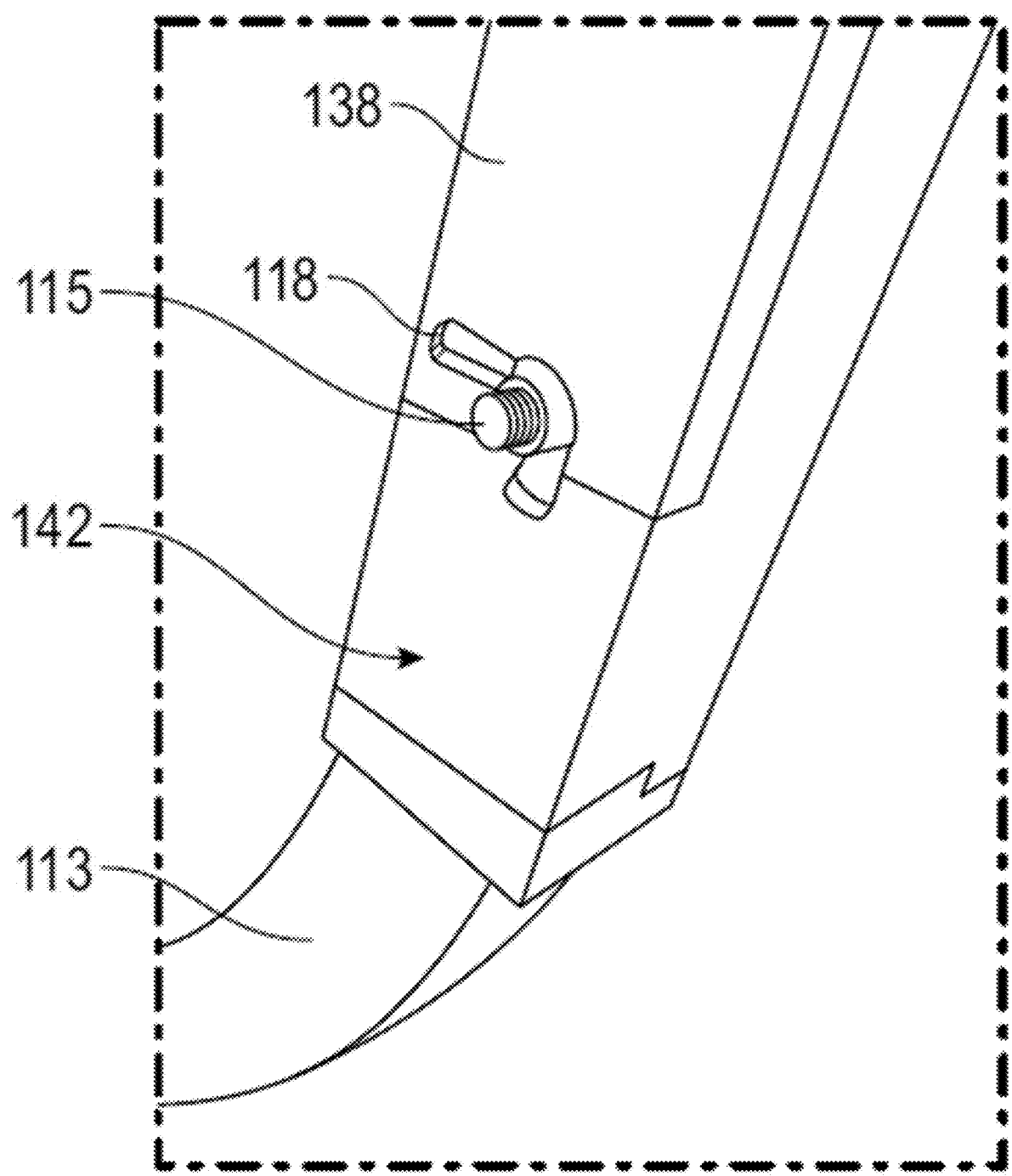
FIG. 14: View of a removable male connector end attached to a central member in an embodiment of a tool holder in accordance with the present disclosure.

As seen in FIG. 14, the male connector end 113 may be removable from, and fastenable to, the central member 138. In one non-limiting example, depicted in FIG. 14, the male connector end 113 may be a curved piece that can slide into the second end 142 of the central member 138, and may be secured thereto with a bolt 115 or other fastener. The bolt 115 may be held in place with a nut 118. Thus, the tool holder 110 may include a central member 138 that may slide over the male connector end 113 and then may be fastened. In other embodiments, the central member 138 may be a single, unitary piece.

The tool holder 110 may be composed of any suitable material including, but not limited to, wood, plastic, metal, or a combination thereof. In one non-limiting example, the tool holder 110 is constructed out of PVC. As another example, the tool holder 110 may be composed of recycled materials such as cardboard. In some embodiments, because the tool holder 110 may be adapted for prolonged outdoor use, the tool holder 110 is composed of a durable waterproof material such as a plastic. However, the materials that the tool holder 110 is made out of are not particularly limited. Also, different components of the tool holder 110 may be made from different materials. For example, in one non-limiting example, the central member 138 is plastic and the male connector end 113 is metal.

The tool holder 110 may be composed of modular pieces which are easily assembled and disassembled. For example, the central member 138 may include includes openings that the first bar 120 and the second bar 128 may slide into and through. Furthermore, the female connector end 112, or the male connector end 113, may be removable from the central member 138. Thus, each of the first bar 120, the second bar 128, the central member 138, and/or the female connector end 112 or the male connector end 113, may be packaged in a kit or kits, housed as separate, disconnected pieces (i.e., in a disconnected state) in one or more containers. Moreover, such kits may include both a female connector end 112 and a male connector end 113 so as to make the tool holder 110 more versatile. In such an embodiment, the tool holder 110 may be adapted for connecting to different types of hitches simply by selecting the desired type of connector end and attached it to the central member 138. Advantageously, the tool holder 110 may be easily packaged or stored in a small container or space.

Referring now to FIGS. 15-22, an alternative embodiment of a tool holder 164 configured for attachment to an ATV 170 or lawn mower 168 is depicted. In this embodiment, the tool holder 164 is similar to the tool holder 110 depicted in FIGS. 11-15, but has the additional feature of being able to hitch and tow a wagon or other trailer 166, and also utilizes the same first bar 312 and second bar 320 depicted in FIGS. 5-6. Thus, the tool holder 164 includes end cutouts 72a, 72b for carrying handles or straps 78 or other items. The axially aligned square opening 19 of the first bar 312 and square bore 23 of the second bar 320 are utilized to receive the central member 138. The central member 138 may be formed from square tubing to fit snugly within the square opening 19 and square bore 23. A first fastener 172, such as a bolt with a locking nut, may secure the first bar 312 in place on the central member 138, and a second fastener 174, such as a bolt with a locking nut, may secure the second bar 320 in place on the central member 138. Thus, the tool holder 164 differs from the tool holder 70 not only in the type of hitch connection, but also in that the tool holder 164 includes a central member 138. The tool holder 164 may also include the same first and second support members 64, 68 as the tool holders 10, 70 depicted in FIGS. 1-11.

In some embodiments of the tool holder 164, the orientation of the first bar 312 is flipped compared to the first bar 312 in the tool holder 70 depicted in FIGS. 5-11. Specifically, the tool holder 164 may include the first bar 312 where the parallel plates 52 are on the rear side of the tool holder 164, facing away from the lawn mower 168 or ATV 170. However, this is not strictly necessary.

Figure 16:
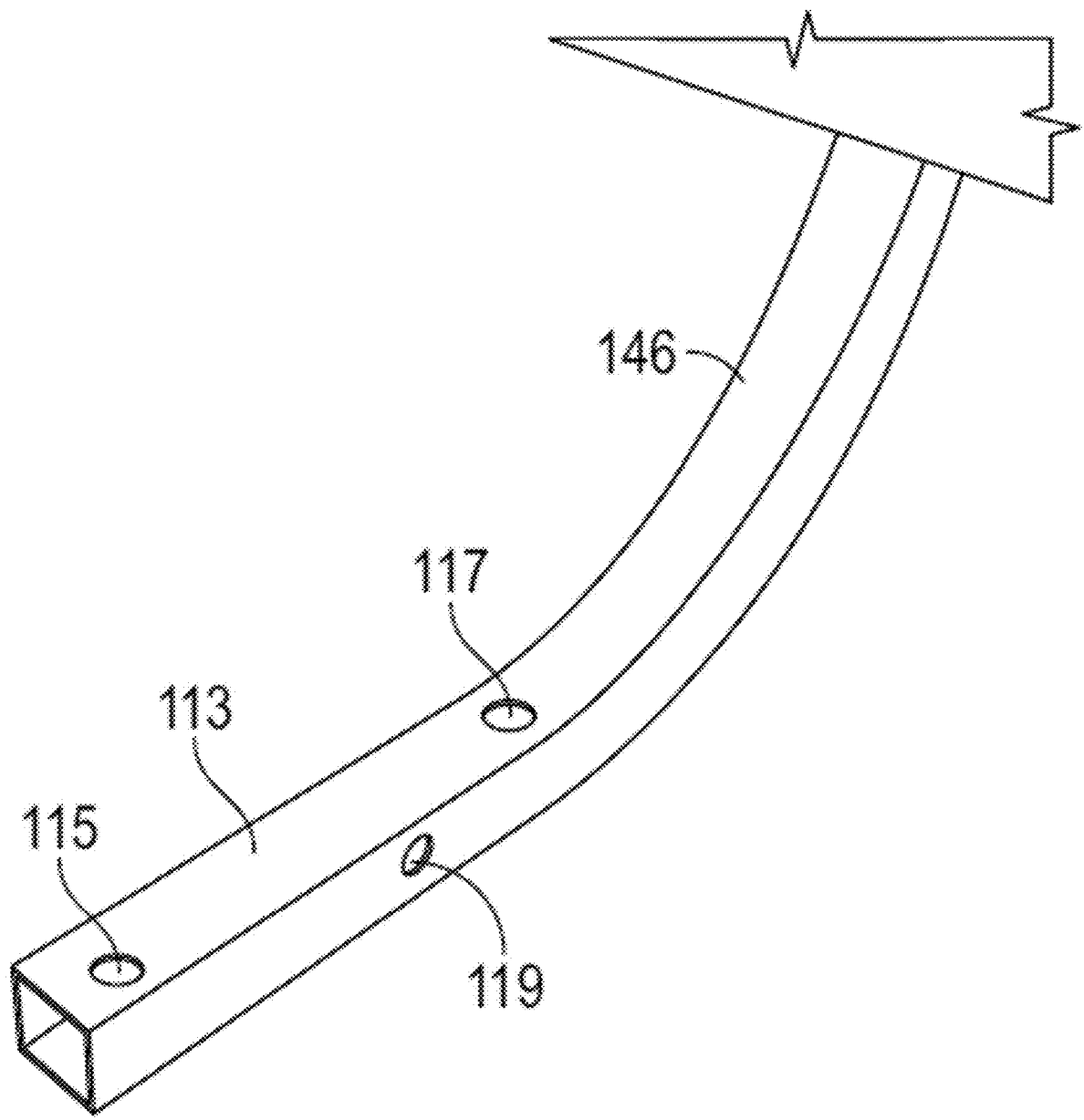
FIG. 16: Perspective view of the male connector end of the central member of the tool holder depicted in FIG. 15.
Figure 19A:
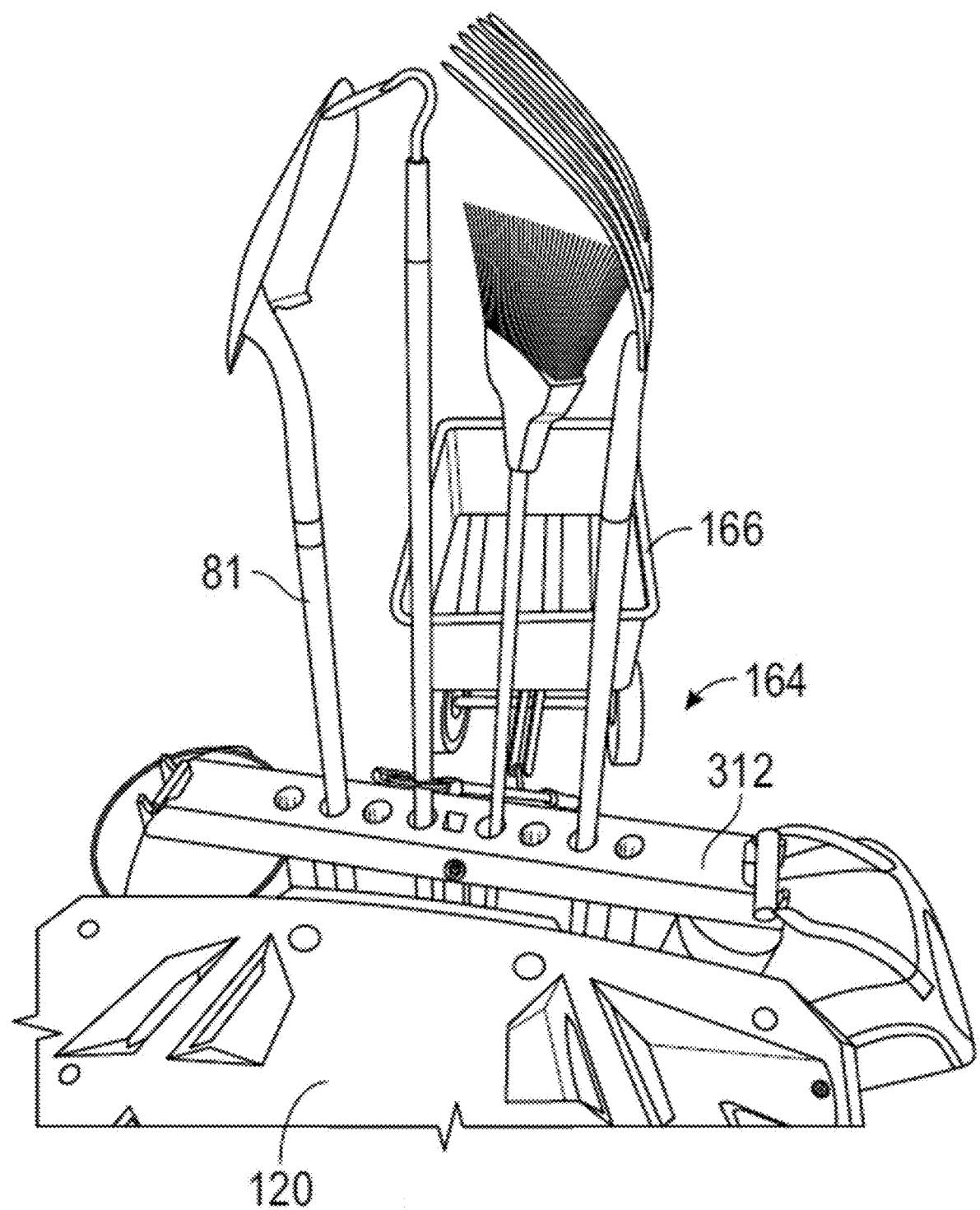
FIGS. 19A-19B: Views of an embodiment of a tool holder mounted to an ATV and towing a wagon.
Figure 19B:
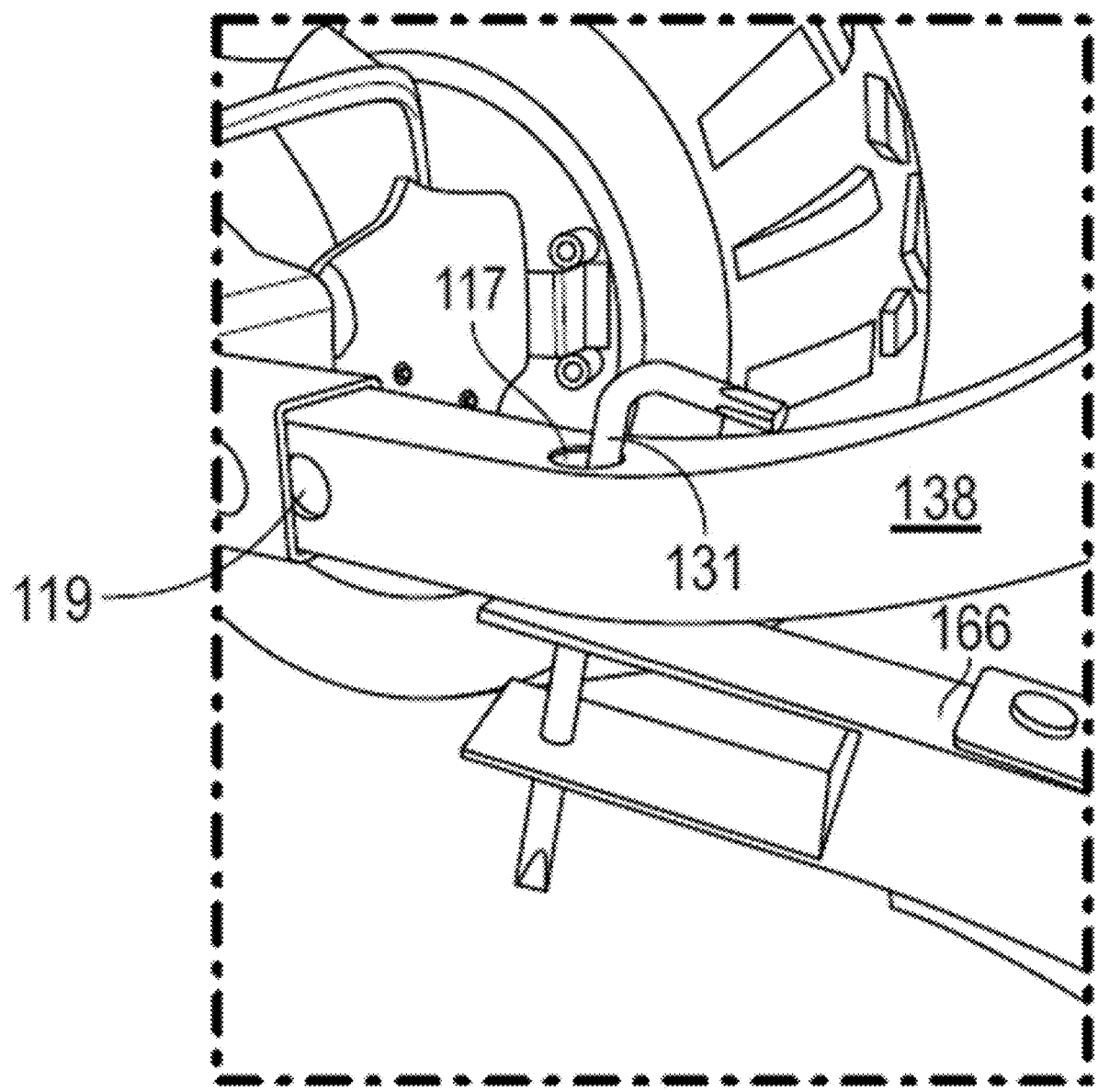
Figure 20:
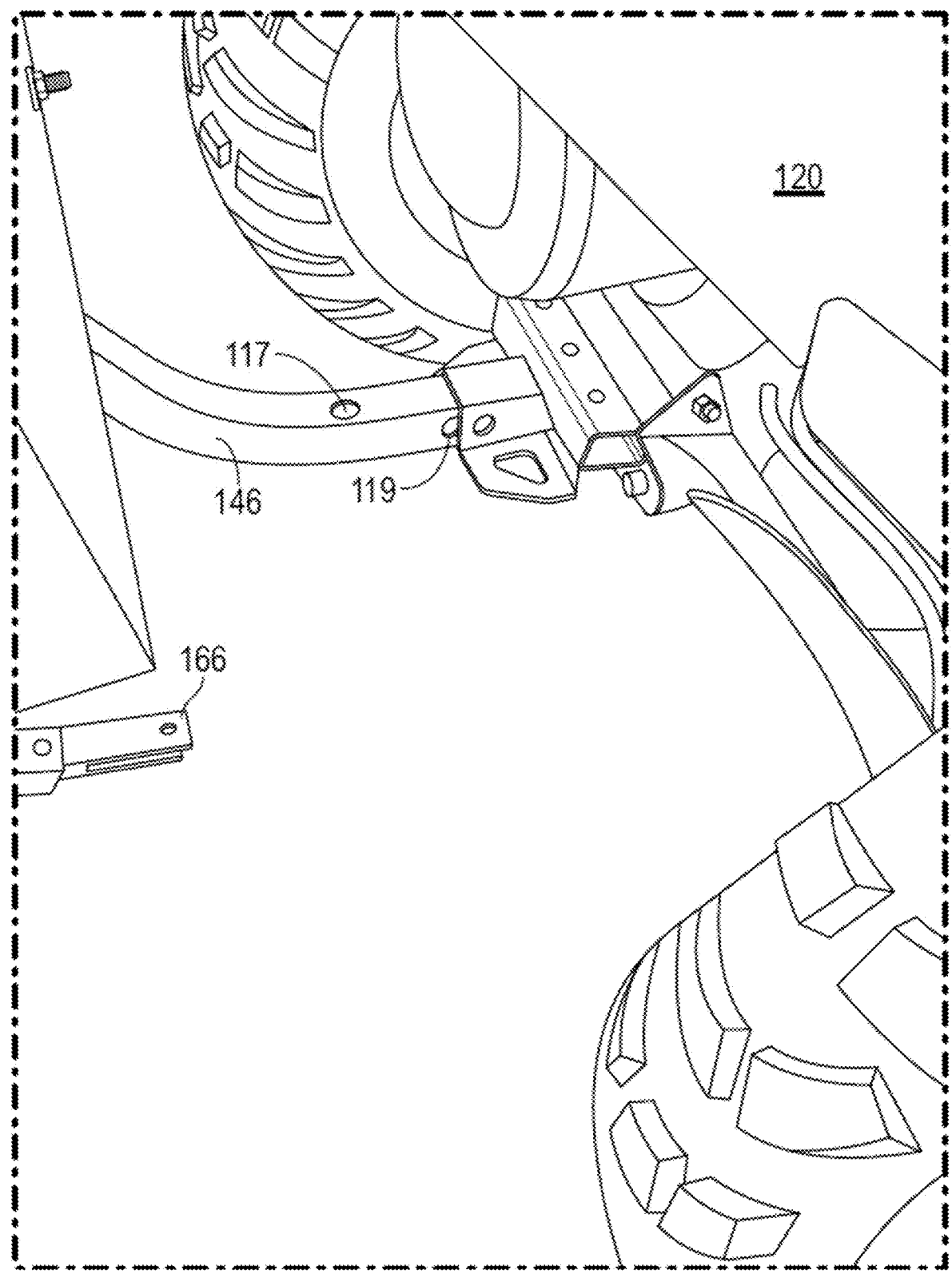
FIG. 20: View of a tool holder attached to a hitch of an ATV.

Referring now to FIGS. 16, 19B, the central member 138 may include a first vertical hole 115 at the male connector end 113, and a second vertical hole 117 disposed closer to the curved section 146. The central member 138 may further include a horizontal hole 119 disposed between the first vertical hole 115 and the second vertical hole 117. The male connector end 113 may be open at the end opposite the curved section 146, or may be solid. The holes 115, 117, 119 may extend all the way through the male connector end 113. The first vertical hole 115 and/or the horizontal hole 119 may be utilized to connect the central member 138 to a hitch, such as the hitch of an ATV 170 or lawn mower 168. The second vertical hole 117 may be utilized for connecting a trailer or wagon 166 to be towed. Any suitable hitching fastener 131 can be inserted into the second vertical hole 117 to hitch a trailer or wagon 166 to be towed, as shown in FIG.

Figure 15:
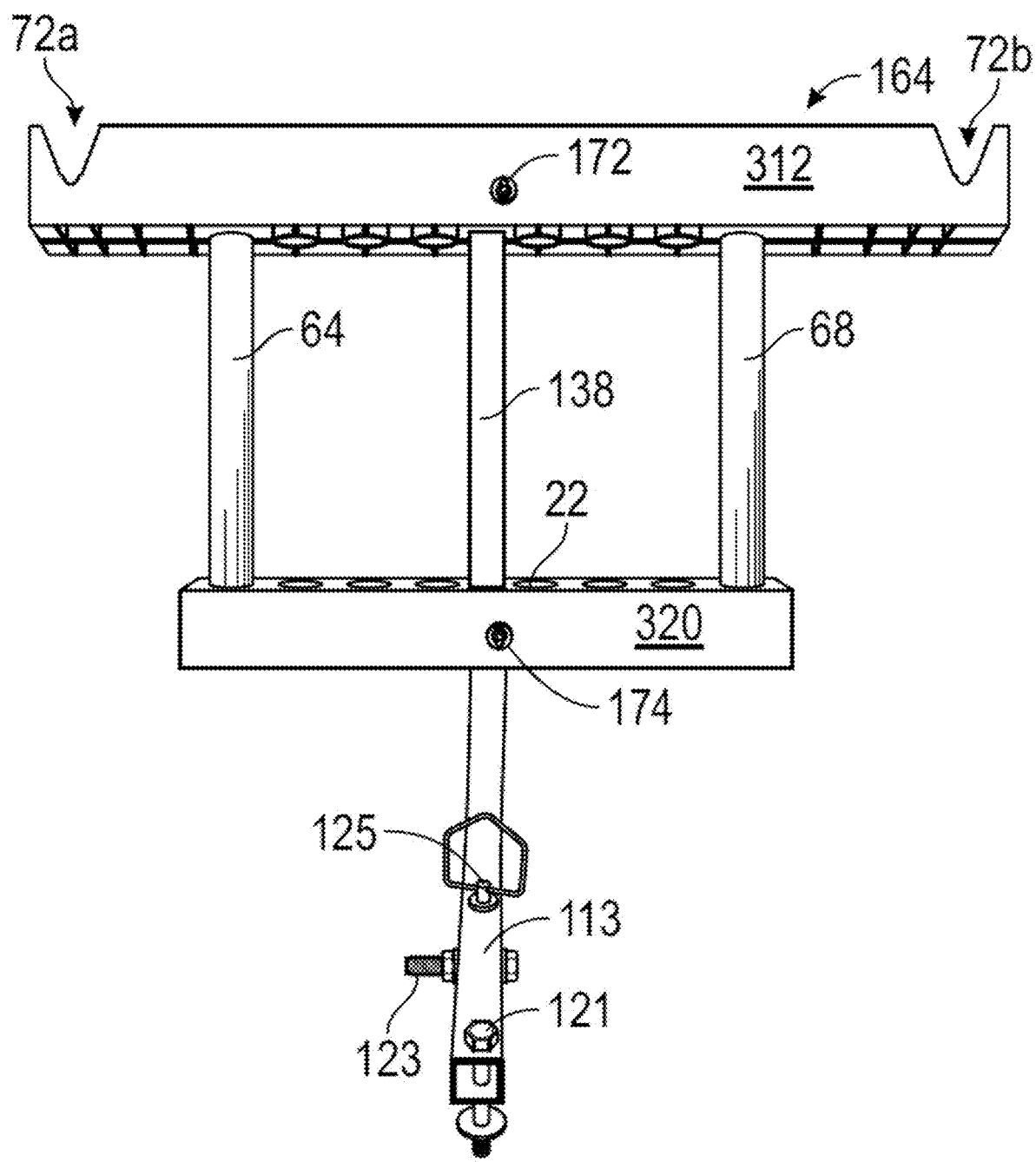
FIG. 15: Front view of an embodiment of a tool holder in accordance with the present disclosure.

19B. In this manner, the tool holder 164 may not preclude the lawn mower 168 or ATV 170 from towing an additional wagon or trailer 166 despite being connected to the hitch of the lawn mower 168 or ATV 170. For illustration purposes, FIG. 15 shows bolts 121, 123 in the first vertical hole 115 and the horizontal hole 119, and a pin 125 in the second vertical hole 117.

Figure 17:
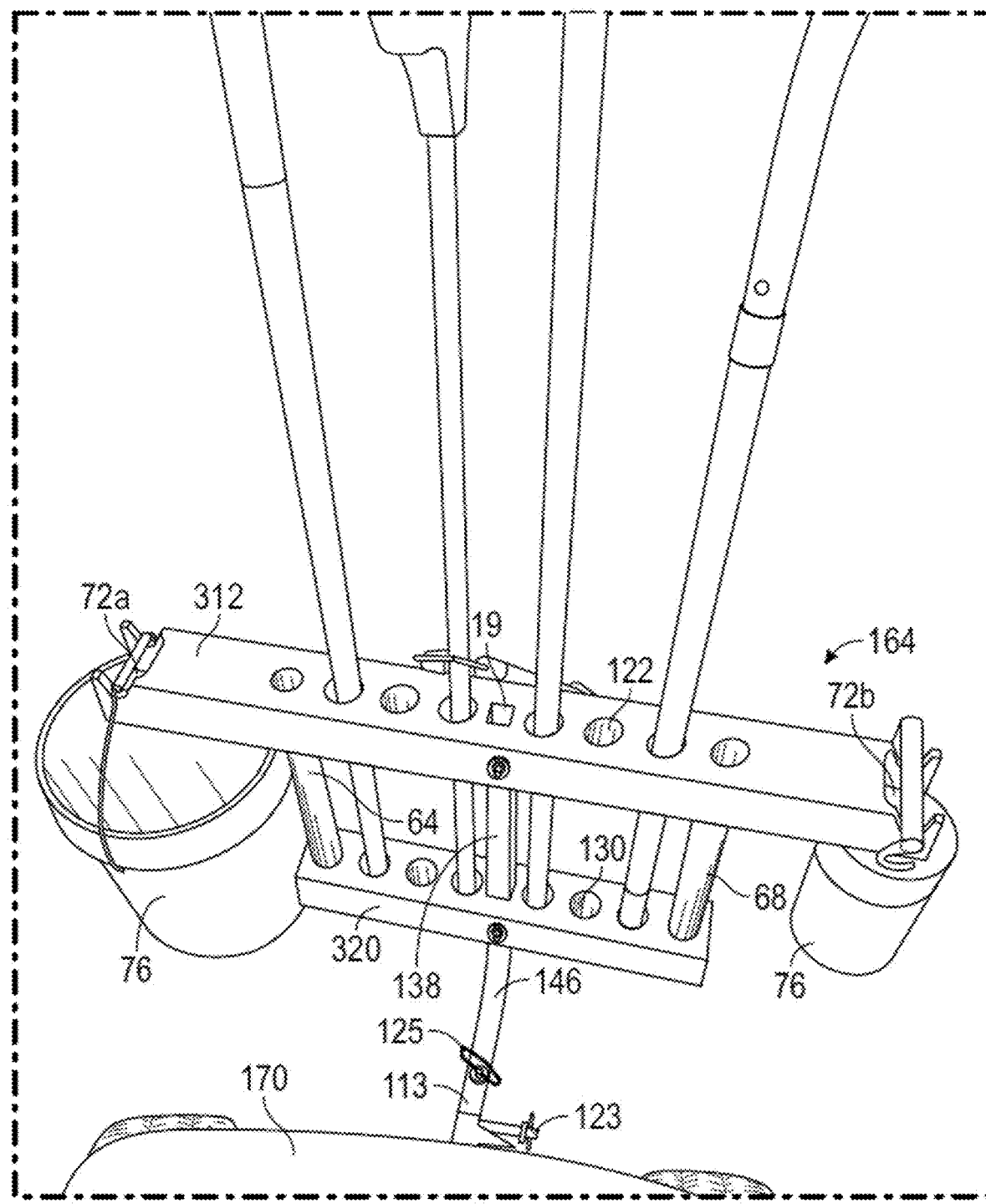
FIG. 17: Front view of the tool holder depicted in FIG. 15 connected to a lawn mower of ATV.
Figure 18A:
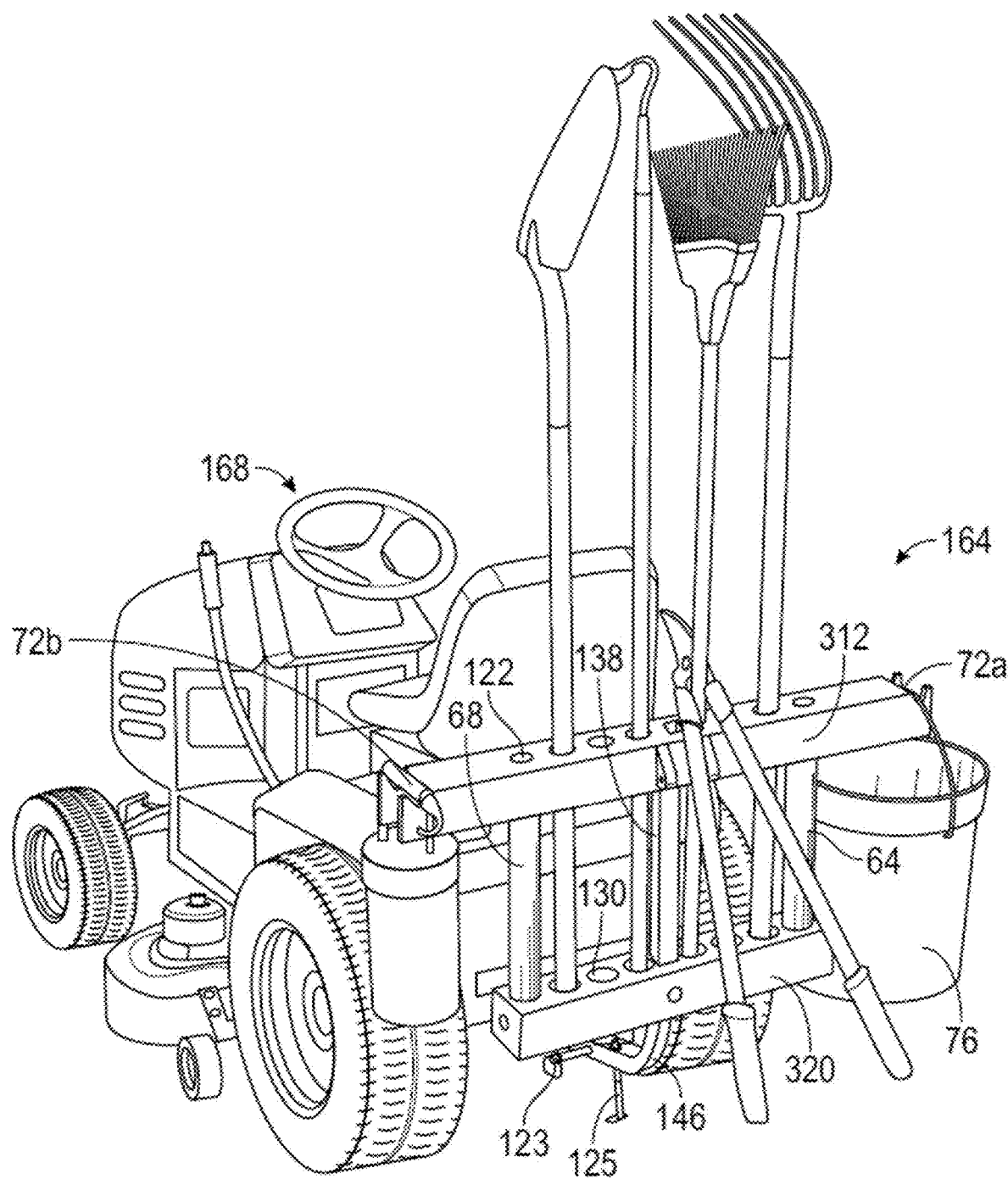
FIGS. 18A-18B: Rear views of the tool holder depicted in FIG. 15 mounted to a lawn mower (FIG. 18A) and an ATV (FIG. 18B).
Figure 18B:
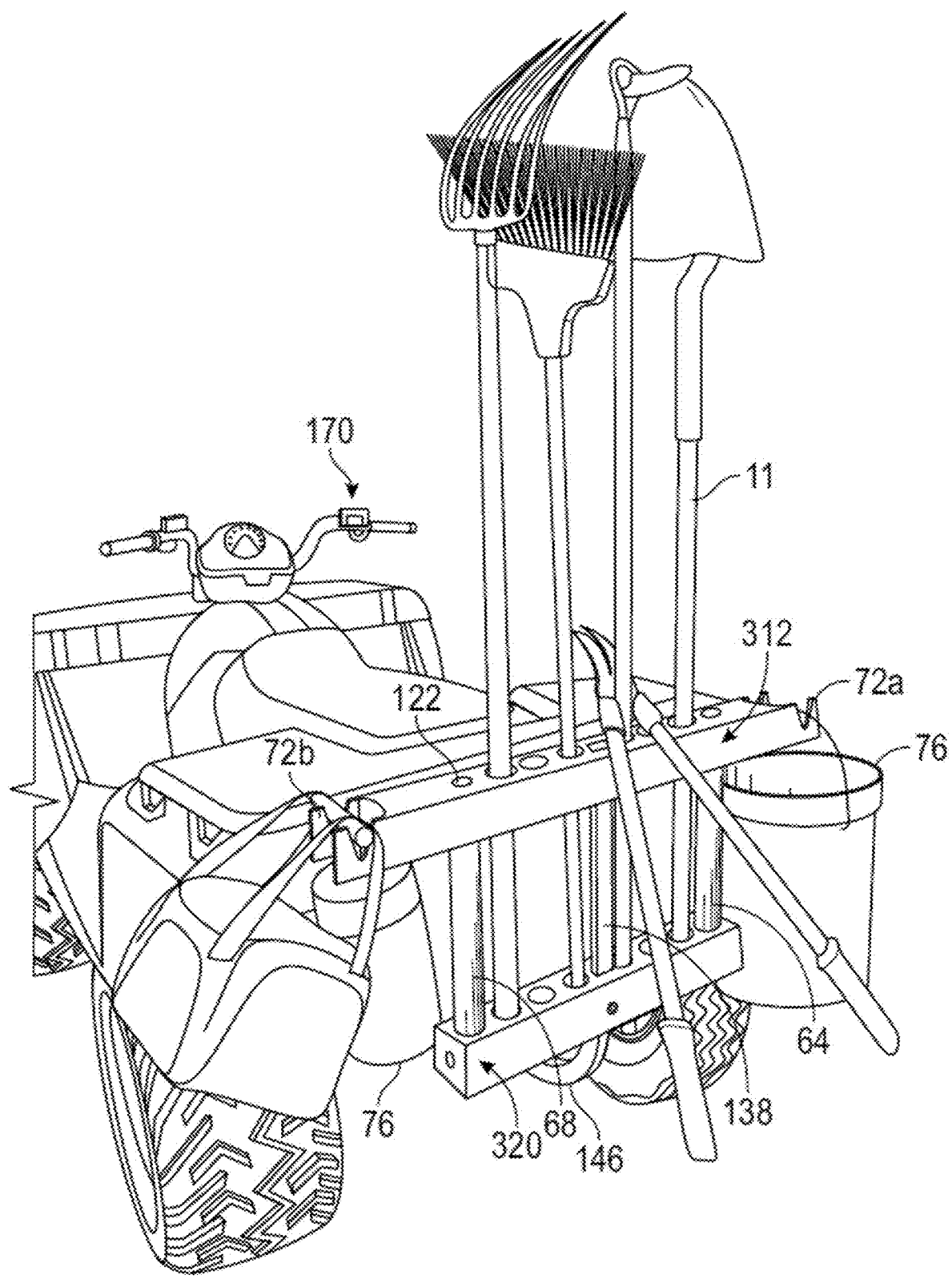

FIGS. 17-18 show the tool holder 164 carrying lawn and garden tools 11 on an ATV 170 or lawn mower 168, and FIGS. 19A-19B show the tool holder 164 towing a wagon 166 behind the tool holder 164 on an ATV 170.

In certain embodiments, when set on the back of a lawn mower 168 or other vehicle that does not have a receiver, the tool holder 110, 164 may simply be set on a thinner plate, and a bolt may be attached through the first vertical hole 115 to secure the tool holder 110, 164 in place. However, there is a possibility that the metal hitch may rotate while the tool holder 110, 164 is attached thereto. Therefore, referring now to FIGS. 21-22, in order to prevent or limit such rotation, provided herein are embodiments of a washer 152 with triangular ears 154a, 154b. As shown in FIGS. 17-18, the triangular ears 154a, 154b of the washer 152 may serve to prevent or limit the hitch 166 from rotating while the tool holder 110 is attached thereto.

Figure 21:
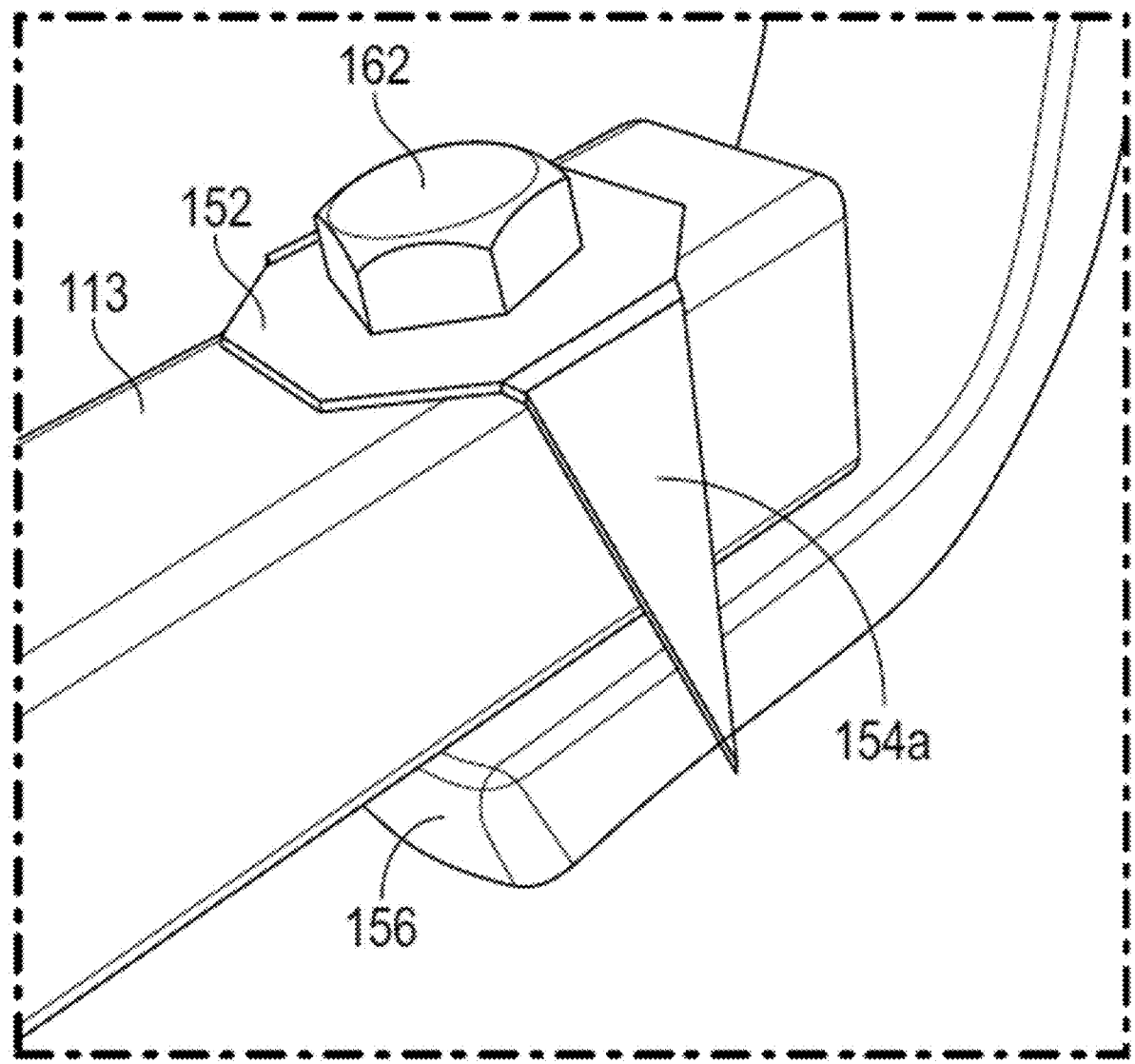
FIG. 21: View of an embodiment of a washer with triangular ears being used to lock a tool holder in place on a hitch.
Figure 22:
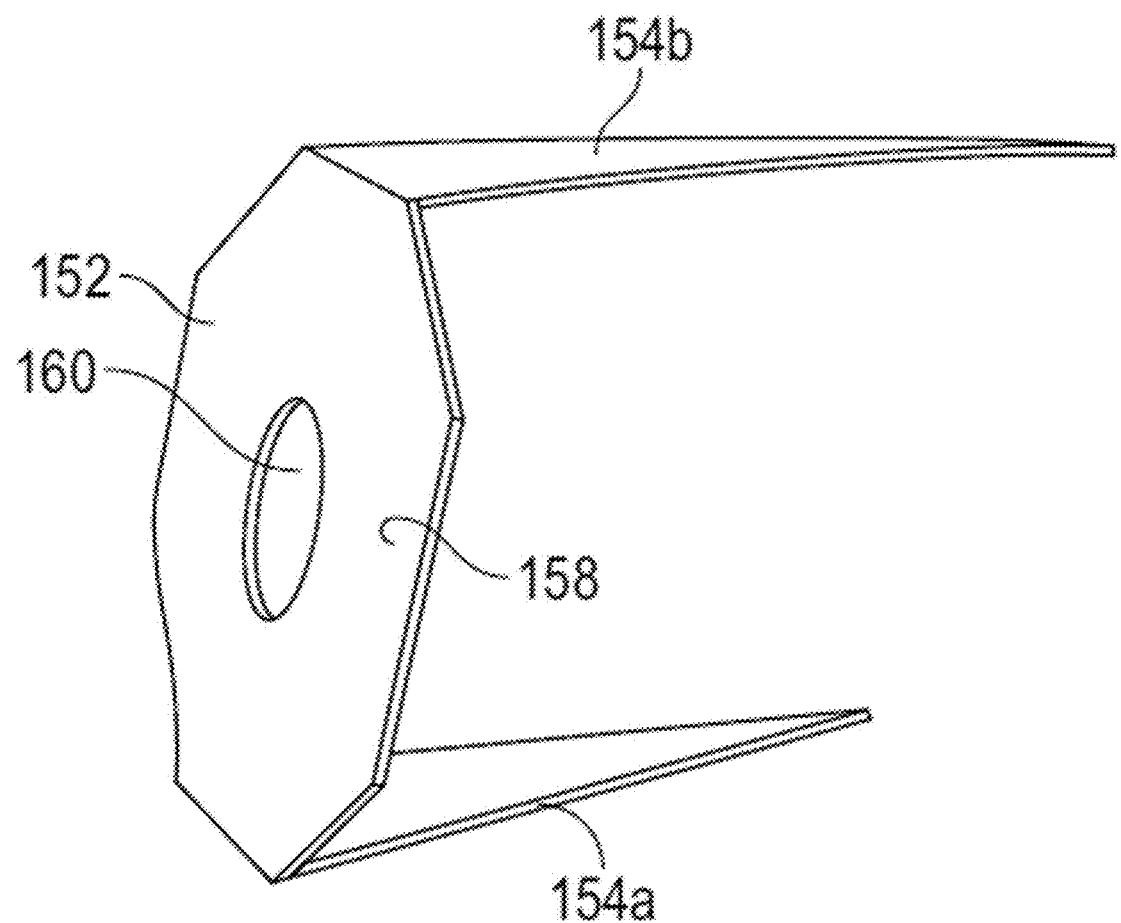
FIG. 22: Perspective view of the embodiment of the washer with triangular ears shown in FIG. 18 in isolation.
Figure 23:
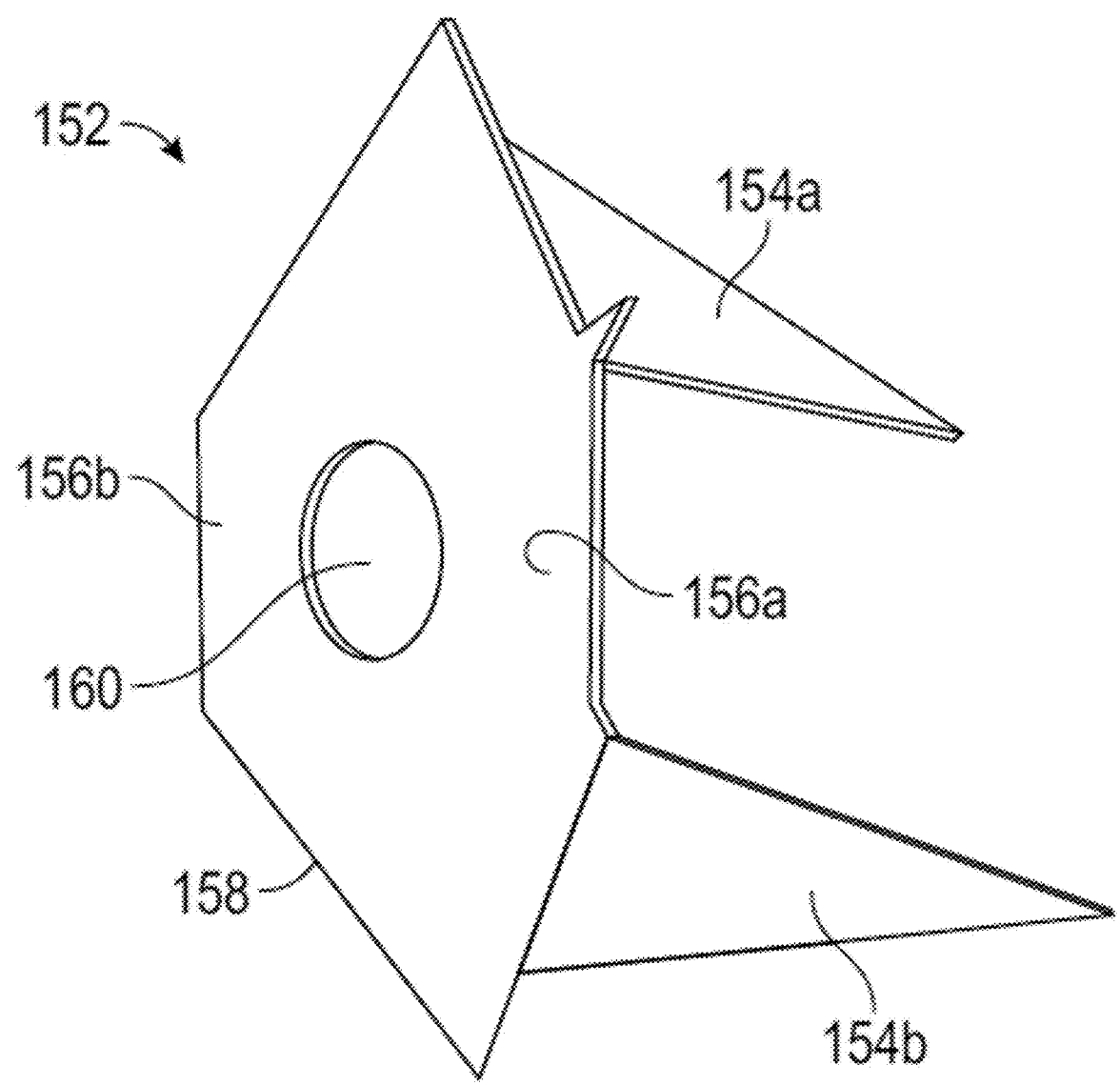
FIG. 23: View of an alternative embodiment of a washer with triangular ears.
Figure 24:
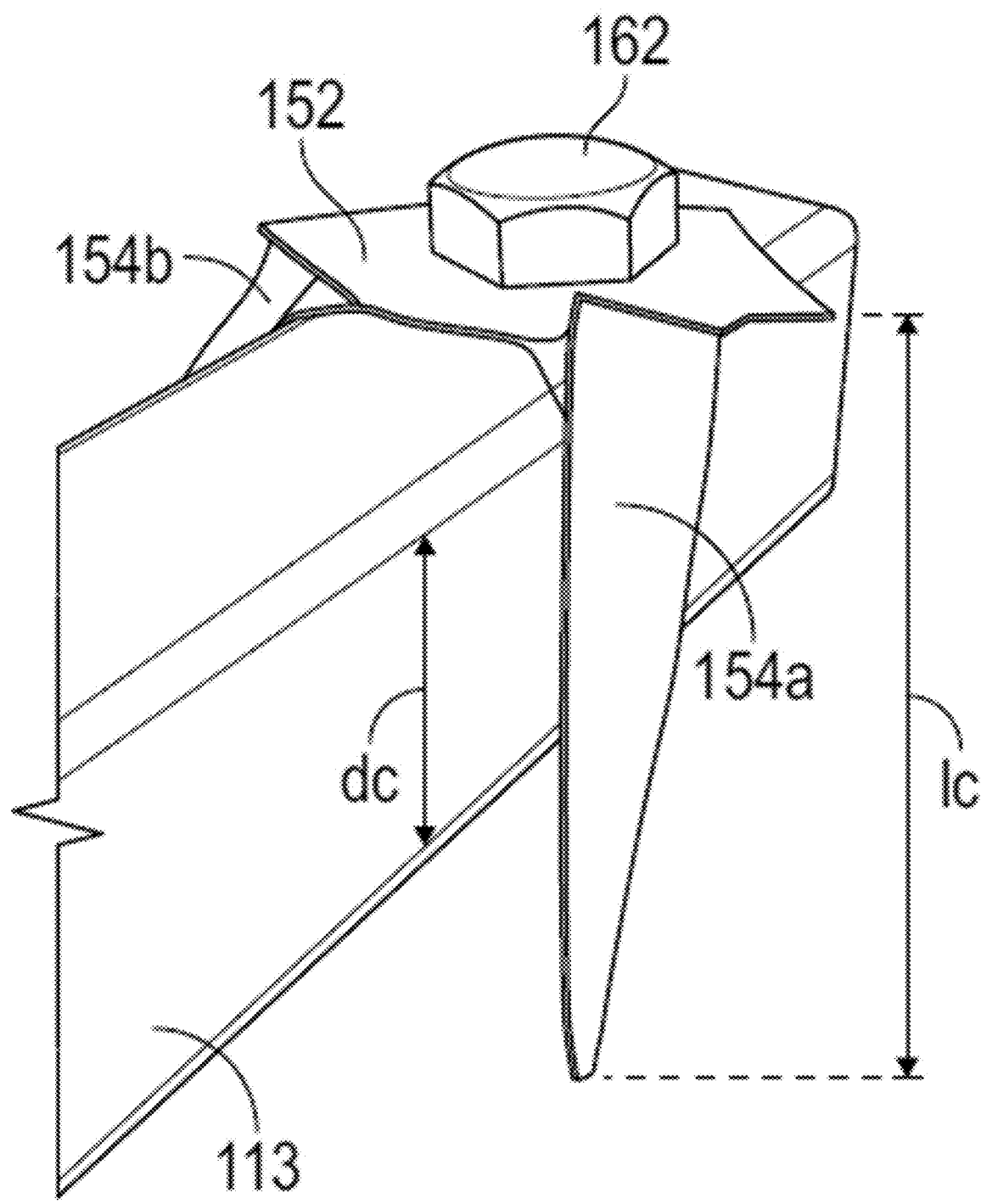
FIG. 24: View of the embodiment of the washer with triangular ears depicted in FIG. 23 being used to lock a tool holder in place on a hitch.
Figure 25:
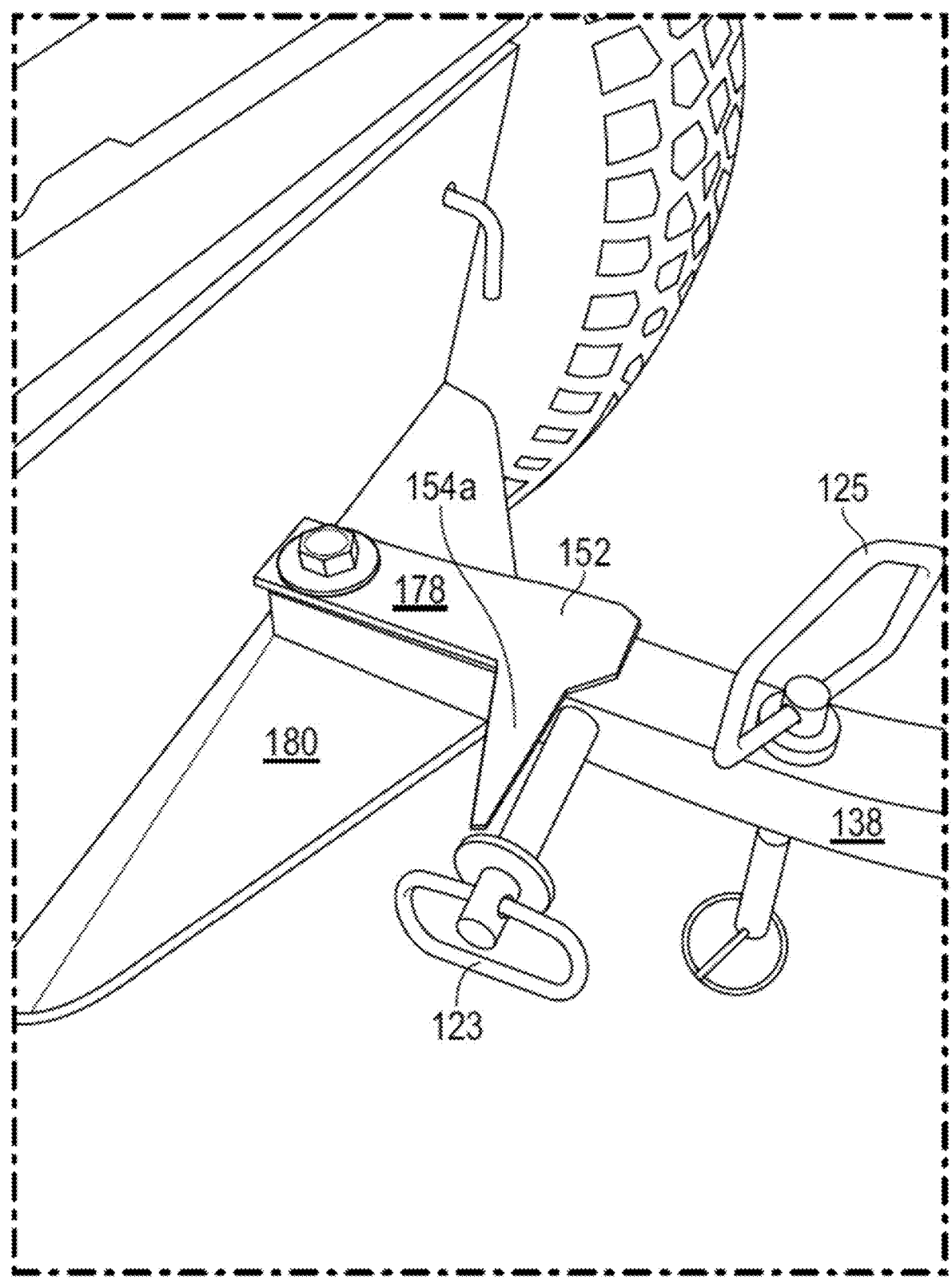
FIG. 25: View of an embodiment of a washer with triangular ears having an extended top section being used to lock a tool holder in place on a hitch plate.

FIG. 23 shows a view of a tool holder 110 held in place on a hitch with a washer 152 having triangular ears 154a, 154b. FIGS. 18-22 depict a first embodiment of a washer 152 having triangular ears 154a, 154b, FIGS. 23-24 depict a second embodiment of a washer 152 having triangular ears 154a, 154b, and FIG. 25 depicts a third embodiment of a washer 152 having triangular ears 154a, 154b. The triangular ears 154a, 154b of the washer 152 may be on opposing halves 156a, 156b of the washer 152 (as seen in FIGS. 21-22), or may both be on the same (i.e., first) half 156a of the washer 152 (as seen in FIGS. 23-24).

The washer 152 may include a center plate 158 having a hole 160 therethrough configured to receive a bolt 162 or other fastener. In some embodiments, the washer 152 is attached using the bolt 123 in the horizontal hole 119. In use, the triangular ears 154a, 154b of the washer 152 extend down from the center plate, over the sides of the hitch 166 so as to prevent rotation of the hitch 166 with respect to the tool holder 110. Thus, the triangular ears 154a, 154b of the washer 152 may have a length $l_e$ that is at least the diameter de of the male connector end 113 of the tool holder 110, as shown in FIG. 24.

FIG. 25 depicts an embodiment of the washer 152 in use with the tool holder 164. Referring now to FIG. 25, the washer 152 may include an extended top section 178 to accommodate the shape of a hitch plate 180. The extended top section 178 may provide for better attachment to the hitch plate 180.

In any embodiment, the washer 152 may be made from any suitable washer material. In one non-limiting example, the washer 152 is punched out of a suitable metal. In other embodiments, the washer 152 is plastic or wood.

Figure 26:
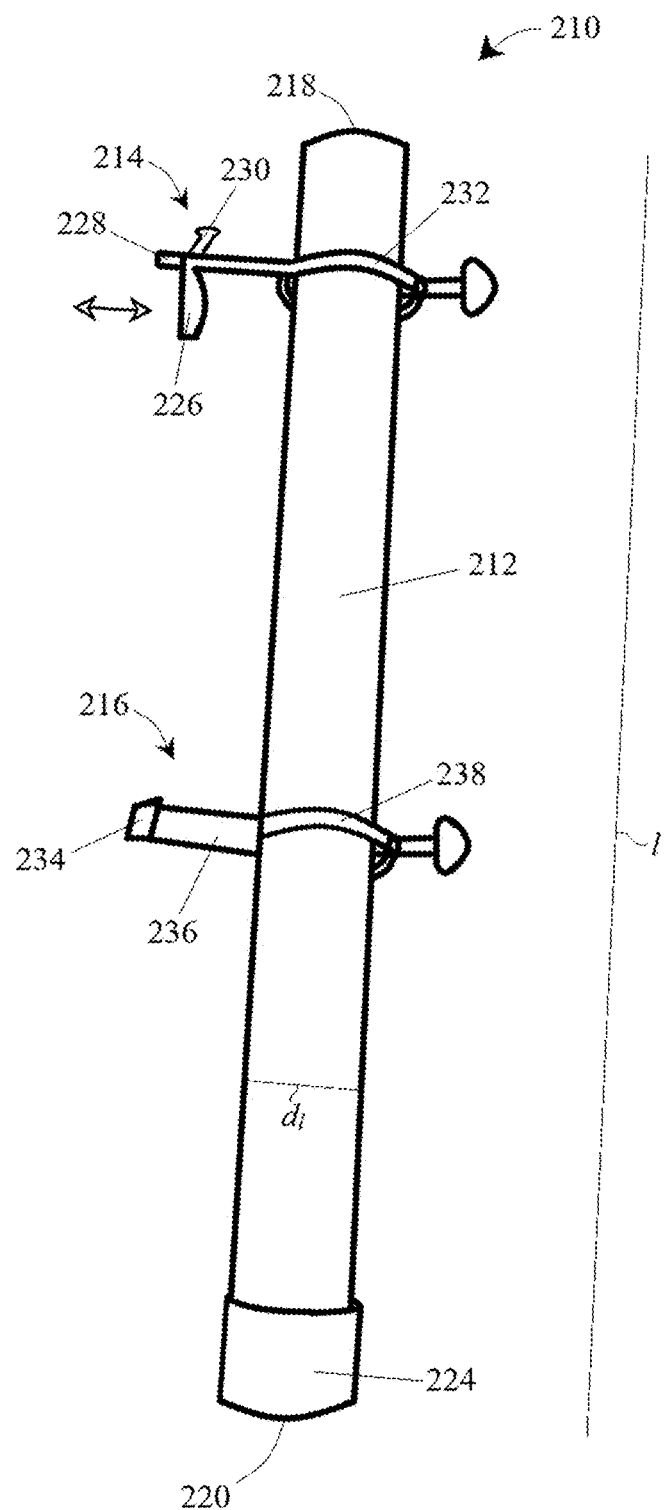
FIG. 26: Schematic illustration of an embodiment of a tool holder in accordance with the present disclosure.

Referring now to FIG. 26, an alternative embodiment of a tool holder 210 is depicted. The tool holder 210 is configured to attach to the lip of an object such as, but not limited to, a wheelbarrow 211. Accordingly, the tool holder 210 may include a connector 214, such as a ratchet member, capable of clamping the lip so as to firmly hold the tool holder 210 against the object. However, other structures for connecting the tool holder 210 to the lip of an object are possible and encompassed within the scope of the present disclosure. In other embodiments, the connector 214 is simply a hook or ledge that may keep the tool holder 210 in place against the object. The tool holder 210 may further include a foot member 216 configured to rest against a portion of the object and thereby provide stability to the tool holder 210.

The tool holder 210 may include a leg 212. The leg 212 may be tubular, having a circular or substantially circular cross-section, as seen in FIG. 26. In other embodiments, the leg 212 may have a square or substantially square cross section. The leg 212 is at least partially hollow, defining a lumen therein. Thus, the lumen defined within the leg may have a circular or substantially circular cross section, or may have a square or substantially square cross section. A square cross section may allow for enhanced clamping of the tool holder 210 to the lip of the object. However, the cross sectional shape of the leg 212 and lumen is not particularly limited, and a wide variety of shapes is possible and encompassed within the scope of the present disclosure.

Regardless of its shape, the leg 212 may extend from a first end 218 to a second end 220. The lumen may extend all the way from the first end 218 to the second end 220, or may extend for only part of the way from the first end 218 to the second end 220. The first end 218 has an opening and the second end 220 may be closed or capped. One or more implements, such as lawn and garden tools 11, may be disposed within the opening, and housed within the lumen. The second end 220 may include a cap 224 thereon, or may otherwise be sealed closed through any suitable means. The purpose of the closed second end 220 is to provide support for an implement disposed inside the lumen and resting thereon. The closed second end 220 may, however, include one or more center holes therethrough for drainage. The center holes may allow for water to weep out, for example to allow the tool holder 210 to dry out after being exposed to rain.

Referring still to FIG. 26, the leg 212, and therefore the lumen, may have a diameter $d_l$ large enough to accommodate the diameter of one or more implements to be carried by the tool holder 210. The leg 212 may have a length l that is long enough to support one or more elongated implements, that extend out of the opening 222 at the first end 218, as they are transported in the tool holder 210. The implements being carried by the tool holder 210 may rest on the cap 224 or second end 220 within the lumen, and extend out of the opening 222 at the first end 218. In some embodiments, the length l is shorter than the height of the object (e.g., a wheelbarrow) from the ground to the lip of the object. However, the length l of the tool holder 210 is not particularly limited, and can be customized for the desired application of the tool holder 210 (e.g., the length l can be specially tailored for the length of specific implements desired to be carried with the tool holder 210).

The tool holder 210 may include a connector 214 such as a ratchet member for adhering the tool holder 210 to the lip of an object such as a wheelbarrow. In one non-limiting example, depicted in FIG. 26, the connector 214 is a ratchet member that may include a clamping plate 226 disposed along a track 228, and moveable along the track 228 in the directions denoted by the double sided arrow in FIG. 26, toward and away from the leg 212. The ratchet member 214 may include a screw 230 or other fastening mechanism for securing the clamping plate 226 in a particular position along the track 228. The ratchet member 214 may be secured to the leg 212 by a fastening ring 232, or by any other suitable connector. Alternatively, the track 228 may extend into the lumen, entering through a slot in at least one side of the leg 212. In such embodiments, the slot may optionally extend through both sides of the leg 212. The connector 214 may be a ratchet member that extends through a slot in the leg 212, and may be ratcheted tighter to secure the tool holder 210 to the lip of the object.

Optionally, the leg 212 may further include a foot member 216 configured to rest against the object to which the tool holder 210 is attached. The foot member 216 may include a rigid member extending in a substantially orthogonal direction relative to the leg 212. The foot member 216 may be positioned along the leg 212 between the connector 214 and the second end 220. The foot member 216 may include a resting pad 234 and an arm 236, where the arm 236 extends outwardly from the leg 212 to the resting pad 234. The resting pad 234 may have a rectangular cross-section, however the cross-sectional shape of the resting pad 234 is not particularly limited. The arm 236 may extend to the leg 212 and be secured thereto by a fastening ring 238, or by any other suitable connector. Alternatively, the arm 236 may extend through at least one side of the leg 212. In some embodiments, the tool holder 210 does not include a foot member 216.

The tool holder 210 may be composed of any suitable material including, but not limited to, wood, plastic, metal, or a combination thereof. In one non-limiting example, the tool holder 210 is constructed out of PVC. In another non-limiting example, the tool holder 210 is constructed from a polypropylene with 20% glass filler. As another example, the tool holder 210 may be composed of recycled materials such as cardboard. In some embodiments, because the tool holder 210 may be adapted for prolonged outdoor use, the tool holder 210 is composed of a durable waterproof material such as a plastic. However, the materials that the tool holder 210 is made out of are not particularly limited.

The tool holder 210 may be composed of modular pieces which are easily assembled and disassembled. Each of the leg 212, connector 214, and foot member 216 may be packaged in a kit or kits, housed as separate, disconnected pieces (i.e., in a disconnected state) in one or more containers. Advantageously, in this manner, the tool holder may be easily packaged or stored in a small container or space.

Referring now to FIGS. 27-34, depicted is another embodiment of a tool holder 240 configured for attachment to a wheelbarrow 211 or yard cart. The tool holder 240 is similar to the tool holder 210, except for the various features described in more detail below. The tool holder 240 has a leg 212 that may have a square cross-section. However, it is understood that a square cross-section is not necessary, and other cross-sectional shapes are possible and entirely encompassed within the scope of the present disclosure.

Referring now to FIGS. 27-33, the tool holder 240 may include a clamp and collar assembly 244 as the connector 214. The clamp and collar assembly 244 includes a clamp 246, a collar 248, and fasteners 250 such as thumb screws to tighten the clamp 246 in place in the collar 248 and tighten the collar 248 in place on the wheelbarrow 211 or other object.

Figure 30A:
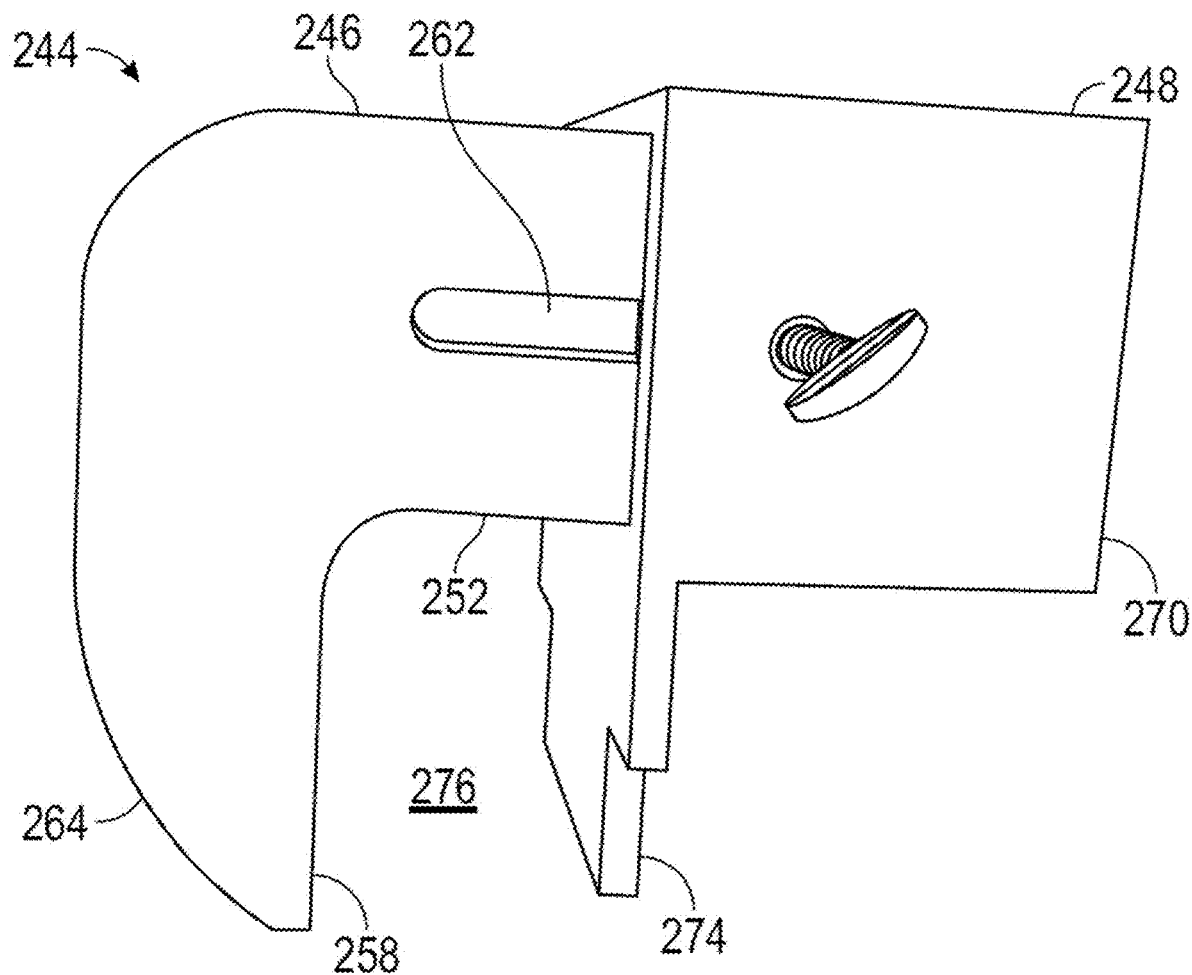
FIGS. 30A-30C: Side (FIG. 30A), rear (FIG. 30B), and top-down (FIG. 30C) views of a clamp and collar assembly in isolation.
Figure 30B:
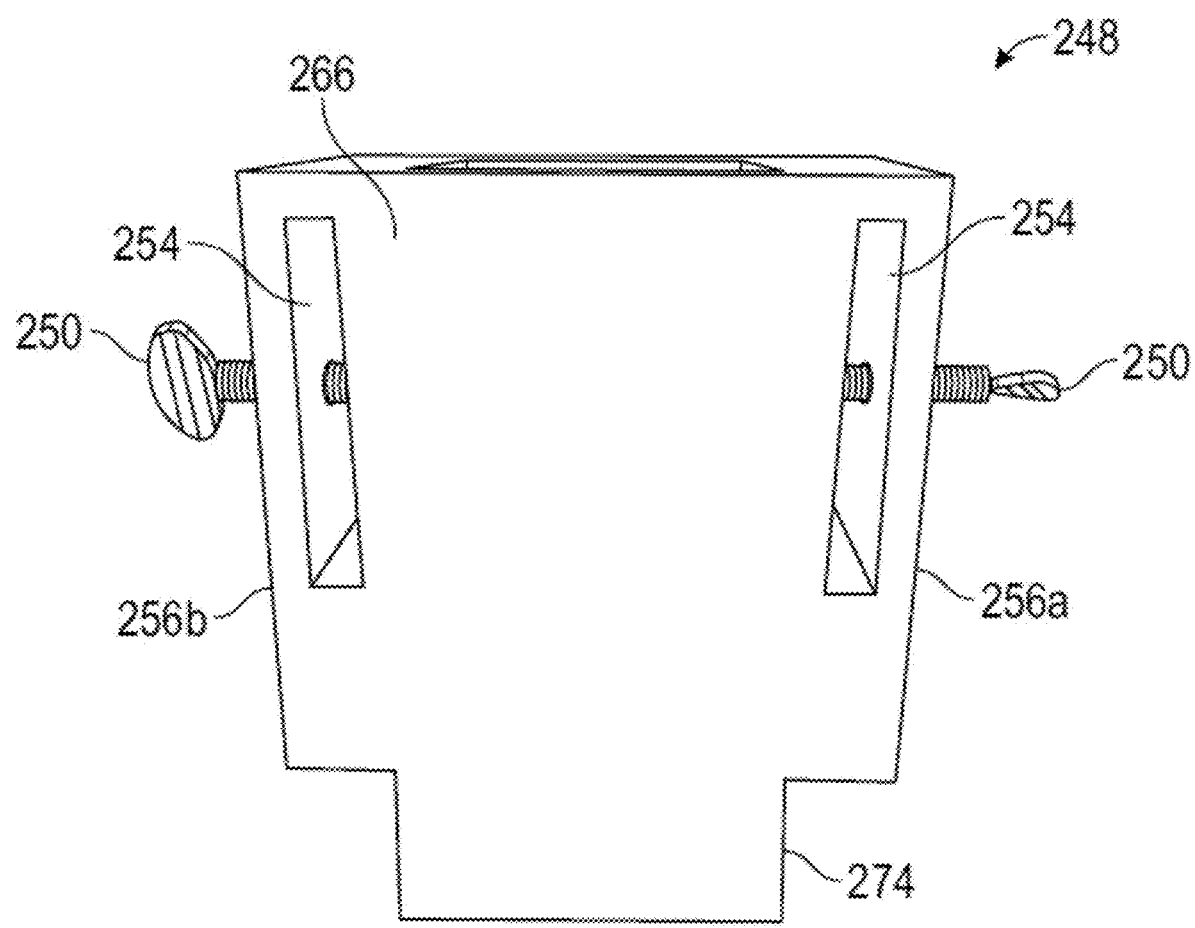
Figure 30C:
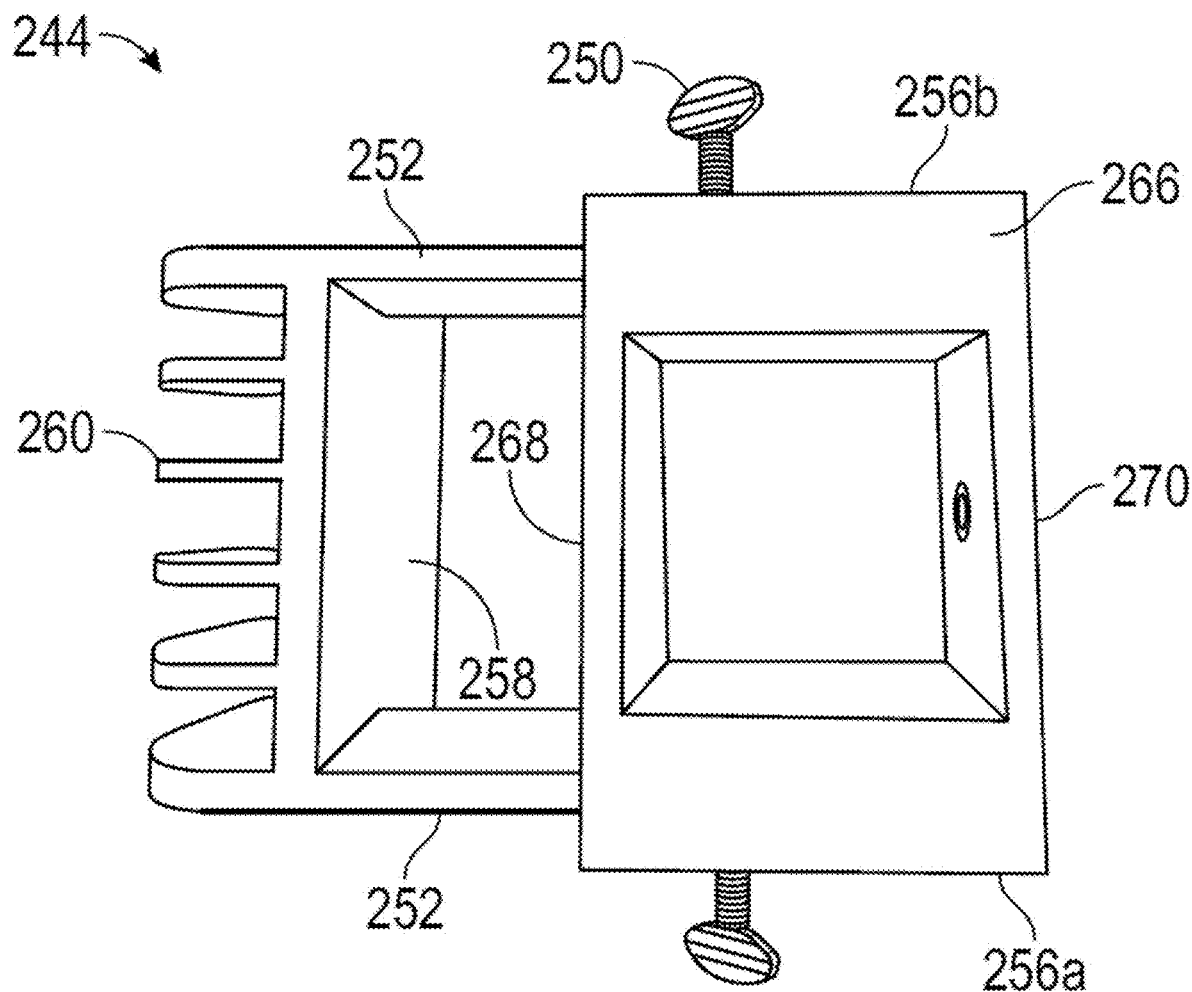

Referring now to FIGS. 30A-30C, a clamp and collar assembly 244 is shown in isolation. The clamp 246 includes opposing arms 252 that fit snugly within receiving channels 254 on opposing sides of the collar 248. The fasteners 250 are inserted from the sides 256a, 256b of the collar 248 and extend into the receiving channels 254 so as to tighten down on the opposing arms 252 when in place therein.

Figure 29:
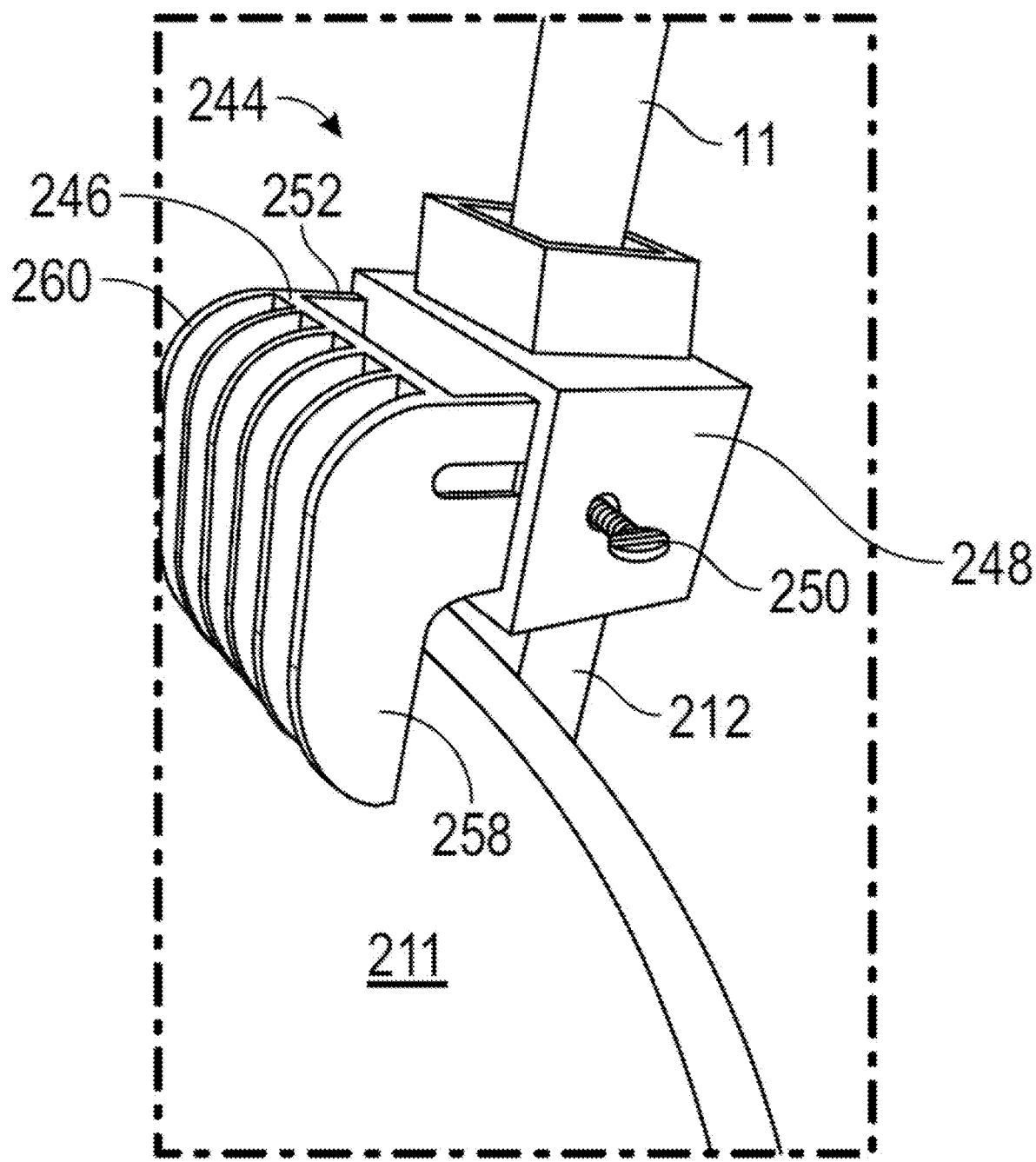
FIG. 29: Close up view of the clamp and collar assembly attached to the lip of a wheelbarrow.

The clamp may include a gripping member 258 that may include ridges 260, as seen for instance in FIG. 29. However, the ridges 260 are not strictly necessary. The opposing arms 252 may each include a track 262 for receiving the fastener 250. The gripping member 258 may extend substantially perpendicular to the opposing arms 252, and may have a curved front 264 for the purpose of avoiding sharp edges that could cause injury.

Referring now to FIGS. 30C, 33A-33C, the collar 248 includes a box-like housing 266 with sides 256a, 256b, a front 268, and a rear 270. The receiving channels 254 may extend from the front 268 through the rear 270. However, it is not strictly necessary that the receiving channels 254 extend all the way through the rear 270. The sides 256a, 256b each include holes 272 configured to receive the fasteners 250. The front 268 may include an extended bottom 274 configured to act in cooperation with the gripping member 258 of the clamp 246, when the clamp and collar assembly 244 is assembled, to clamp down on the lip of an object inside the gap 276 between the gripping member 258 and the extended bottom 274. The fasteners 250 may be tightened or loosened in combination with moving the opposing arms 252 to increase or decrease the size of the gap 276 and thereby clamp down on, or release, the lip of an object in the gap 276.

Figure 31:
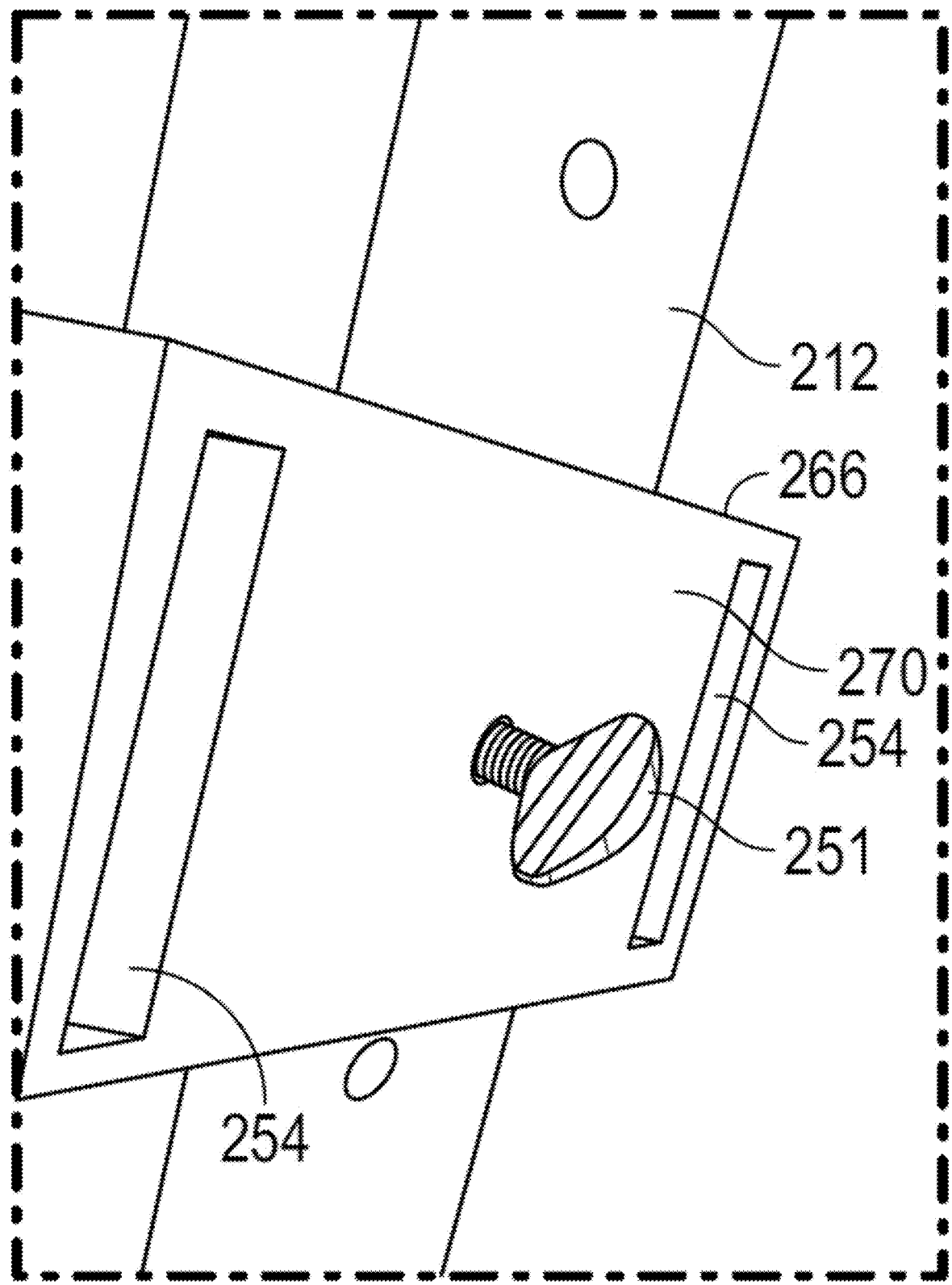
FIG. 31: Rear view of a clamp and collar assembly with an additional fastener.
Figure 32:
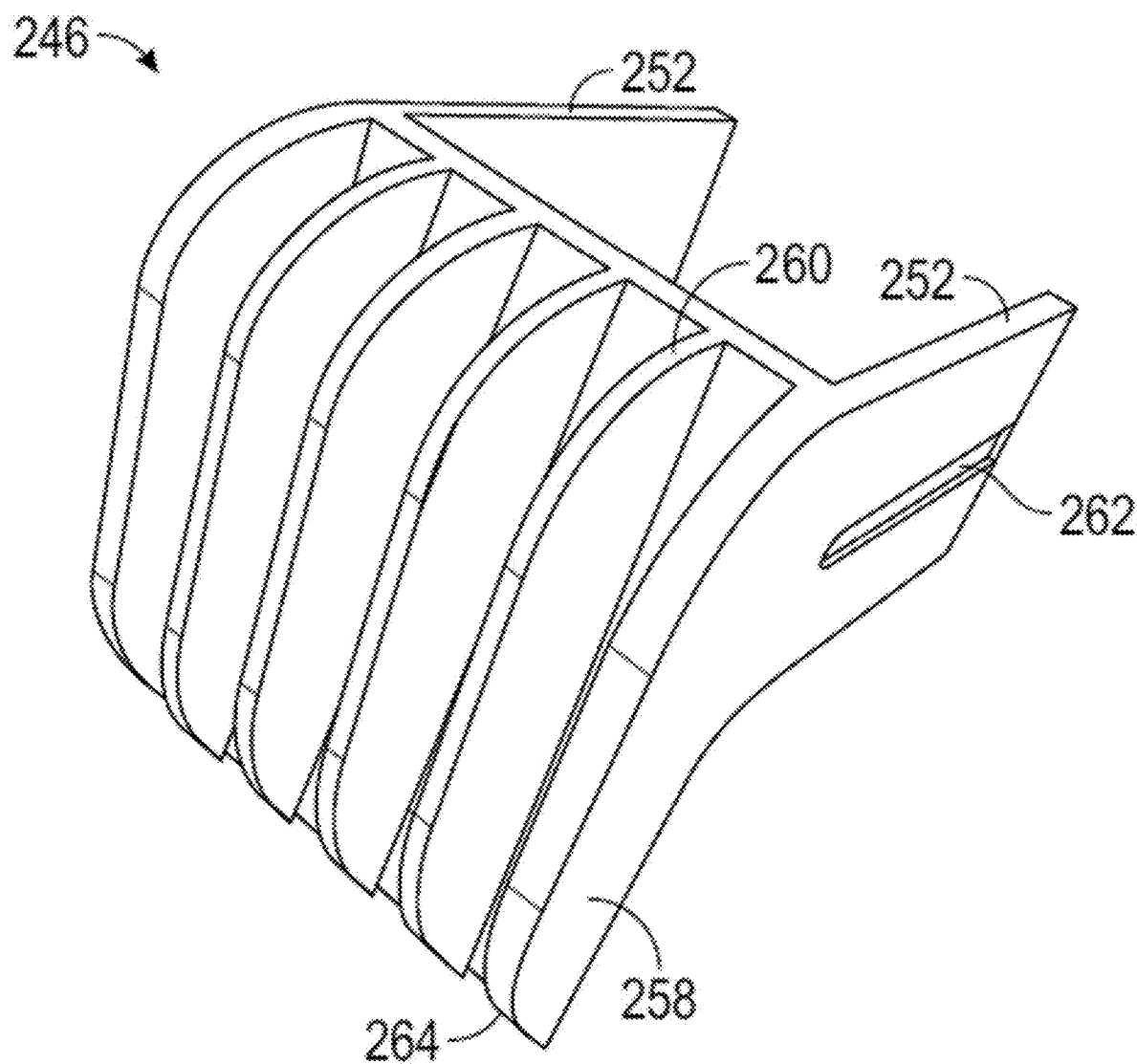
FIG. 32: Perspective view of a clamp in isolation.
Figure 33A:
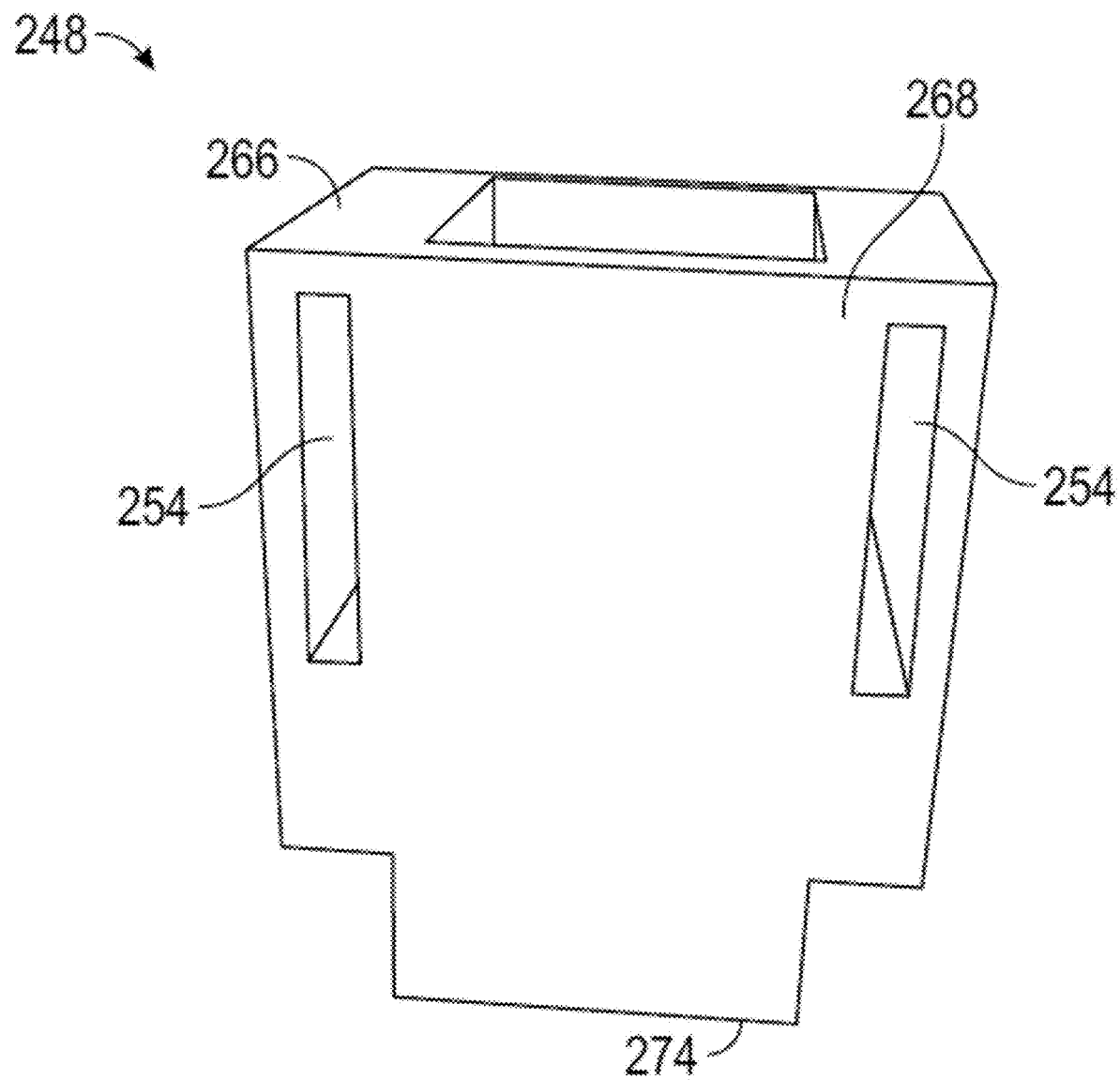
FIGS. 33A-33C: Front (FIG. 33A), side (FIG. 33B), and rear (FIG. 33C) views of a collar in isolation.
Figure 33B:
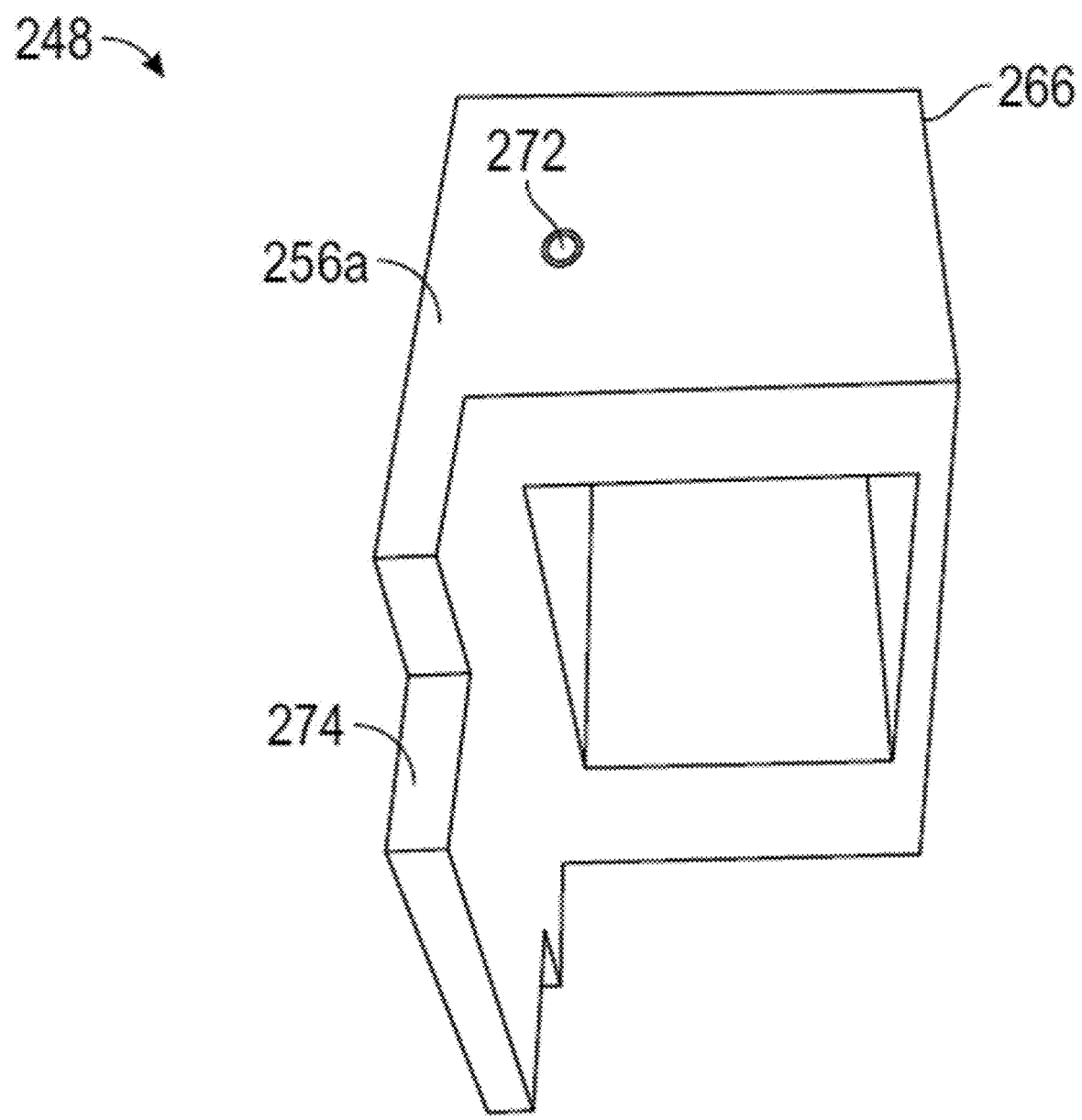
Figure 33C:
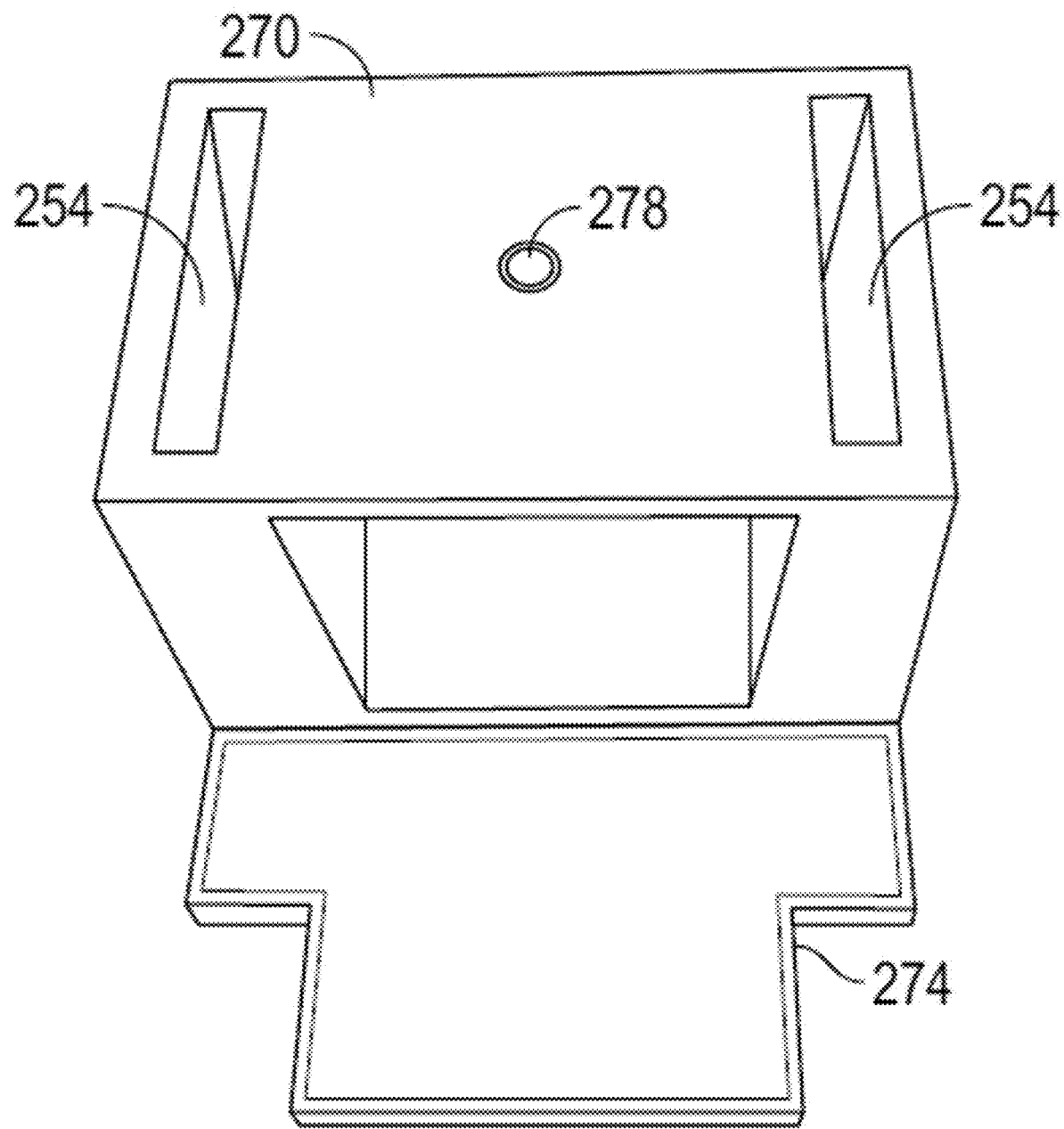

Referring now to FIGS. 31, 33C, the rear 270 of the box-like housing 266 may include a hole 278 for receiving an additional fastener 251. As seen in FIG. 31, the additional fastener 251 may connect the collar 248 to the leg 212 through the rear 270 of the box-like housing 266. The leg 212 may optionally include a hole configured to receive the additional fastener 251. However, the clamp and collar assembly 244 may advantageously be mounted on the leg 212 at any desired location, which allows for the tool holder 240 to be utilized with wheelbarrows 211 and other objects of various sizes.

Figure 27:
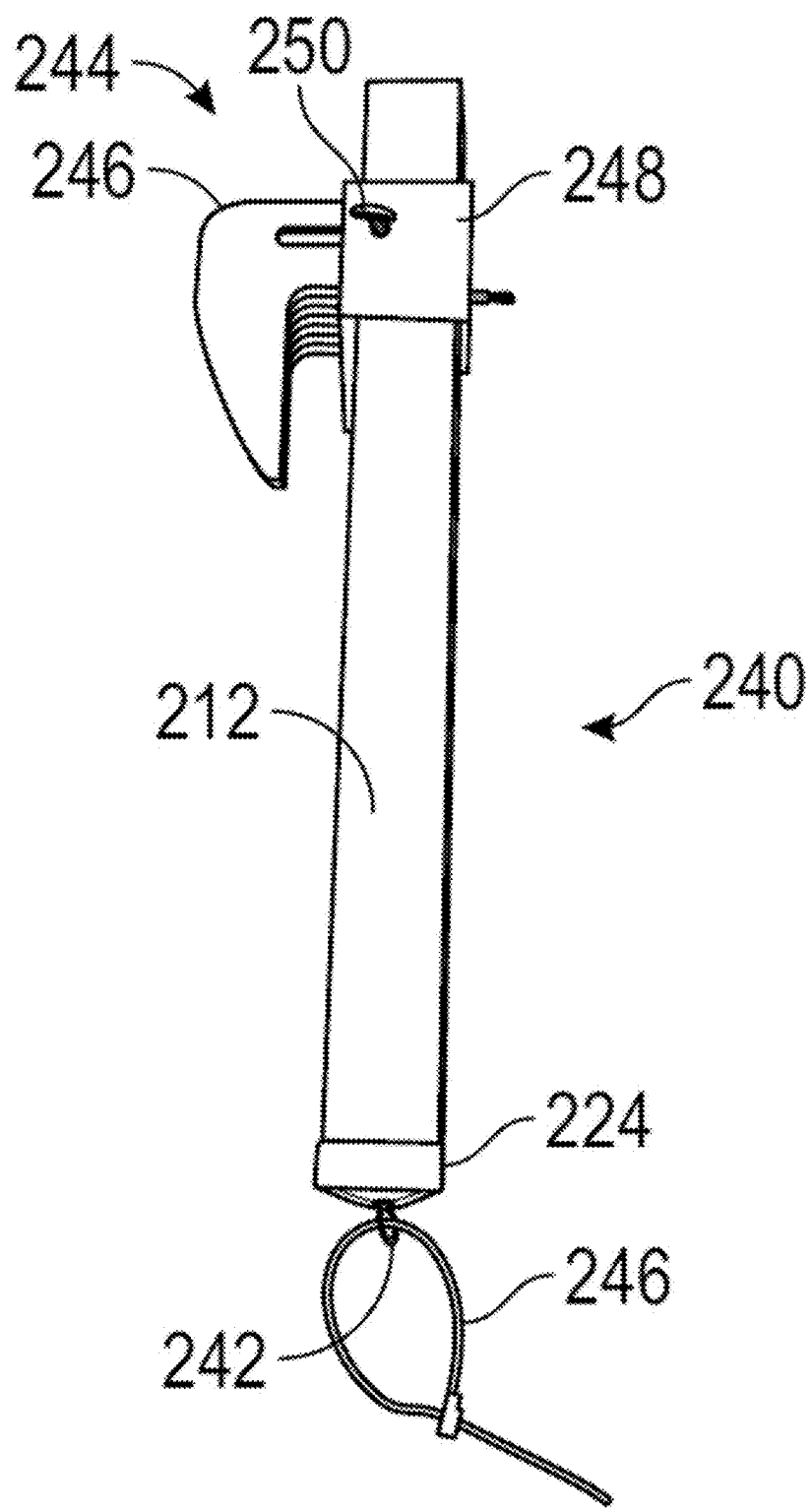
FIG. 27: View of an embodiment of a tool holder configured in accordance with the present disclosure.
Figure 28:
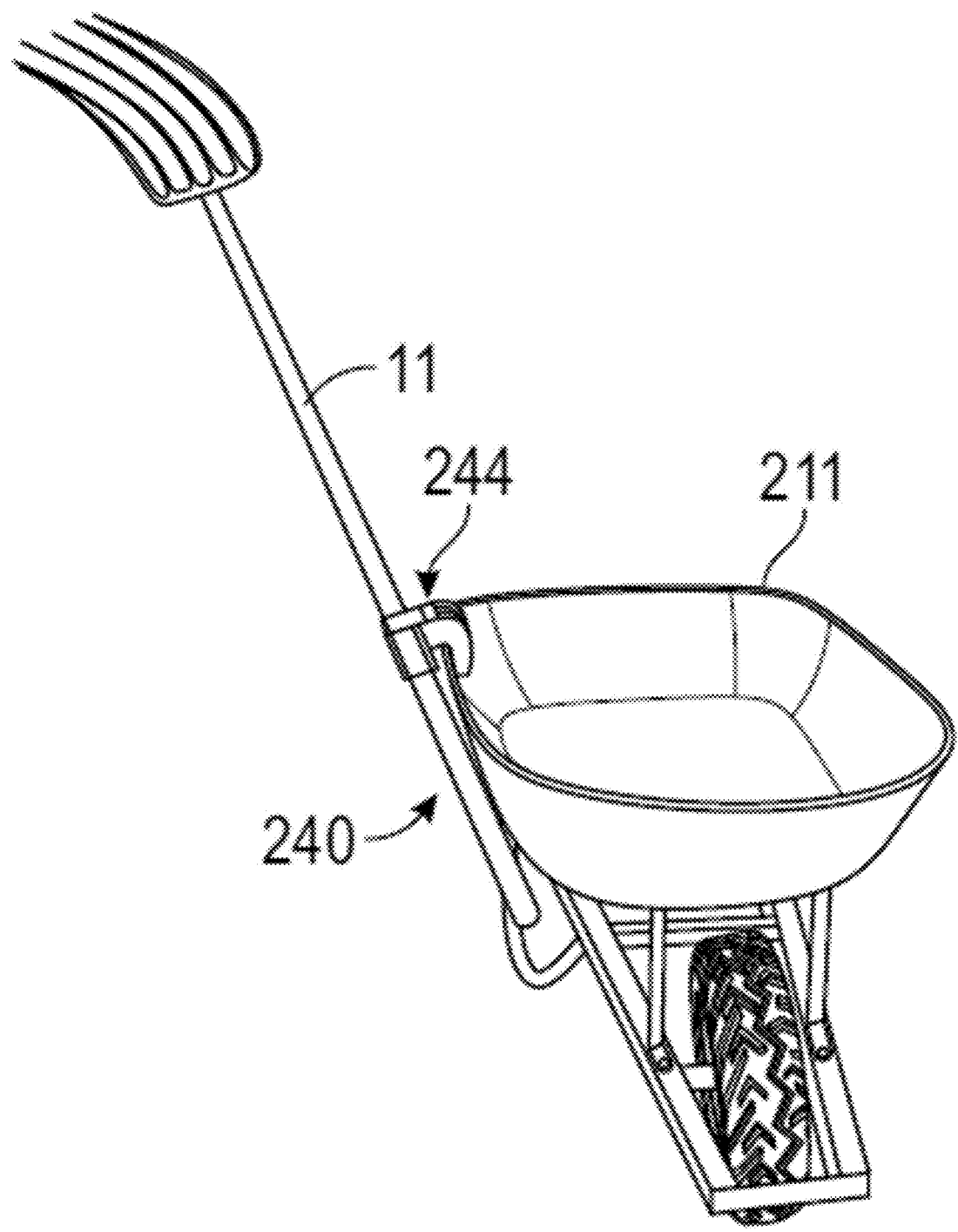
FIG. 28: View of the tool holder depicted in FIG. 27 attached to a wheelbarrow and holding a tool.
Figure 34:
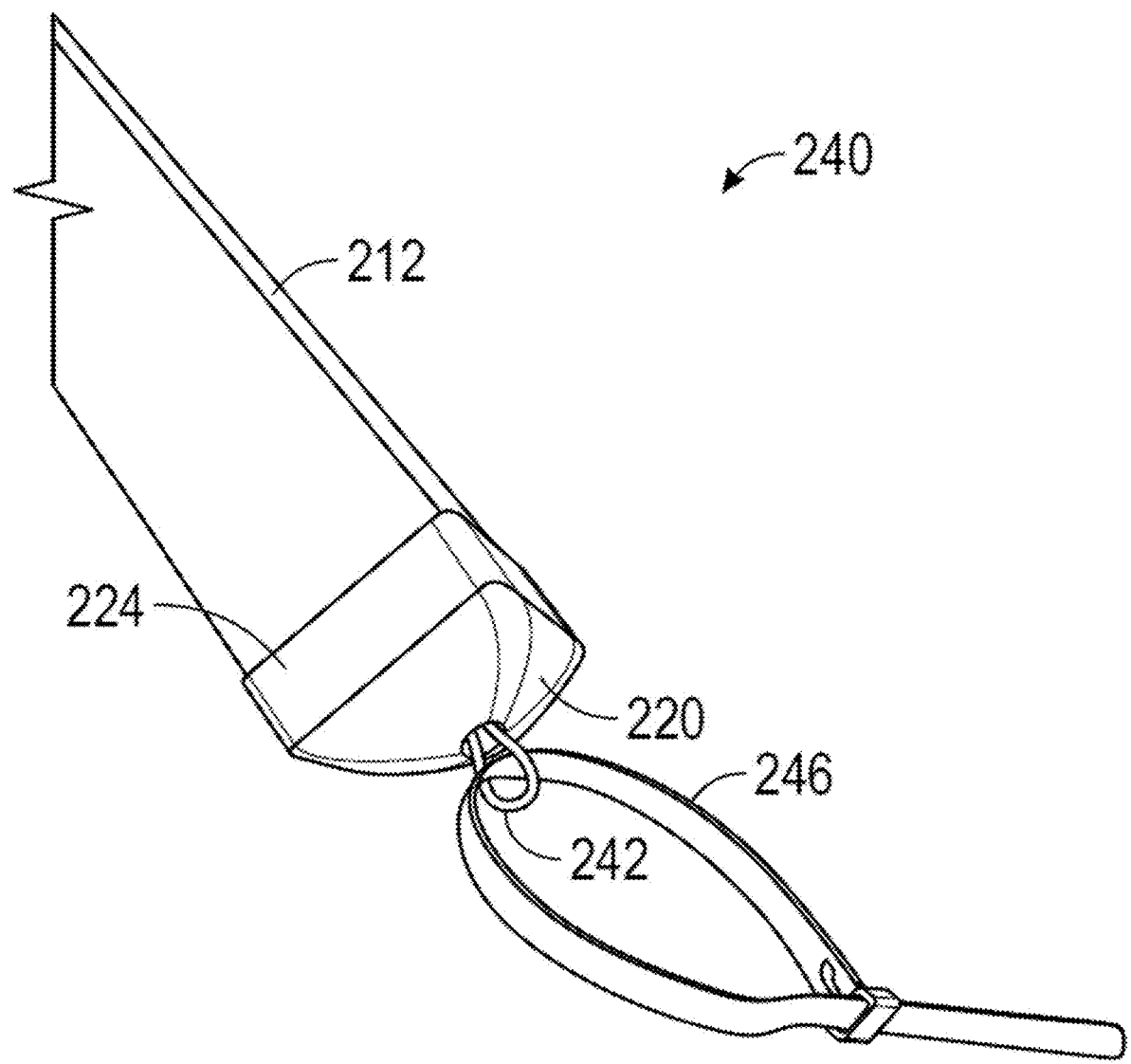
FIG. 34: View of a cap including a securing ring with a zip tie.

Referring now to FIGS. 27, 34, the tool holder 240 may include a securing ring 242 on the cap 224 at the second end 220 of the leg 212. Referring now to FIG. 34, the securing ring 242 may receive a zip tie 246, rope, cable, string, twine, thread, or cord that secures the tool holder 240 to a wheelbarrow 211 by being tied or otherwise fastened to the wheelbarrow 211. Advantageously, the securing ring 242 allows for an additional point of attachment to the wheelbarrow 211, providing enhanced stability.

As with the previous embodiment, the tool holder 240 may be composed of modular pieces which are easily assembled and disassembled. Each of the leg 212, clamp and collar assembly 244, and cap 224 with securing ring 242 may be packaged in a kit or kits, housed as separate, disconnected pieces (i.e., in a disconnected state) in one or more containers. Advantageously, in this manner, the tool holder may be easily packaged or stored in a small container or space.

Finally, in any embodiment described herein, the tool holder 10, 70, 110, 164, 240 may further include a secondary platform that attaches to the tool holder 10, 70, 110, 164, 240 by a male member being inserted into one of the openings 14 or recesses 22. The secondary platform may allow for a basket, tray, or other horizontal rack to be attached to the tool holder 10, 70, 110, 164, 240, thereby making the tool holder 10, 70, 110, 164, 240 more versatile by allowing the tool holder 10, 70, 110, 164, 240 to carry, for example, hunting, fishing, or camping gear in addition to tools 11.

Certain embodiments of the tool holders, devices, and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the tool holders, devices, and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A device comprising:
   a first bar having a plurality of openings therethrough;
   a second bar having a plurality of receiving recesses therein, wherein the second bar extends from a first side to a second side, the first side comprising a first protrusion and the second side comprising a second protrusion, wherein the first protrusion is configured to attach to or receive a first arm of a three-point hitch and the second protrusion is configured to attach to or receive a second arm of the three-point hitch; and
   at least one support member connecting the first bar to the second bar, wherein the at least one support member is received by one of the plurality of openings and one of the plurality of receiving recesses;
   wherein each of the plurality of openings is axially aligned with a different one of the plurality of receiving recesses.

2. The device of claim 1, further comprising a pair of parallel plates on a front side of the first bar, wherein the pair of parallel plates comprises axially aligned holes therethrough.

3. The device of claim 2, further comprising a top extension having a first end and a second end, wherein the first end is connected to the pair of parallel plates and the second end comprises a connection member configured to attach to or receive a third arm of the three-point hitch, the top extension being capable of pivoting with respect to the first end.

4. The device of claim 1, wherein each of the plurality of openings is a circular opening.

5. The device of claim 1, wherein the first bar is substantially parallel to the second bar.

6. The device of claim 1, further comprising a second support member connecting the first bar to the second bar, wherein the first support member and the second support member are substantially parallel.

7. The device of claim 1, further comprising an interior shoulder in one of the plurality of openings configured to restrict sliding of the at least one support member through the first bar.

8. The device of claim 1, further comprising one or more center holes included in at least one of the plurality of receiving recesses.

9. The device of claim 1, wherein the at least one support member protrudes through the first bar.

10. The device of claim 9, further comprising a cap disposed over the at least one support member to restrict sliding of the at least one support member through the first bar.

11. A device comprising:
    a first bar having a plurality of openings therethrough;
    a second bar having a plurality of receiving recesses therein, wherein the second bar extends from a first side to a second side, the first side comprising a first protrusion and the second side comprising a second protrusion, wherein the first protrusion is configured to attach to or receive a first arm of a three-point hitch and the second protrusion is configured to attach to or receive a second arm of the three-point hitch; and
    at least one support member connecting the first bar to the second bar, wherein the at least one support member protrudes through the first bar;
    wherein each of the plurality of openings is axially aligned with a respective one of the plurality of receiving recesses.

12. The device of claim 11, further comprising one or more center holes included in at least one of the plurality of receiving recesses.

13. The device of claim 11, wherein the at least one support member is received by one of the plurality of openings and one of the plurality of receiving recesses.

14. The device of claim 13, further compromising a cap disposed over the at least one support member to restrict sliding of the at least one support member through the first bar.

15. A device comprising:
    a first bar having at least one opening therethrough;
    a second bar having at least one receiving recess therein, wherein the second bar extends from a first side to a second side, the first side comprising a first protrusion and the second side comprising a second protrusion, wherein the first protrusion is configured to attach to or receive a first arm of a three-point hitch and the second protrusion is configured to attach to or receive a second arm of the three-point hitch; and
    at least one support member connecting the first bar to the second bar;
    wherein the first bar includes a first end cutout, wherein the first end cutout includes an indented resting surface configured to hold a handle or strap.

16. The device of claim 15, wherein the first bar has an open side end between a front side wall and a rear side wall.

17. The device of claim 16, wherein the first end cutout includes a front wall opening and a rear wall opening with a gap therebetween.

18. The device of claim 15, wherein the first bar includes a second end cutout.

19. The device of claim 15, further comprising one or more center holes included in the at least one receiving recess.

* * * * *